United States Patent
Yamamura et al.

(10) Patent No.: US 6,882,915 B2
(45) Date of Patent: Apr. 19, 2005

(54) DRIVING ASSIST SYSTEM

(75) Inventors: Tomohiro Yamamura, Yokohama (JP);
Satoshi Kitazaki, Yokohama (JP);
Shunsuke Hijikata, Yokohama (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 10/759,067

(22) Filed: Jan. 20, 2004

(65) Prior Publication Data

US 2004/0225424 A1 Nov. 11, 2004

Related U.S. Application Data

(62) Division of application No. 10/226,232, filed on Aug. 23, 2002.

(30) Foreign Application Priority Data

| Aug. 23, 2001 | (JP) | 2001-252422 |
| Dec. 21, 2001 | (JP) | 2001-389314 |
| May 14, 2002 | (JP) | 2001-138266 |
| Jun. 18, 2002 | (JP) | 2002-177029 |

(51) Int. Cl.$^7$ .......................... G06F 17/00; B60K 28/02; B62D 6/00
(52) U.S. Cl. .......................... 701/45; 701/301
(58) Field of Search .......................... 701/1, 301, 117, 701/45, 96, 41, 72, 70; 342/70, 71; 340/436

(56) References Cited

U.S. PATENT DOCUMENTS

| 4,257,703 A | 3/1981 | Goodrich |
| 4,931,930 A | 6/1990 | Shyu et al. |
| 5,408,411 A | 4/1995 | Nakamura et al. |
| 5,548,516 A | 8/1996 | Gudat et al. |
| 5,684,473 A | 11/1997 | Hibino et al. |
| 5,768,137 A | 6/1998 | Polidoro et al. |
| 5,983,161 A | 11/1999 | Lemelson et al. |
| 6,129,025 A | 10/2000 | Minakami et al. |
| 6,131,063 A | 10/2000 | Seki et al. |
| 6,157,892 A | 12/2000 | Hada et al. |
| 6,223,847 B1 | 5/2001 | Shimizu et al. |
| 6,226,389 B1 | 5/2001 | Lemelson et al. |
| 6,393,361 B1 | 5/2002 | Yano et al. |
| 6,433,679 B1 | 8/2002 | Schmid |
| 6,488,109 B1 | 12/2002 | Igaki et al. |
| 6,624,747 B1 | 9/2003 | Friederich et al. |

FOREIGN PATENT DOCUMENTS

| DE | 198 30 548 | 2/1999 |
| EP | 0 375 055 | 6/1990 |
| EP | 0 444 772 | 9/1991 |
| EP | 0 640 903 | 3/1995 |
| EP | 0 738 648 | 10/1996 |
| EP | 0 928 952 | 7/1999 |
| EP | 1 013 536 | 6/2000 |
| EP | 1 102 226 | 5/2001 |
| JP | 02-291099 | 11/1990 |
| JP | 11-211886 | 8/1998 |
| JP | 2001-199296 | 7/2001 |
| WO | WO 99/20508 | 4/1999 |

*Primary Examiner*—Michael J. Zanelli
(74) *Attorney, Agent, or Firm*—McDermott Will & Emery LLP

(57) ABSTRACT

A driving assist system for assisting effort by an operator to operate a vehicle in traveling is provided. The driving assist system receives data including information on vehicle state and information on environment in a field around the vehicle. A controller, mounted to the vehicle, determines future environment in the field, makes an operator response plan in response to the determined future environment to determine command, and generates the command. The operator response plan prompts the operator to operating the vehicle in a desired manner for the determined future environment. At least one actuator, mounted to the vehicle, prompts the operator in response to the command to operating the vehicle in the desired manner.

64 Claims, 49 Drawing Sheets

TTC : TIME TO CONTACT
THW : TIME HEADWAY
D : VEHICLE SEPARATION
$V_a$ : VELOCITY OF LEADING VEHICLE
$V_f$ : VELOCITY OF FOLLOWING VEHICLE
$V_r = V_f - V_a$ : RELATIVE VEHICLE VELOCITY

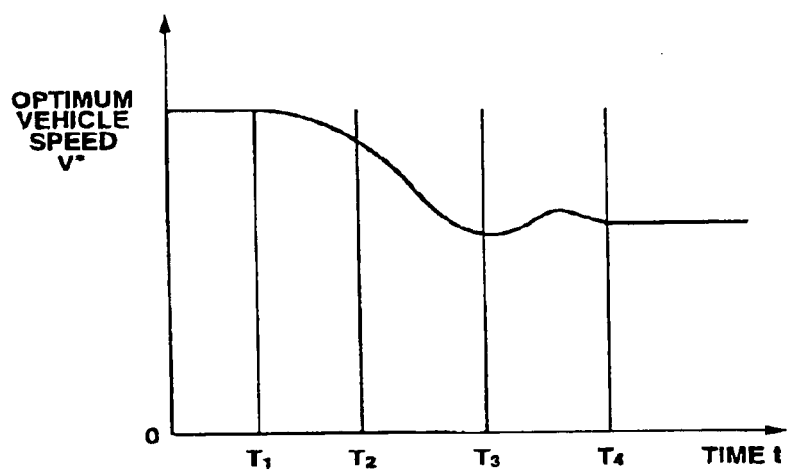
FIG.15
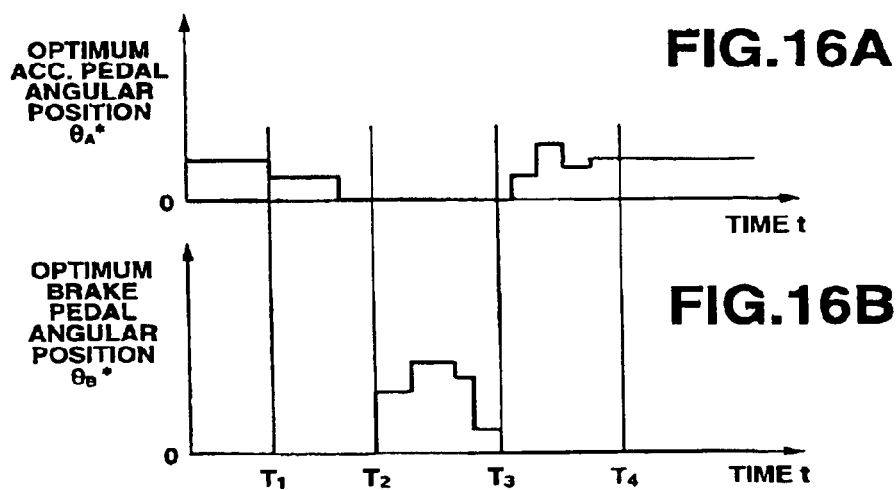
FIG.16A
FIG.16B

DRIVING ASSIST SYSTEM

This application is a divisional of application Ser. No. 10/226,232, filed Aug. 23, 2002.

FIELD OF THE INVENTION

The present invention relates to driving assist systems and methods for assisting efforts by operators to operate vehicles in traveling.

DESCRIPTION OF THE BACKGROUND ART

There is a need for a driving assist system, which can reliably assist effort by an operator to operate a vehicle, such as, an automobile, in traveling. Currently available automobiles are equipped with a data acquisition system and a controller including a processor. Such data acquisition system can continuously acquire data including information on vehicle state, such as current vehicle velocity, and information on environment in a field around the vehicle. The information on environment includes the presence of obstacles, including a leading vehicle ahead.

Ideally, a driving assist system should avoid objection by the operator of the automobile in assisting the operator manual effort to reduce a risk of collision with an obstacle. However, if the vehicle should encounter risky environment involving the presence of an obstacle, the driving assist system should avoid collision with the obstacle. Thus, there is a need for a system, which performs assist so that the operator can continue driving comfortably without any objectionable feel due to such assist.

JP-A 10-211886, published on August 11, discloses a steering control system, which modulates power-assist for avoidance of collision upon recognition of a risk within a field around the vehicle. This steering control system computes the magnitude of risk with respect to each of obstacles within the field around the vehicle. The magnitude of risk reflects the magnitude of impact upon collision with the obstacle. The magnitude of impact depends mainly upon the relative velocity between the vehicle and the obstacle. Accounting for this fact, the known system computes an individual risk $R(i)$ from an angular location $\alpha(i)$ expressed in terms of an azimuth angle of an obstacle i, a distance or separation $d(i)$ between the subject vehicle and the obstacle i, and an odd function of the relative velocity $Vref(i)$ between the subject vehicle and the obstacle i. This odd function involves a term of $Vref(i)^n$ (n=a real number grater than or equal to 3). The individual risk $R(i)$ is expressed as, $$R(i) = \frac{f(Vref(i)) + k}{d(i)} W(\alpha(i)) \quad \text{Eq. 1}$$

where, $f(Vref(i))$=Odd function that involves a term of $Vref(i)^n$ ($n \geq 3$);

$d(i)$=Distance (or separation) between the subject vehicle and the obstacle i;

$k$=Constant to adjust the distance $d(i)$; and $W(\alpha(i))$=Weighting component applied to the obstacle i appearing in the angular location $\alpha$.

The individual risks are summed vertorially to produce a resultant risk R, which is expressed as, $$R = \sum_i R(i) \quad \text{Eq. 2}$$

The known steering control system is capable of avoiding collision with the obstacle by assisting the operator to operate the vehicle laterally to clear the obstacle. However, this system appears to be insufficient to avoid objectionable feel, which the operator might have. The operator may have such objectionable feel upon occurrence of a power assist, which has magnitude determined by the risk R, because a discrepancy exits between the risk R and a risk that is perceived by the operator. When the vehicle encounters an obstacle, the magnitude of risk R is proportional to the cube of the relative velocity between the vehicle and the obstacle, whereas the magnitude of risk perceived by the operator is proportional to the square of the relative velocity.

It is therefore an object of the present invention to provide a driving assist system for assisting effort by an operator to operate a vehicle in traveling, which can assist the operator without causing the operator to have any objectionable feel.

It is another object of the present invention to provide a simple and economical driving assist system for assisting effort by an operator to operate a vehicle in traveling.

SUMMARY OF THE INVENTION

The present invention provides, in one aspect thereof, a driving assist system for assisting effort by an operator to operate a vehicle in traveling, the driving assist system comprising:

a data acquisition system acquiring data including information on vehicle state and information on environment in a field around the vehicle;

a controller, mounted to the vehicle, for receiving the acquired data, for determining future environment in the field using the acquired data, for making an operator response plan in response to the determined future environment, which plan prompts the operator to operating the vehicle in a desired manner for the determined future environment, to determine command, and for generating the command; and at least one actuator, mounted to the vehicle, for prompting the operator in response to the command to operating the vehicle in the desired manner.

The present invention provides, in second aspect thereof, a driving assist system for assisting effort by an operator to operate a vehicle in traveling, the driving assist system comprising:

a data acquisition system acquiring data involving information on the presence of a leading vehicle in a field around the vehicle; and a controller, mounted to the vehicle, for receiving the acquired data, for determining a first extent to which the vehicles has approached to each other and a second extent to which the first extent might be influenced if a change in environment should occur, and for determining future environment in the field based on the first and second extents.

The present invention provides, in third aspect thereof, a driving assist system for assisting effort by an operator to operate a vehicle in traveling, the driving assist system comprising:

a data acquisition system acquiring data involving information on the presence of an obstacle in a field around the vehicle;

a controller, mounted to the vehicle, for receiving the acquired data, for determining a risk which the obstacle would cause the operator to perceive, for allocating commands for prompting the operator to operating the vehicle longitudinally and laterally, and for generating the commands; and a plurality of actuators, mounted to the vehicle, to prompt the operator in response to the commands to operating the vehicle longitudinally and laterally.

BRIEF DESCRIPTION OF THE DRAWINGS

The present invention will be apparent from reading of the following description in conjunction with the accompanying drawings.

FIG. 15 is a timing diagram illustrating an example of a variation curve of the optimum vehicle velocity.

FIGS. 16A and 16B are timing diagrams illustrating the optimum coordinated variations of accelerator and brake pedal angular positions.

DETAILED DESCRIPTION OF THE INVENTION

Figure 1:
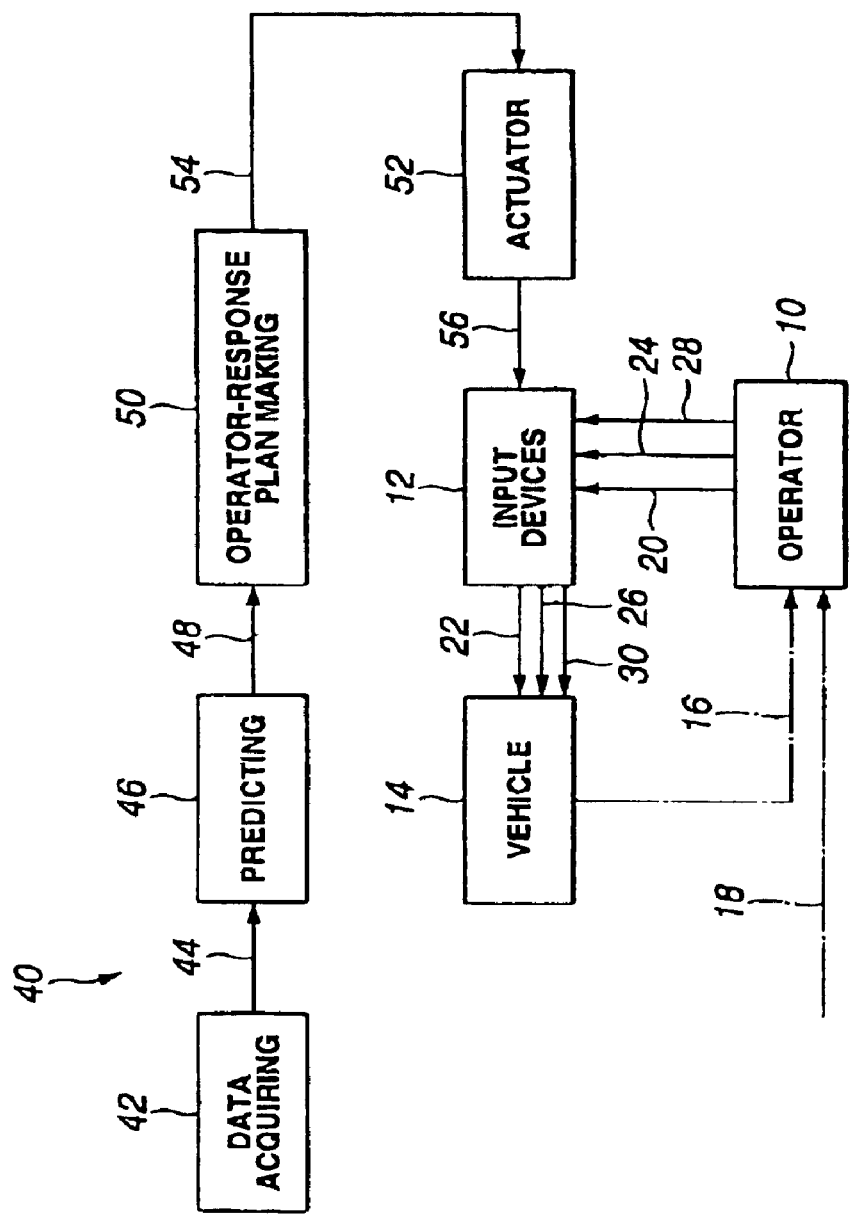
FIG. 1 is a control diagram showing control of a driving assist system.

Referring to FIG. 1, a box 10 represents a vehicle operator, and a box 12 represents input devices. Input devices 12 represent a steering wheel, an accelerator pedal and a brake pedal, which a motor vehicle 14 is usually equipped with.

Vehicle operator 10 perceives the vehicle state through normal senses, represented by feedback line 16, and environment or situation in a field around the vehicle through normal senses, represented by line 18. The operator applies manual effort, represented by line 20, to the accelerator pedal, represented by input device 12 sending a power request command to an engine controller, not shown, of vehicle 14 through line 22. The operator applies manual effort, represented by line 24, to the brake pedal, represented by input device 12, sending a brake request command to a braking system, not shown, of vehicle 14 through line 26. The operator applies manual steering effort, represented by 28, to the steering wheel, represented by input device 12 sending a steering request command to a steering system, not shown, of vehicle 14 through line 30. Input device 12 provides reaction force to the manual effort by the operator.

The reference numeral 40 generally indicates a driving assist system for assisting effort by operator 10 to operate vehicle 14 in travelling. A data acquisition system (DAS) 42 arranged on or off the vehicle, continuously acquires data including information on the state of vehicle 14 and information on environment in a field around the vehicle. The information on the vehicle state includes velocity $V_f$ of vehicle 14. The information on environment includes the presence of obstacles, such as, a leading vehicle in the same lane and other adjacent vehicles in the same or other lanes, in the field around vehicle 14. DAS 42 provides the presence of each obstacle in terms of angular location of the obstacle with respect to the subject vehicle 14 and relative velocity $V_r$ between the obstacle and the subject vehicle 14. DAS 42 may provide velocity of each of the obstacles. The information on environment also includes the presence of lane markings in the field around vehicle 14. DAS 42 may provide the presence of lane markings in terms of lateral displacement of the subject vehicle 14. DAS 42 may provide weather condition in the way of the subject vehicle 14.

Driving assist system 40 receives and uses the acquired data, represented by line 44. A predicting module 46 uses the acquired data 44 to determine or predict future environment in the field around vehicle 14. Using the determined future environment as input 48, a plan making or building module 50 makes or builds an operator-response plan, which prompts vehicle operator 10 to operating vehicle 14 in a desired manner for the predicted future environment. To implement the operator-response plan, command or commands are determined. The determined command or commands are generated and provided to actuator(s) 52 through line 54. In response to the command(s), actuator(s) 52 prompts the vehicle operator 10 to operating the vehicle 14 in the desired manner.

In embodiments, the actuator(s) 52 acts on input device 12 through line 56 to modulate reaction characteristic to manual effort applied to the input device by the vehicle operator 10. In one embodiment, the future environment determined by predicting module 46 involves a risk which each of the determined obstacles would cause the vehicle operator 10 to perceive. Such risks are summed vertorially to produce a resultant risk. In this case, the planning module 50 makes an operator-response plan that prompts operator 10 to operating vehicle in a desired manner to reduce the resultant risk. In another embodiment, the future environment further involves a risk derived from the road condition. Such risk is determined by a lateral deviation of vehicle 14 from a lane and by curvature of the lane. In this embodiment, the planning module 50 makes an operator response plan that prompts operator 10 to operating vehicle in a desired manner to reduce the resultant risk superimposed by the risk derived from the road condition. In the embodiments, the operator-response plan made by planning module 50 includes the amount input to the actuator(s) 52.

Building of the operator response plan must account for type of actuator(s) 52 employed. In one embodiment where the actuator(s) 52 is capable of modulating reaction characteristic to manual steering effort by operator 10, plan making module 50 can make an operator-response plan, which prompts vehicle operator 10 to operating vehicle 14 laterally in such a manner as to reduce the resultant risk. In another embodiment where the actuator(s) 52 is capable of modulating reaction characteristic to manual effort applied to the accelerator pedal along with modulating reaction characteristic to manual steering effort, plan making module 50 can make an operator-response plan, which prompts vehicle operator 10 to operating vehicle 14 longitudinally and laterally in such a manner as to reduce the resultant risk.

While the plan-making module 50 and predicting module 46 can be implemented in hardware or software, it is most likely implemented in software. In a software implementation, the modules 46 and 50 represent software instructions stored in a memory of a computer, and executed in the processor, and the acquired data stored in memory. In hardware implementations, the modules 46 and 50 are implemented in digital logic, preferably in an integrated circuit.

Before describing implementations in detail, it is helpful to begin with consideration of parameters that define relationship between the two adjacent vehicles on the same lane.

Figure 2:
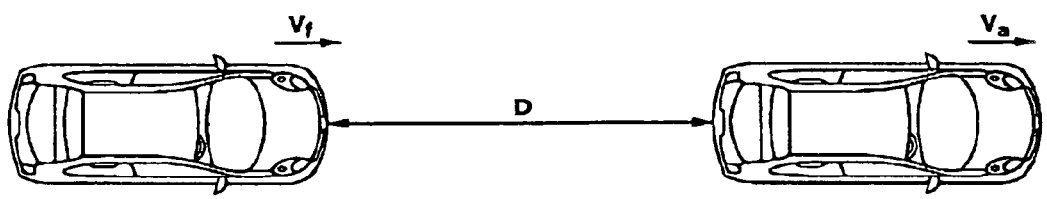
FIG. 2 illustrate parameters relevant to a leading and following traffic scene.

FIG. 2 illustrates the parameters relevant to two adjacent vehicles in travel on the same lane at different velocities. In the parameters, time to contact TTC and time headway THW are described later.

The following description provides various implementations of the present invention.

First Implementation of the Invention

Figure 3:
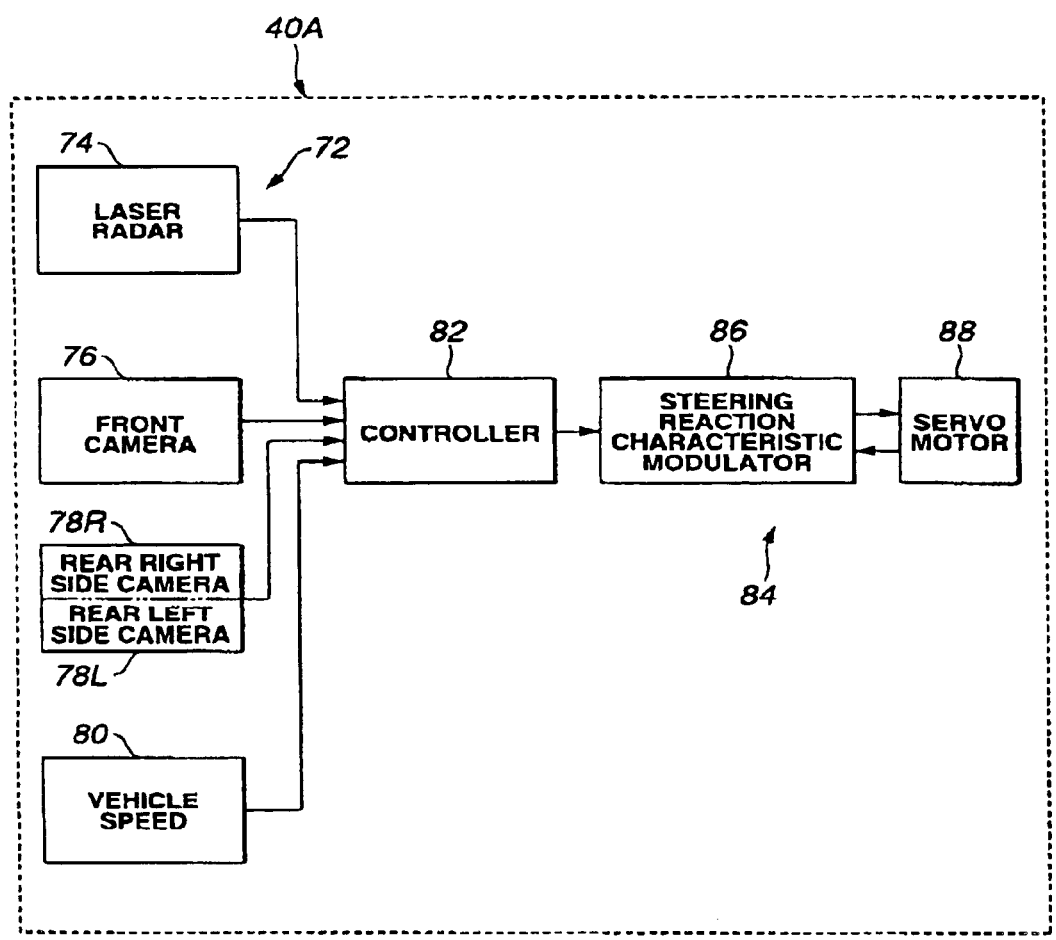
FIG. 3 is a block diagram showing hardware of a first exemplary implementation of the present invention.
Figure 4:
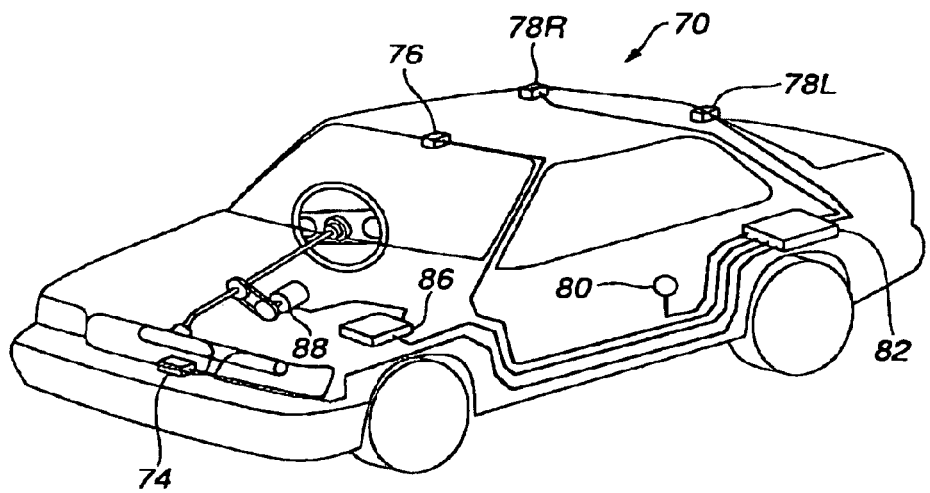
FIG. 4 is a view illustrating how the hardware of the first implementation is arranged on an automobile.

FIG. 3 provides hardware, and FIG. 4 illustrates how the hardware is arranged on an automobile 70.

In FIG. 3, the reference numeral 40A generally indicates a driving assist system. Driving assist system 40A includes an on board data acquisition system (DAS) 72. DAS 72, mounted to the vehicle 70, includes laser radar 74, a front camera 76, a rear right side (RRS) camera 78R, a rear left side (RLS) camera 78L, and a source of vehicle speed 80.

Referring to FIG. 4, vehicle 70 has laser radar 74 mounted to a front bumper thereof. Laser radar 74 may be mounted to a front grille of the vehicle. Laser radar 74 is of a type which can scan horizontally and laterally about 6 degrees to each side of an axis parallel to the vehicle longitudinal centerline, propagates infrared pulses forwardly and receives the reflected radiation by an obstacle, such as, a rear bumper of a leading vehicle. Laser radar 74 can provide an angular location of the leading vehicle and a vehicle separation or a distance between the subject vehicle 70 and the leading vehicle.

Front camera 76 is of a CCD type or a CMOS type and mounted to vehicle 70 in the vicinity of the internal rear view mirror to acquire image data of a region in front of the vehicle. The region covered by front camera 76 extends from a camera axis laterally to each side by about 30 degrees.

RRS and RLS cameras 78R and 78L are, each, of a CCD type or a CMOS type. RRS camera 78R is mounted to vehicle 70 in the vicinity of the internal rear right corner to acquire image data of rear scenery including the adjacent lane on the right-hand side. RLS camera 78R is mounted to vehicle 70 in the vicinity of the internal rear left corner to acquire image data of rear scenery including the adjacent lane on the left-hand side.

Source of vehicle speed 80 may obtain a measure of vehicle velocity by processing outputs from wheel speed sensors. The source of vehicle speed 80 may include an engine controller or a transmission controller, which can provide a signal indicative of the vehicle velocity.

Driving assist system 40A includes a microprocessor-based controller 82. Controller 82 receives the acquired data from DAS 72. From source of vehicle speed 80, controller 82 receives information on the vehicle velocity $V_f$. From laser radar 74, controller 82 receives information on vehicle separation D between the subject vehicle 70 and the adjacent leading vehicle. From the image data provided by front camera 76, controller 82 receives information on vehicle separation D between the subject vehicle 70 and each of vehicles in front. From the image data provided by RRS and RLS cameras 78R and 78L, controller 82 receives information on the presence of vehicles, in the adjacent lanes, approaching from the rear, and it also receives information on extent to which each vehicle is approaching. From the image data provided by front camera 76, controller 82 receives information on the presence of lane markings on a road, information on the lateral position of the vehicle relative to the lane markings, and information on the angular position of the vehicle relative to the lane markings. Using such information, controller 82 determines current environment or situation in a field around vehicle 70. Using the current and past values of environment, controller 82 predicts or determines future environment in the field around vehicle 70 for building of an operator response plan.

According to this implementation, the operator response plan includes using the current and future environments to determine the optimum path for vehicle 70 to take, establishing the optimum steering angle for vehicle 70 to track the determined optimum path, and determining the optimum steering reaction characteristic for prompting the vehicle operator to operating the steering wheel to the optimum steering angle. Controller 82 determines the amount of command in response to the determined optimum steering reaction characteristic. Controller 82 generates the command and applied it to a steering reaction modulation actuator 84.

Steering reaction modulation actuator 84 includes a controller called a steering reaction characteristic modulator 86 and a servo motor 88. Servo motor 88 is incorporated in the steering mechanism to modulate steering reaction characteristic to operator steering effort. Modulator 86 controls output torque of servo motor 88 in response to the command from controller 82 such that the steering reaction characteristic is adjusted to the reaction characteristic determined at controller 82.

Figure 7:
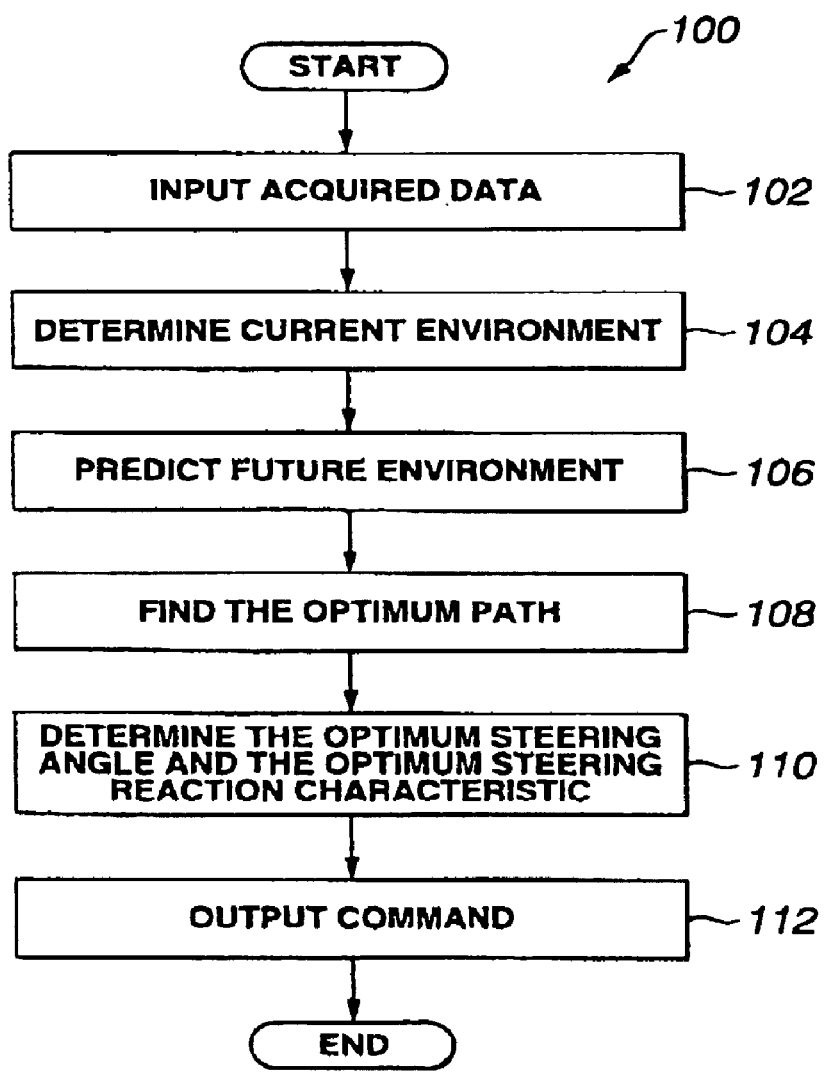
FIG. 7 is a flow diagram illustrating the operation of the first implementation.

The flow diagram in FIG. 7 illustrates a control routine of the first implementation of the present invention. The control routine, generally indicated at 100, is executed at regular time intervals of 50 milliseconds.

At input box 102, the processor of controller 82 inputs acquired data by DAS 72. Specifically, the processor inputs vehicle velocity $V_f$, an angular location of a leading vehicle and a vehicle separation D between the subject vehicle 70 and the leading vehicle, and relative relation between the subject vehicle 70 and each of vehicles that are determined by RRS and RLS cameras 78R and 78L.

At box 104, using the input data at box 102, the processor determines current environment in a field around vehicle 70. Particularly, the processor builds a current hazard map visualizing the possibility of collision of the subject vehicle 70 with each of other vehicles from current and past values of the acquired data at box 102.

The possibility of collision with another vehicle lowers as the vehicle 70 separates from it. This possibility may be expressed as a function of the reciprocal of vehicle separation or the reciprocal of the square of vehicle separation. If the relative velocity between the two vehicles can be neglected, isograms in the hazard map are concentric circles with the location of the vehicle as the center. However, if the relative velocity between the two vehicles is not negligible, the isograms protrude in the direction of a vector of the relative velocity.

Accounting for the vehicle lateral position from the lane marking and the road curvature has proven to be effective for enhanced building of a hazard map. The possibility of collision grows big as the vehicle gets close to the lane marking separating the adjacent lanes or to the edge of a road. Weighting component is the least when the vehicle follows the centerline of a lane, and it gets great as the vehicle is close the lane marking or to the edge of road. With different weighting components, this collision possibility due to the lane marking and the before-mentioned collision possibility due to other vehicles are summed to provide enhanced hazard map. The weighting component applied to the collision possibility due to other vehicles is less than the weighting component applied to the collision possibility due to the lane markings.

Figure 8:
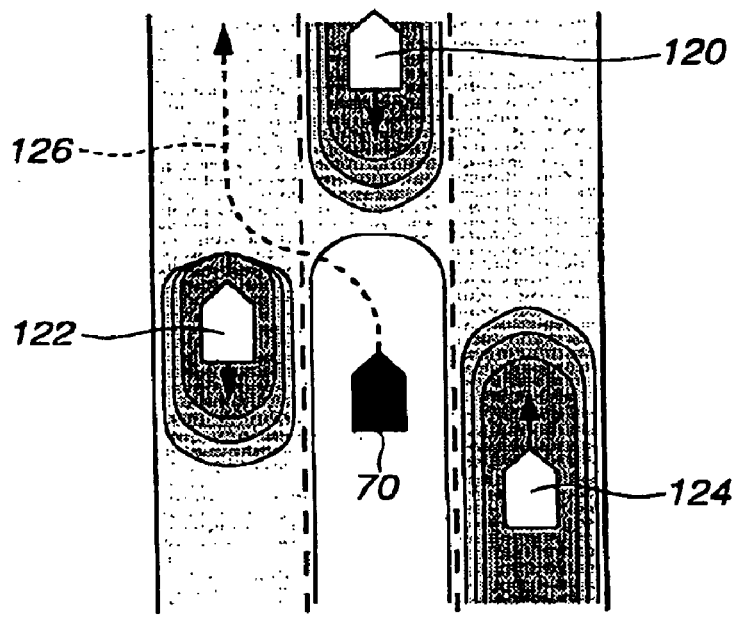
FIG. 8 is a schematic view illustrating one example of current environment in a field around the subject vehicle, which is determined by the first implementation.

FIG. 8 illustrates an example of a current environment expressed in terms of a hazard map at the moment (t=0). The environment involves a vehicle traveling scenario on a road with three lanes. In the middle lane, the subject vehicle 70 is following a leading vehicle 120. Vehicle 70 is traveling at a vehicle velocity $V_f$, while vehicle 120 is traveling at a vehicle velocity $V_a$. As $V_f > V_a$, a vector originating at vehicle 120 indicates the relative velocity between the two vehicles 70 and 120. In the left adjacent lane, a vehicle 122 is traveling at a vehicle velocity lower than $V_f$. A vector originating at vehicle 122 indicates the relative velocity between the two vehicles 70 and 122. In the right adjacent lane, a vehicle 124 is traveling at a vehicle velocity higher than $V_f$.

At the moment (t=0), vehicle 122 closes a path 126 for vehicle 70 to take to the left adjacent lane. Thus, path 126 is not justified. Apparently, vehicle 124 is about to close space in the right adjacent lane, closing any path for vehicle 70 to take to the right adjacent lane. The vehicle separation between the two vehicles 70 and 120 allows vehicle 70 to stay in the middle lane. In this environment, what the vehicle operator has to do is to continue driving vehicle 70 in the middle lane.

At box 106, after it has determined the current environment, the processor predicts or determines future environments related to different future moments. The different future moments have different time values, respectively. The time values are arranged regularly with the largest time value being a predetermined time value of 5 seconds in this implementation.

Figure 9:
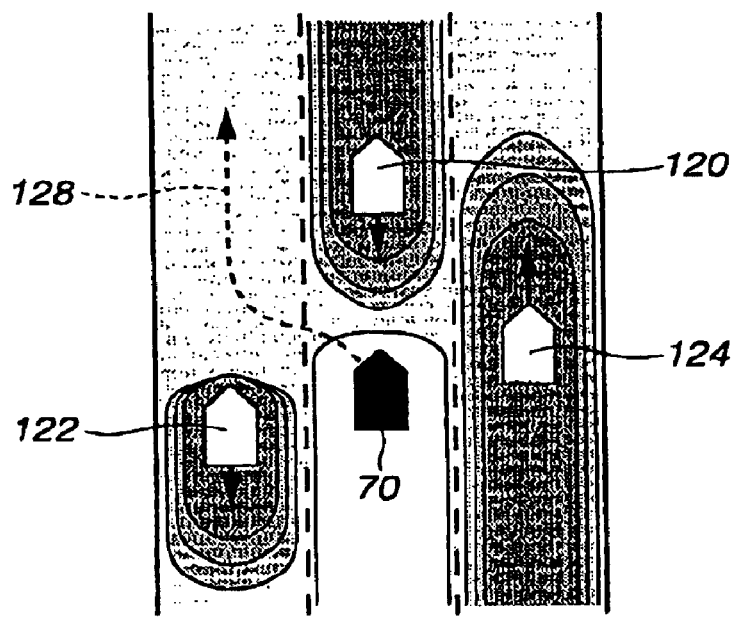
FIG. 9 is a schematic view illustrating a future environment in the field around the subject vehicle, which is predicted by the first implementation, and the optimum path.

FIG. 9 illustrates an example of one future environment expressed in terms of a hazard map at a future moment (t=T).

At this future moment (t=T), vehicle 122 opens a path 126 for vehicle 70 to take to the left adjacent although the vehicle separation between vehicles 70 and 120 has reduced and vehicle 124 has closed space in the right adjacent lane. In this future environment, the path 126 is justified and may be set as the optimum path at the future moment (t=T).

At box 108, the processor uses the predicted future environments to determine the optimum path at each of the moments. The following provides a description on what has been taken into account in determining the optimum path at each moment. The optimum path has been determined by finding, in a hazard map for each moment, a provisional location, within an area around the location of vehicle 70, where the collision possibility is the local minimum. The processor checks on one after another of the provisional location and the adjacent other locations whether or not lateral acceleration and yaw angular rate due to a change from the current location to the one of the locations falls within an acceptable range. If the provisional location has past the test, it is used as the optimum location. If not, any one of the adjacent other locations that has past the text is used as the optimum location.

Figure 10:
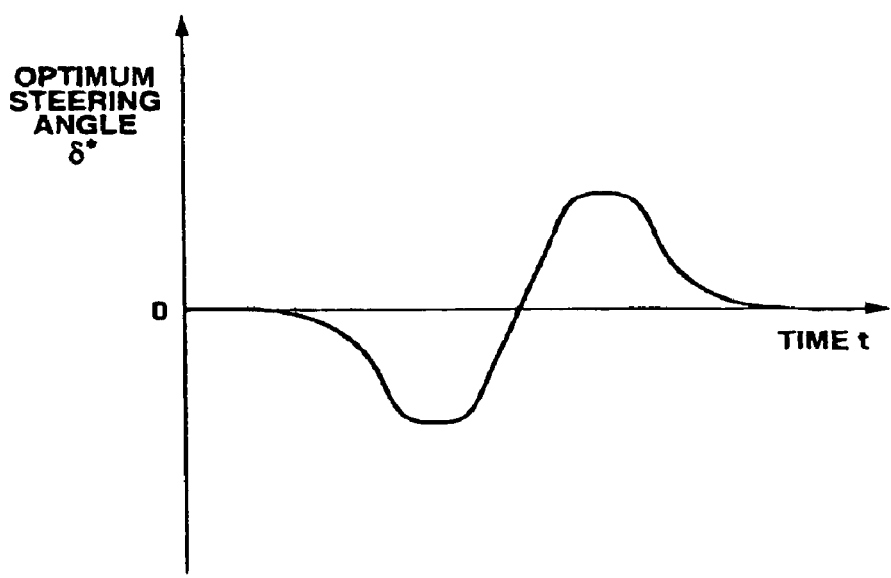
FIG. 10 is a timing diagram illustrating an example of a variation curve of the optimum steering angle for the vehicle to track the optimum path.
Figure 11:
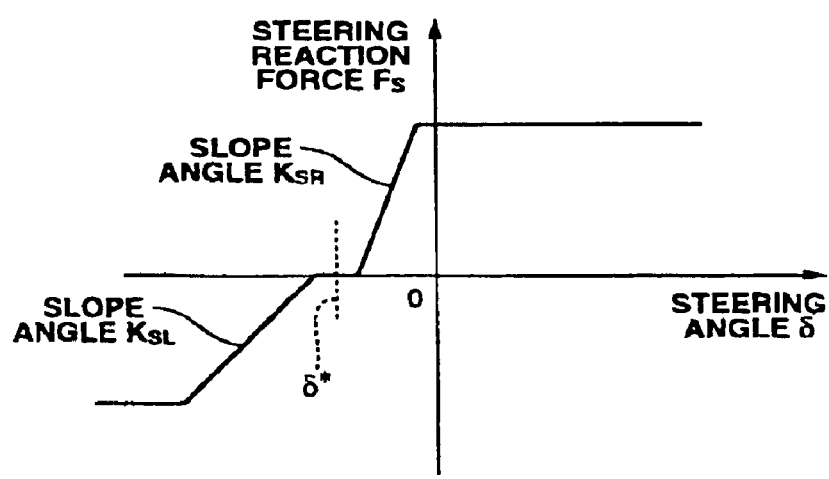
FIG. 11 is a graphical representation of an example of steering reaction characteristic, which is provided at a moment of the curve of FIG. 10, to prompt the vehicle operator to operating the steering wheel to the optimum steering angle.

At box 110, the processor determines the optimum steering angle $\delta^*$ to accomplish the optimum path, and the optimum steering reaction characteristic to prompt the vehicle operator to operating the steering wheel to the optimum steering angle $\delta^*$. The optimum steering angle $\delta^*$ may be determined by the steering characteristic and the optimum path. FIG. 10 provides an example of a variation curve of the optimum steering angle $\delta^*$. FIG. 11 provides one example of steering reaction characteristic, which is provided at a moment of the variation curve of FIG. 10, to prompt the vehicle operator to operating the steering wheel at the optimum steering angle $\delta^*$ at the moment. The steering reaction characteristic of FIG. 11 provides almost zero reaction force ($F_S=0$) at the optimum steering angle $\delta^*$. As the steering angle $\delta$ moves to the right out of this optimum steering angle $\delta^*$, the steering reaction force $F_S$ increases at slope angle of $K_{SR}$. As the steering angle $\delta$ moves to the left out of this optimum steering angle $\delta^*$, the steering reaction force $F_S$ increases at slope angle of $K_{SL}$.

The slope angles $K_{SR}$ and $K_{SL}$ are not fixed and determined by gradient of the collision possibility on one side in the vicinity of the optimum path and gradient on the opposite side in the vicinity thereof. Such gradients can be given from isograms on both sides of the optimum path within the predicted hazard maps (see box 106 in FIG. 7). Operator steering effort to increase deviation from the optimum path to left or right is opposed by a reaction force determined by slope angle $K_{SL}$ or $K_{SR}$. If a rapid change in the collision possibility exits on the right side of the optimum path, the slope angle $K_{SR}$ increases to provide increased reaction force. If a rapid change in the collision possibility exits on the left side of the optimum path, the slope angle $K_{SL}$ increases to provide increased reaction force. This steering reaction characteristic prompts the vehicle operator to operating the steering wheel to track the optimum path.

At output box 112, the processor outputs command indicative of the determined reaction characteristic to steering reaction modulation actuator 84 (see FIG. 3). The command is applied to the modulator 86 of the actuator 84. Under the control of the modulator 86, servo motor 88 operates to provide the determined steering reaction characteristic to the manual steering effort applied to the steering wheel by the vehicle operator.

Second Implementation of the Invention

Figure 5:
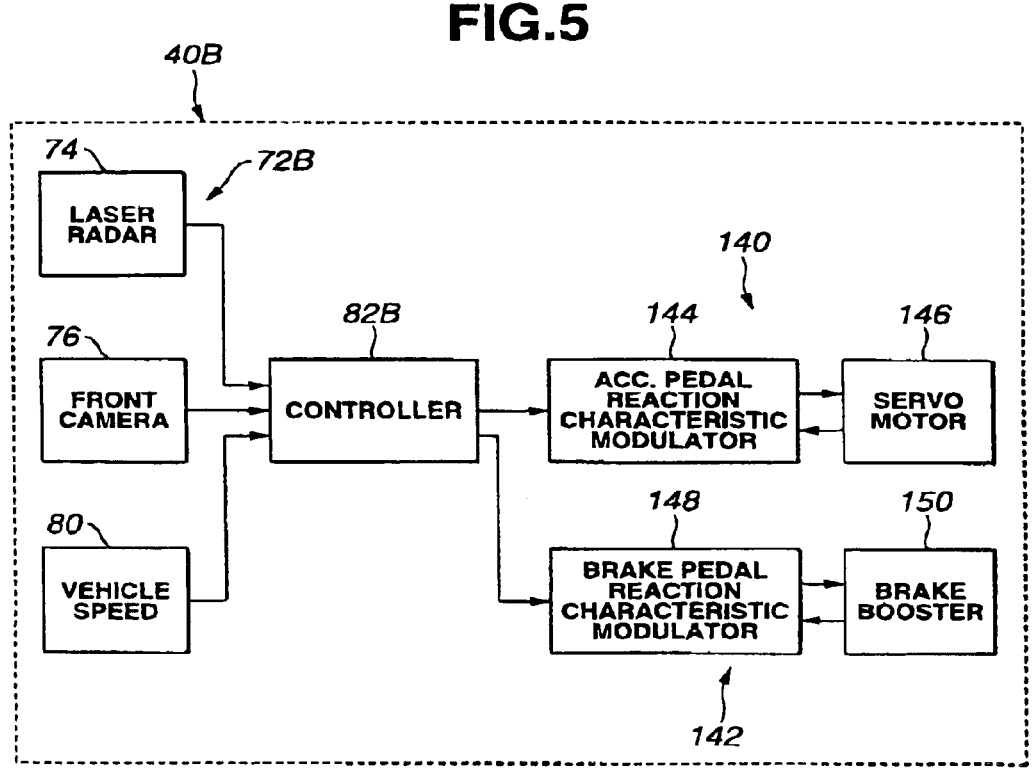
FIG. 5 is a block diagram showing hardware of a second exemplary implementation of the present invention.
Figure 6:
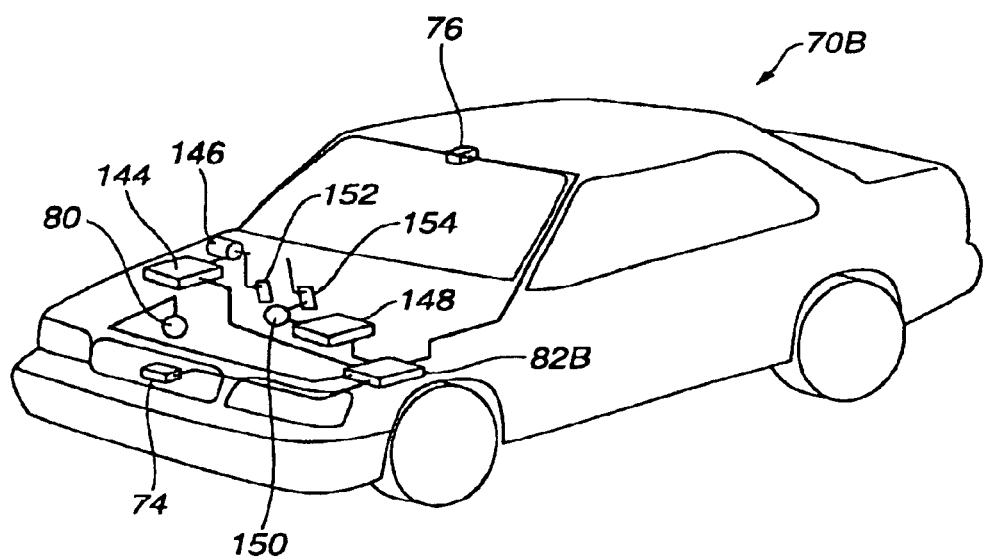
FIG. 6 is a view illustrating how the hardware of the second implementation is arranged on an automobile.

FIG. 5 provides hardware, and FIG. 6 illustrates how the hardware is arranged on an automobile 70B.

In FIG. 5, the reference numeral 40A generally indicates a driving assist system. Driving assist system 40B includes an on board data acquisition system (DAS) 72B. DAS 72B, mounted to the vehicle 70B, includes laser radar 74, a front camera 76, and a source of vehicle speed 80. DAS 72B is substantially the same as DAS 72 except the elimination of RRS and RLS cameras 78R and 78L.

Referring to FIG. 6, vehicle 70B has laser radar 74 mounted to a front bumper thereof. Front camera 76 of a CCD type or a CMOS type is mounted to vehicle 70B in the vicinity of the internal rear view mirror to acquire image data of a region in front of the vehicle. Source of vehicle speed 80 may obtain a measure of vehicle velocity by processing outputs from wheel speed sensors. The source of vehicle speed 80 may include an engine controller or a transmission controller, which can provide a signal indicative of the vehicle velocity.

In FIG. 5, driving assist system 40B includes a microprocessor based controller 82B. Controller 82B receives the acquired data from DAS 72B. From source of vehicle speed 80, controller 82B receives information on the vehicle velocity $V_f$. From laser radar 74, controller 82B receives information on vehicle separation D between the subject vehicle 70B and the adjacent leading vehicle. From the image data provided by front camera 76, controller 82B receives information on vehicle separation D between the subject vehicle 70B and each of vehicles in front. From the image data provided by front camera 76, controller 82B receives information on the presence of lane markings on a road, information on the lateral position of the vehicle relative to the lane markings, and information on the angular position of the vehicle relative to the lane markings. Using such information, controller 82B determines current environment or situation in a field around vehicle 70B. Using the current and past values of environment, controller 82B predicts or determines future environments in the field around vehicle 70B for building of an operator response plan.

According to this implementation, the operator response plan includes using the current and future environments to determine the optimum vehicle velocity for vehicle 70B to take, establishing the optimum pedal positions of an accelerator pedal and a brake pedal for vehicle 70B to travel at the determined optimum vehicle velocity, and determining the optimum accelerator and brake reaction characteristics for prompting the vehicle operator to operating the accelerator pedal and brake pedal to the optimum pedal positions. Controller 82B determines the amount of accelerator pedal reaction command in response to the determined optimum accelerator reaction characteristic. Controller 82B also determines the amount of brake pedal reaction command in response to the determined optimum brake reaction characteristic. Controller 82B generates the accelerator reaction command and applies it to an accelerator reaction modulation actuator 140. Controller 82B generates the brake reaction command and applies it to a brake reaction modulation actuator 142.

Accelerator reaction modulation actuator 140 includes a controller called an accelerator pedal reaction characteristic modulator 144 and a servo motor 146. Brake reaction modulation actuator 142 includes a controller called a brake pedal reaction characteristic modulator 148 and a brake booster 150.

Figure 19:
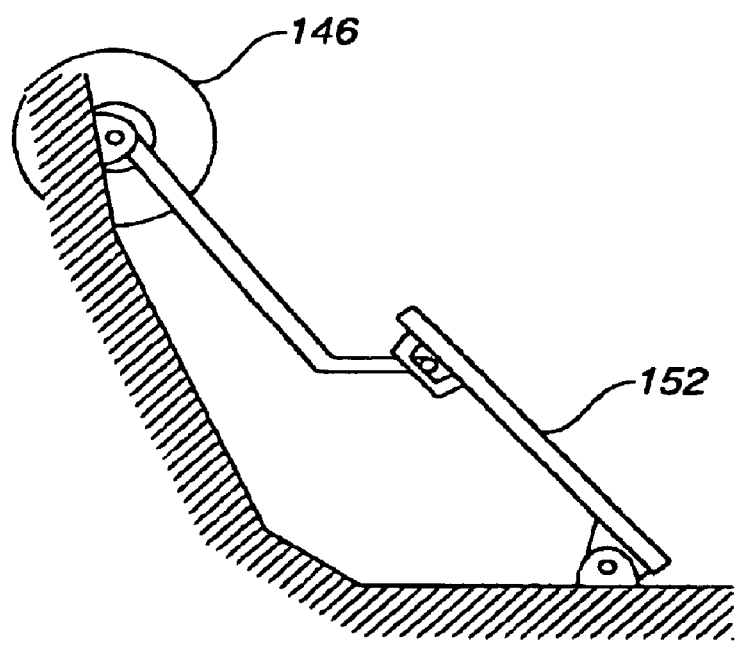
FIG. 19 is a schematic view of a servo motor of an accelerator reaction characteristic modulation actuator in operative relationship with an accelerator pedal.

Referring also to FIG. 19, servo motor 146 is incorporated into a link mechanism of an accelerator pedal 152 to modulate accelerator reaction characteristic to operator effort to depress accelerator pedal 152. Modulator 144 controls output torque of servo motor 146 in response to the command from controller 82B such that the accelerator reaction characteristic is adjusted to the reaction characteristic determined at controller 82B.

Referring back to FIGS. 5 and 6, brake booster 150 can vary a brake assist to modulate brake reaction characteristic to operator effort to depress a brake pedal 154. Modulator 148 controls brake booster 150 in response to the command from controller 82B such that the brake reaction characteristic is adjusted to the reaction characteristic determined at controller 82B.

Figure 12:
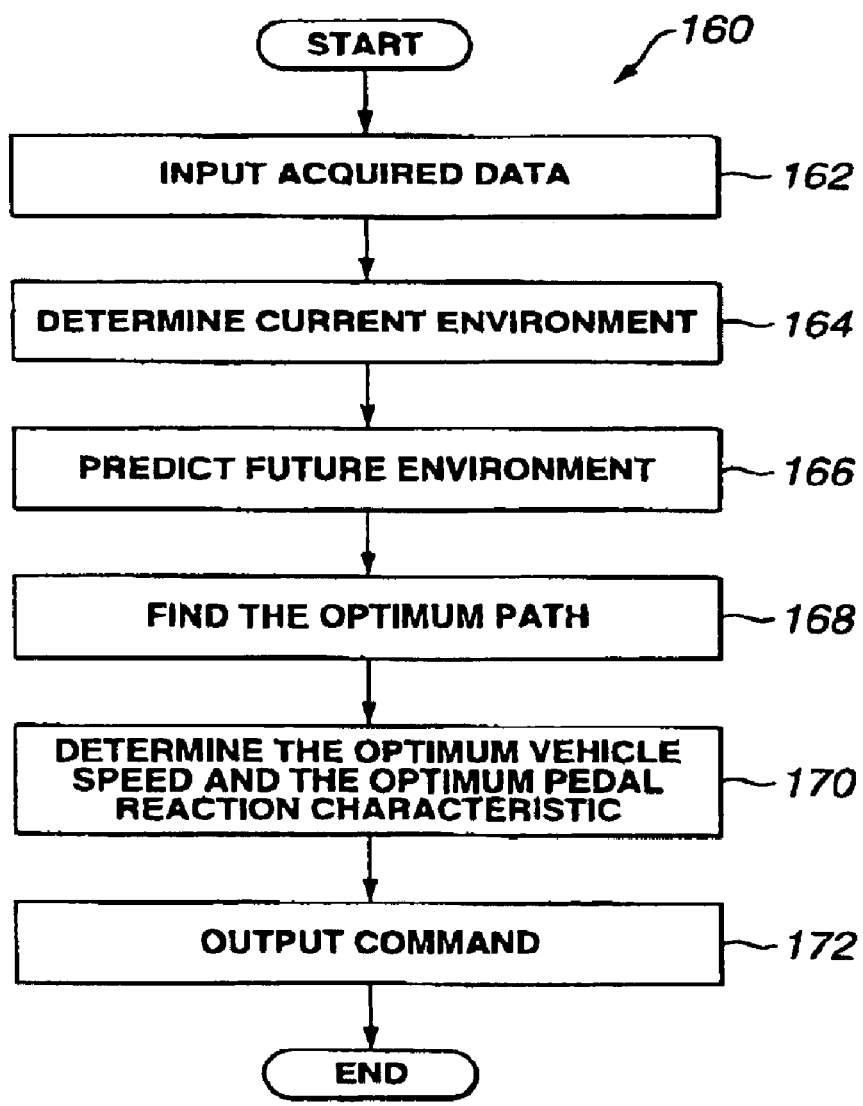
FIG. 12 is a flow diagram illustrating the operation of a second exemplary implementation of the present invention.

The flow diagram in FIG. 12 illustrates a control routine of the second implementation of the present invention. The control routine, generally indicated at 160, is executed at regular time intervals of 50 milliseconds.

At input box 162, the processor of controller 82B inputs acquired data by DAS 72B. Using the image data from front camera 76, the processor determines the position of lane markings and the position of each of vehicles in front relative to the lane markings. Based on the relative position of each of the vehicles in front to the lane markings, the processor picks up a leading vehicle on the same lane as a target to be monitored by laser radar 74 for the subsequent control. The processor inputs an angular location of the leading vehicle, and a vehicle separation D between the subject vehicle 70B and the leading vehicle from laser radar 74. The processor receives vehicle velocity $V_f$ from source of vehicle speed 80.

At box 164, using the acquired data received at box 162, the processor determines current environment in a field around vehicle 70B. Particularly, the processor builds a current hazard map visualizing the possibility of collision of the subject vehicle 70B with the following vehicle from current and past values of the acquired data.

The possibility of collision with the leading vehicle lowers as the vehicle 70B separates from it. This possibility may be expressed as a function of the reciprocal of vehicle separation or the reciprocal of the square of vehicle separation. If the relative velocity between the two vehicles can be neglected, isograms in the hazard map are concentric circles with the location of the vehicle as the center. However, if the relative velocity between the two vehicles is not negligible, the isograms protrude in the direction of a vector of the relative velocity.

Figure 13:
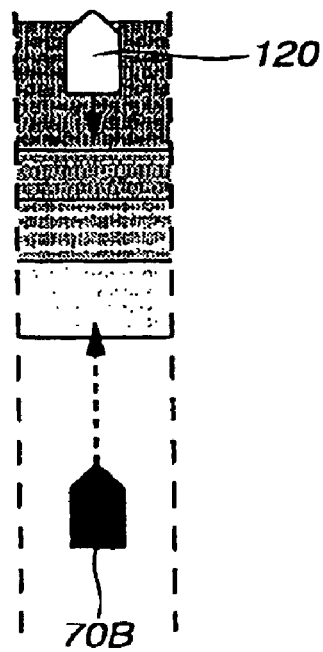
FIG. 13 is a schematic view illustrating one example of current environment in a field around the subject vehicle, which is determined by the second implementation.

FIG. 13 illustrates an example of a current environment expressed in terms of a hazard map at the moment (t=0). The environment involves a vehicle traveling scenario within a lane on road. A leading vehicle 120 exists in the same lane. Vehicle 70B is traveling at a vehicle velocity $V_f$, while vehicle 120 is traveling at a vehicle velocity $V_a$. As $V_f > V_a$, a vector originating at vehicle 120 indicates the relative velocity between the two vehicles 70B and 120. At the moment (t=0), there is a sufficient vehicle separation.

At box 166, after it has determined the current environment, the processor predicts or determines future environments related to different future moments. The different future moments have different time values, respectively. The time values are arranged regularly with the largest time value being a predetermined time value of 5 seconds in this implementation.

Figure 14:
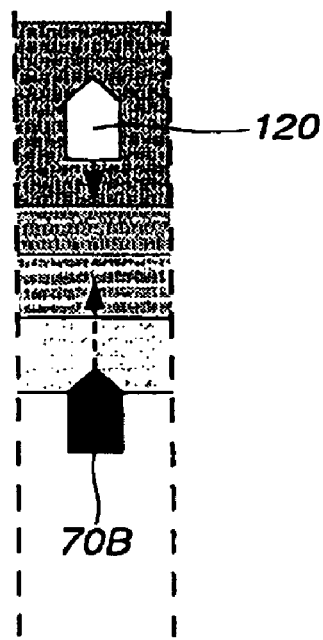
FIG. 14 is a schematic view illustrating a future environment in the field around the subject vehicle, which is predicted by the second implementation.

FIG. 14 illustrates an example of one future environment expressed in terms of a hazard map at a future moment (t=T). At this future moment (t=T), the vehicle separation is not sufficient.

At box 168, the processor uses the predicted future environments to determine the optimum path at each of the moments. The following provides a description on what has been taken into account in determining the optimum path at each moment. The optimum path has been determined by finding, in a hazard map for each moment, a provisional location, within an area around the location of vehicle 70B, where the collision possibility is the local minimum. The processor checks on one after another of the provisional location and the adjacent other locations whether or not longitudinal acceleration due to a change from the current location to the one of the locations falls within an acceptable range. If the provisional location has past the test, it is used as the optimum location. If not, any one of the adjacent other locations that has past the text is used as the optimum location. In the second implementation, the lateral control is out of consideration. Hence, the optimum path is found in the same lane so that it may be taken by vehicle 70B by varying the vehicle velocity.

At box 170, the processor determines the optimum vehicle velocity V* to accomplish the optimum path, the optimum accelerator and brake pedal positions $\theta_A^*$ and $\theta_B^*$, and accelerator and brake pedal reaction characteristics. FIG. 15 provides an example of a variation curve of the optimum vehicle velocity V*. FIGS. 16A and 16B provide one example of a coordinated variations of optimum accelerator and brake pedal positions $\theta_A^*$ and $\theta_B^*$ to accomplish the optimum velocity variation shown in FIG. 15. In FIGS. 16A and 16B, during period of time $T_1$ and $T_2$, the optimum accelerator pedal position $\theta_A^*$ slightly reduces to gradually slow vehicle 70B down. During the subsequent period of time $T_2$ and $T_3$, the optimum accelerator pedal position $\theta_A^*$ has reduced to zero and the optimum brake pedal position $\theta_B^*$ increases temporally to effectively decelerate vehicle 70B. Finally, during period of time $T_3$ and $T_4$, the optimum accelerator pedal position $\theta_A^*$ accelerate vehicle 70B until it can beautifully follow the leading vehicle.

According to the second implementation, modulating accelerator and brake pedal reaction characteristic has accomplished the desired coordinated variations of the optimum accelerator and brake pedal positions $\theta_A^*$ and $\theta_B^*$.

Figure 17:
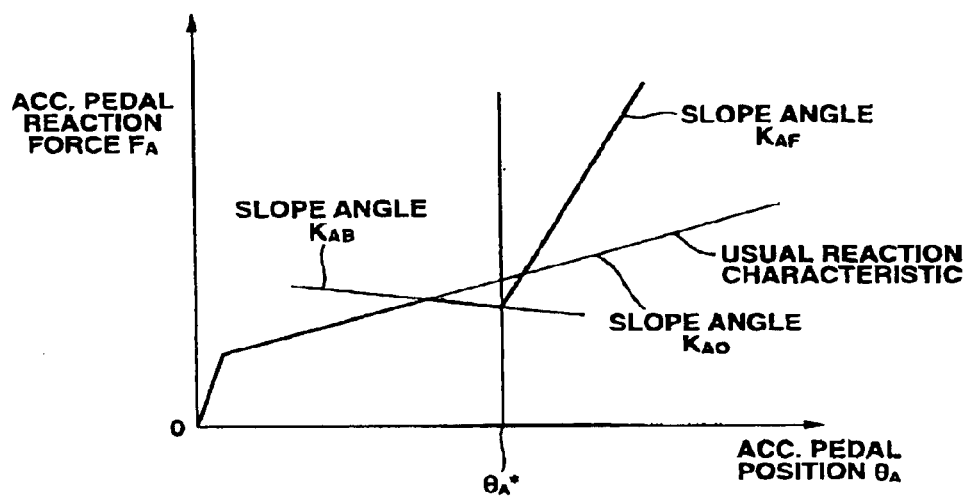
FIG. 17 is a graphical representation of one example of accelerator pedal reaction characteristic, which is provided at a moment of the curve of FIG. 16A, to prompt the vehicle operator to operating the accelerator pedal to the optimum pedal position.

FIG. 17 provides one example of accelerator pedal reaction characteristic, which is provided at a moment of the variation curve of FIG. 16A, to prompt the vehicle operator to operating the accelerator pedal at the optimum accelerator pedal position $\theta_A^*$ at the moment. The accelerator reaction characteristic of FIG. 17 is recessed from the usual reaction characteristic, as indicated by slope angle $K_{AO}$, at the optimum accelerator pedal position $\theta_A^*$. As accelerator pedal position $\theta_A$ moves to the right out of this optimum accelerator pedal position $\theta_A^*$, the accelerator pedal reaction force $F_A$ increases at slope angle of $K_{AF}$. As accelerator pedal position $\theta_A$ moves to the left out of this optimum accelerator pedal position $\theta_A^*$, the accelerator pedal reaction force $F_A$ increases at slope angle of $K_{AB}$.

The slope angles $K_{AF}$ and $K_{AB}$ are not fixed and determined by gradient of the collision possibility if deviated longitudinally from the optimum position. Such gradients can be given from isograms around the optimum position within the predicted hazard maps (see box 166 in FIG. 12). Operator manual effort to operate the accelerator pedal in a direction to increase longitudinal deviation from the optimum position is opposed by a reaction force determined by slope angle $K_{AF}$ or $K_{AB}$. If a rapid change in the collision possibility exits on the leading side of the optimum point, the slope angle $K_{AF}$ increases to provide increased reaction force. If a rapid change in the collision possibility exits on the trailing side of the optimum point, the slope angle $K_{AB}$ increases to provide increased reaction force. This reaction characteristic prompts the vehicle operator to operating the accelerator pedal to track the optimum path.

Figure 18:
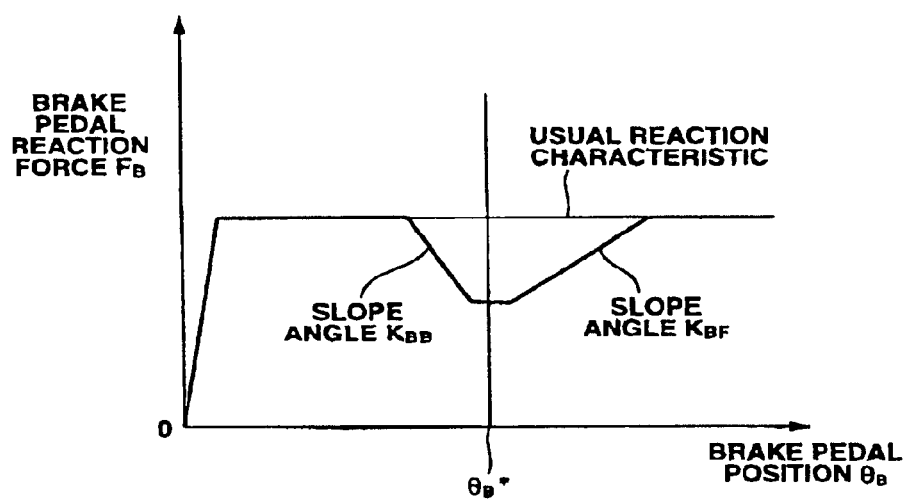
FIG. 18 is a graphical representation of one example of brake pedal reaction characteristic, which is provided at a moment of the curve of FIG. 16B, to prompt the vehicle operator to operating the brake pedal to the optimum pedal position.

FIG. 18 provides one example of brake pedal reaction characteristic, which is provided at a moment of the variation curve of FIG. 16B, to prompt the vehicle operator to operating the brake pedal at the optimum brake pedal position $\theta_B^*$ at the moment. The brake pedal reaction characteristic of FIG. 18 is recessed from the usual reaction characteristic, at the optimum brake pedal position $\theta_A^*$. As brake pedal position $\theta_B$ moves to the right out of this optimum brake pedal position $\theta_B^*$, the brake pedal reaction force $F_B$ increases at slope angle of $K_{BF}$. As brake pedal position $\theta_B$ moves to the left out of this optimum brake pedal position $\theta_B^*$ the brake pedal reaction force $F_B$ increases at slope angle of $K_{BB}$.

The slope angles $K_{BF}$ and $K_{BB}$ are not fixed and determined by gradient of the collision possibility if deviated longitudinally from the optimum position. Such gradients can be given from isograms around the optimum position within the predicted hazard maps (see box 166 in FIG. 12). Operator manual effort to operate the brake pedal in a direction to increase longitudinal deviation from the optimum position is opposed by a reaction force determined by slope angle $K_{BF}$ or $K_{BB}$. If a rapid change in the collision possibility exits on the leading side of the optimum point, the slope angle $K_{BB}$ increases to provide increased reaction force. If a rapid change in the collision possibility exits on the trailing side of the optimum point, the slope angle $K_{BF}$ increases to provide increased reaction force. This reaction characteristic prompts the vehicle operator to operating the brake pedal to track the optimum path.

At output box 172, the processor outputs first command indicative of the determined accelerator pedal reaction characteristic and second command indicative of the determined brake pedal reaction characteristic. The first command is applied to the modulator 144 of the actuator 140. Under the control of the modulator 144, servo motor 146 operates to provide the determined accelerator pedal reaction characteristic to the manual effort applied to the accelerator pedal by the vehicle operator. The second command is applied to the modulator 148 of the actuator 142. Under the control of the modulator 148, brake booster 150 operates to provide the determined brake pedal reaction characteristic to the manual effort applied to the brake pedal by the vehicle operator.

Third Implementation of the Invention

[First Embodiment]

Figure 20:
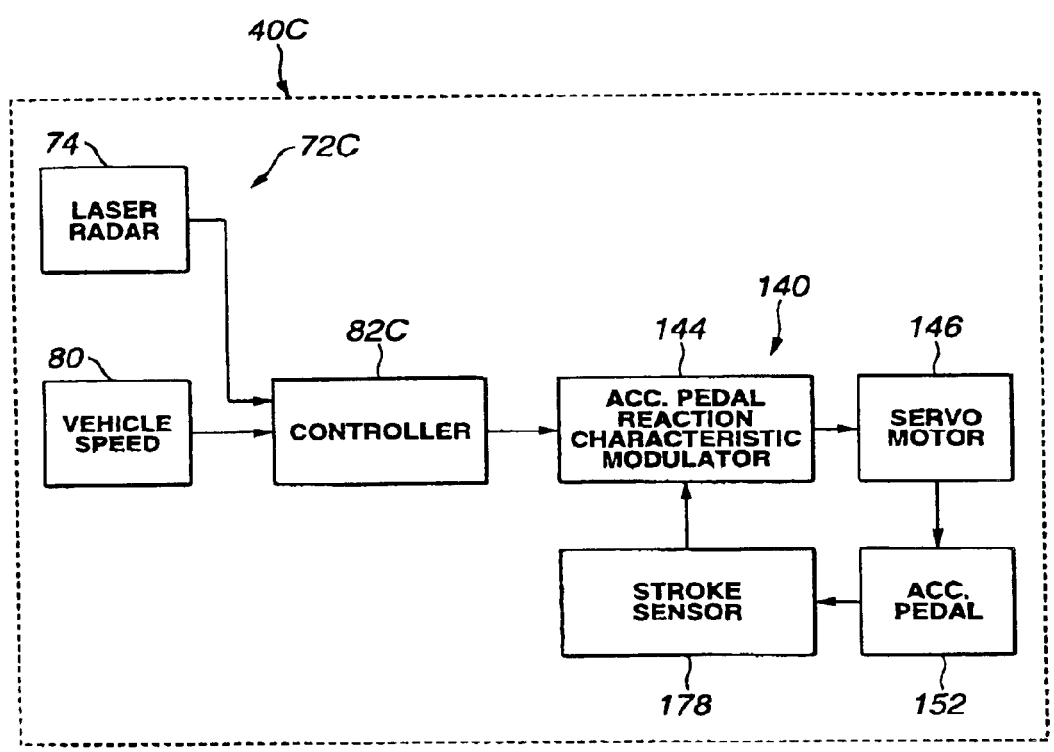
FIG. 20 is a block diagram showing hardware of a third exemplary implementation of the present invention.
Figure 21:
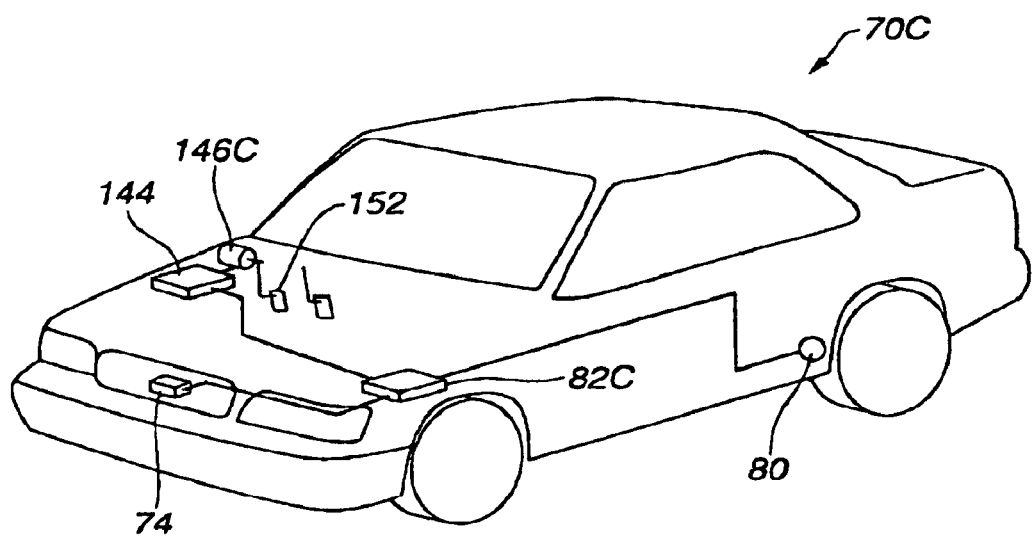
FIG. 21 is a view illustrating how the hardware of the third implementation is arranged on an automobile.

FIG. 20 provides hardware and FIG. 21 illustrates how the hardware is arranged on an automobile 70C.

In FIG. 20, the reference numeral 40C generally indicates a driving assist system. Driving assist system 40C includes an on board data acquisition system (DAS) 72C. DAS 72C, mounted to the vehicle 70C, includes laser radar 74 and a source of vehicle speed 80. The laser radar 74 and source of vehicle speed 80 are mounted to vehicle 70C in the same manner as the second implementation (see FIGS. 5 and 6).

In FIG. 20, driving assist system 40C includes a microprocessor based controller 82C. Controller 82C receives the acquired data from DAS 72C in the same manner as controller 82B receives the acquired data from DAS 72B. From source of vehicle speed 80, controller 82C receives information on the vehicle velocity $V_f$. From laser radar 74, controller 82B receives information on vehicle separation D between the subject vehicle 70C and the adjacent leading vehicle and relative velocity $V_r$ between them.

Controller 82C determines, by calculation for example, a first extent to which vehicle 70C has approached a leading vehicle from vehicle separation D between the two vehicles and relative velocity $V_r$ between them. Controller 82C determines current environment in a field around vehicle 70C from the first extent. Further, controller 82c predicts how the current environment will progress in future and uses the result of such prediction to output command to a controller called an accelerator pedal reaction characteristic modulator 144 of an accelerator reaction modulation actuator 140. Modulation actuator 140 includes a servo motor 146 and a stroke sensor 178.

Figure 22:
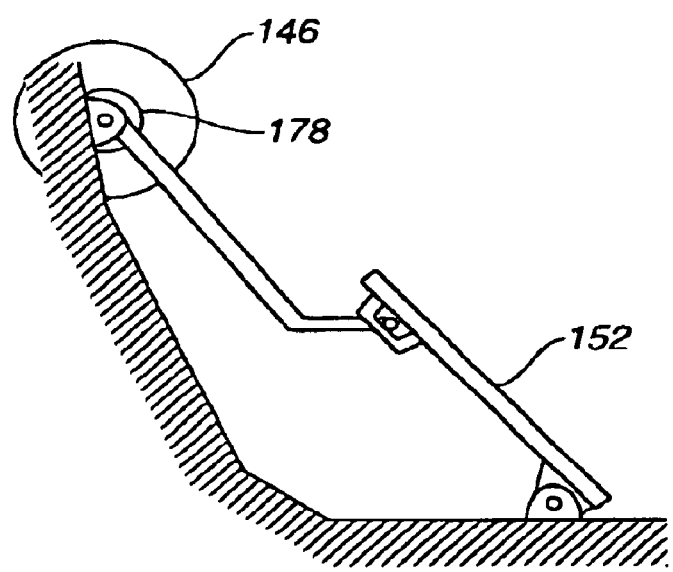
FIG. 22 is a view illustrating an accelerator pedal reaction modulation mechanism.

Referring also to FIG. 22, servo motor 146 and stroke sensor 178 are incorporated in a link mechanism of an accelerator pedal 152. Stroke sensor 178 senses the magnitude of operator manual effort applied to accelerator pedal 152. The output of stroke sensor 178 is fed to modulator 144. In response to command from modulator 144, servo motor 146 produces torque, modulating reaction force to the manual effort applied by vehicle operator to accelerator pedal 152.

Controller 82C receives information on vehicle separation D between vehicle 70C and a leading vehicle, information on relative velocity $V_r$ between the vehicles, and information on vehicle velocity $V_f$ of vehicle 70C from the acquired data by DAS 72C. Using the received information, controller 82C determines, by calculation for example, the first extent (=a first risk category) to which vehicle 70C has approached the leading vehicle, and a second extent (=a second risk category) to which vehicle 70C might be influenced due to a predictable change in movement of the leading vehicle. Controller 82C uses the first and second extents to predict future environment expressed in terms of risk perceived (RP), determines an accelerator pedal reaction command ΔF based on the RP. Command ΔF is applied to modulator 144. Modulator 144 controls servo motor 146 in response to command ΔF, thus modulating reaction force versus stroke characteristic of accelerator pedal 152.

Figure 23:
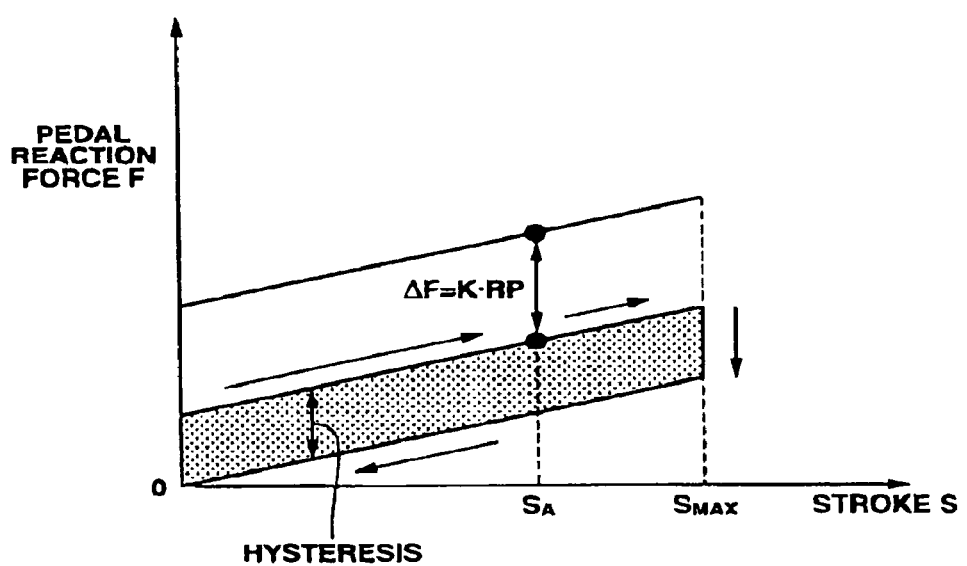
FIG. 23 is a graph illustrating the relationship between accelerator pedal reaction force and stroke.

In FIG. 23, a set of two parallel line segments interconnected by another set of two parallel line segments to enclose an area dotted illustrate usual reaction force characteristic. Under this condition, no additional force is applied to modulate the reaction force characteristic. With the accelerator pedal reaction modulation, this usual reaction force characteristic is elevated by ΔF over the whole range of stroke. As ΔF is proportional to RP, the vehicle operator can perceive through accelerator pedal 162 the current environment and predicted future environment in the field around vehicle 70C.

Figure 24:
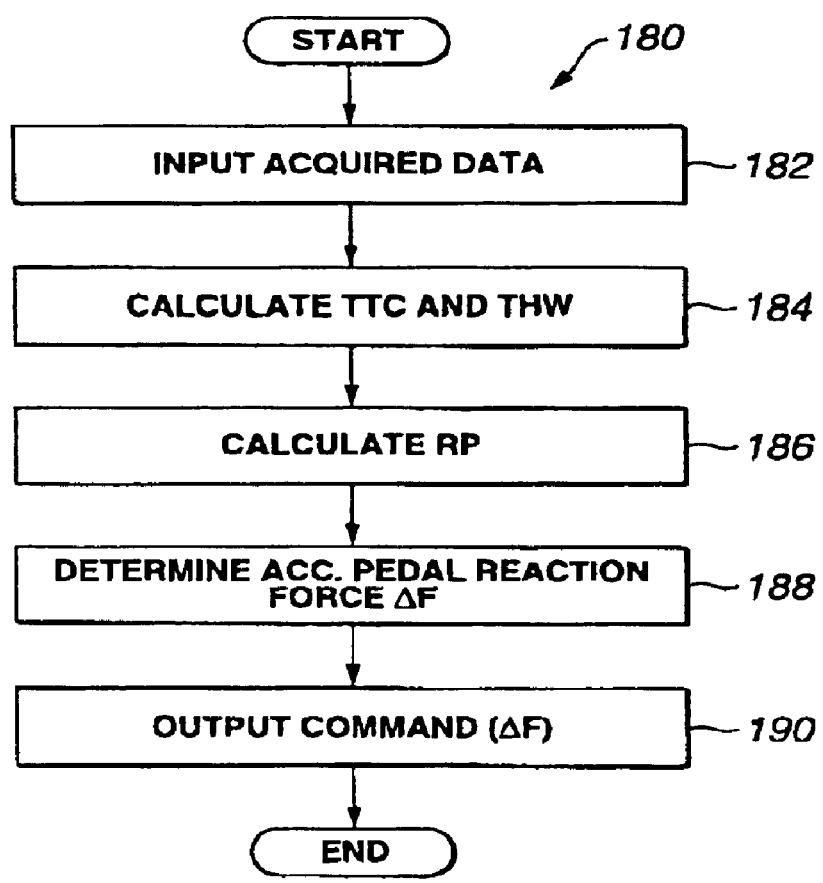
FIG. 24 is a flow diagram illustrating the operation of the third implementation.

The flow diagram in FIG. 24 illustrates a control routine of the third implementation. The control routine, generally indicated at 180, is executed at regular time intervals of 50 milliseconds.

At input box 182, the processor of controller 82C inputs acquired data by DAS 72C. What are read at box 182 include velocity $V_f$ of vehicle 70C, vehicle separation D between vehicle 70C and a leading vehicle, relative velocity $V_r$ between the vehicles, and velocity $V_a$ of the leading vehicle.

At box 184, the processor calculates time to contact (TTC) and time headway (THW).

We introduced the notion of TTC to quantify a first extent to which the subject vehicle 70C has approached a leading vehicle in the traffic scene illustrated in FIG. 2. This first extent is introduced to represent how much the vehicle 70C has approached the leading vehicle.

TTC is expressed as, $$TTC=D/V_r \qquad \text{Eq. 3}$$

where,
D=Vehicle separation between the vehicles in the traffic scene illustrated in FIG. 2
$V_r$=Relative vehicle velocity $V_f$-$V_a$.

In the traffic scene of FIG. 2, most operators perceived risk and operated the following vehicles for deceleration well before TTC becoming less than 4 seconds. We considered that, risk, which each vehicle operator perceived, prompted the operator to operate the vehicle longitudinally to resume sufficient vehicle separation. The shorter TTC, the greater the magnitude of risk, which the leading vehicle causes the vehicle operator of the following vehicle to perceive, is. However, there is some discrepancy between TTC and risk perceived by the vehicle operator. Thus, TTC only is insufficient to quantify or express the risk perceived by operator.

The presence of such discrepancy may be confirmed by considering a traffic scene where the relative velocity $V_r$ between the leading and following vehicles is zero. In this case, TTC is infinite irrespective of how short the vehicle separation D is. Apparently, the risk perceived by the operator of the following vehicle varies with different distances of vehicle separation D. The shorter the vehicle separation D, the bigger the risk perceived by the operator is. This is because the vehicle operator accounts for the magnitude of influence on TTC due to unpredictable drop in velocity $V_a$ of the leading vehicle.

Figure 25:
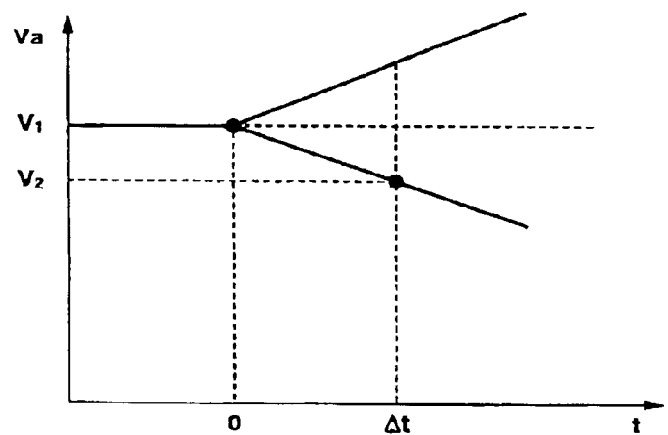
FIG. 25 is a timing diagram illustrating how, in a traffic scene in FIG. 2, a vehicle operator predicts a change in velocity of a leading vehicle.

With reference to FIG. 25, this section provides a further description on the above issue. Immediately before the moment t=0, the relative velocity $V_r$ between the leading and following vehicles is positive and fixed, and TTC has been updated by calculating the equation 3. In operating the following vehicle, the operator keeps on predicting the magnitude of an unpredictable change, particularly, a drop, in velocity $V_a$ of the leading vehicle, which might occur at the moment Δt after. Accurate prediction of $V_a$ at the moment Δt after is impossible, however. Thus, the operator tries to predict the velocity $V_a$ with considerable dispersion as illustrated in FIG. 25. In FIG. 25, if, at the moment Δt, the velocity $V_a$ drops to $V_2$ from $V_1$, TTC becomes shorter than expected Δt before, resulting in an increase in risk than expected. Predication of such increase in TTC from the current and past values of TTC is difficult.

To overcome this difficulty, according to the third implementation, we introduced the notion of time headway (THW). THW is a physical quantity quantifying a second extent to which TTC might be influenced if a change in velocity $V_a$ of a leading vehicle should occur. The second extent is introduced to represent how much a change in relative velocity $V_r$, if any in immediate future, might influence TTC. THW is expressed as, $$THW=D/V_a \qquad \text{Eq. 4}$$

or $$THW=D/V_f \qquad \text{Eq. 5.}$$

THW is a measure of a timer that is set to count when the leading vehicle reaches a point on a road and will be reset subsequently when the following vehicle will reach the same point. The longer TRW, the smaller the second extent is. That is, when THW is long, the first extent is not greatly influenced due to a change in $V_a$, if any, of the leading vehicle, so that a change in TTC is sufficiently small.

Using THW is to quantify the influence caused due to a future change in $V_a$. In his respect, the use of THW determined by $V_a$ is recommendable rather than the other THW determined by $V_f$. Besides, the former represents the risk that is perceived by the operator with better accuracy than the latter does. However, if a value of $V_a$ that is given by a measure of $V_f$ and a measure of $V_r$ is less reliable than a value of $V_f$, the use of THW determined by $V_f$ is recommendable. In the traffic scene where $V_a=V_f$, the equations 4 and 5 are equally recommendable.

With continuing reference to the flow diagram in FIG. 24, after calculating TTC and THW at box 184, the logic goes to box 186. At box 186, the processor uses TTC and THW to create a physical quantity that is indicative of risk perceived (RP) by the vehicle operator. We introduced the notion of RP, which we call "Risk Perceived", to represent the magnitude of risk, which a vehicle operator would perceive upon predicting future environment in a field around the vehicle. In the traffic scene illustrated in FIG. 2, the environment in the field around vehicle involves the presence of a leading vehicle. In creating the RP, we introduced the reciprocal of TTC (1/TTC) as the first extent and the reciprocal of THW (1/THW) as the second extent. According to the third implementation, they are summed to produce the RP, which is expressed as, $$RP=a(1/THW)+b(1/TTC) \qquad \text{Eq. 6,}$$

where b and a (b>a) are parameters weighting the first extent (1/TTC) and the second extent (1/THW), respectively, such that the second extent (1/THW) is less weighted than the first extent (1/TTC) is. The values of b and a are optimized after accounting for a statistics of values of THW and TTC collected in the traffic scene including leading and trailing vehicles. In this implementation, b=8 and a=1.

The equation 3 clearly reveals that time to contact TTC is a first risk category or component indicating how long it takes for a following vehicle to contact with a leading vehicle if it is assumed that the relative velocity $V_r$ between the vehicles is constant. The equations 4 and 5 reveal that time headway THW is a second risk category or component indicating how long it takes for the following vehicle to arrive at the point, which the leading vehicle has arrived at, from the instance of arrival of the leading vehicle if it is assumed that the relative velocity $V_r$ will be subject to a drop. Using the first and second risk categories TTC and THW, defined by current values of D, $V_f$, $V_a$ and $V_r$, in the equation 6 yields risk perceived RP, which represents a predicted future environment in the field around the vehicle. This operation is nothing but predicting a future environment in a field around the vehicle using current values of D, $V_f$, $V_a$ and $V_r$.

The RP can provide quantitative expression as to how much a following vehicle has approached a leading vehicle continuously over a range from its separating from the leading vehicle to its approaching same. The more it increases, the more strongly an operator perceives risk of excessively approaching the leading vehicle in immediate future.

Figure 26:
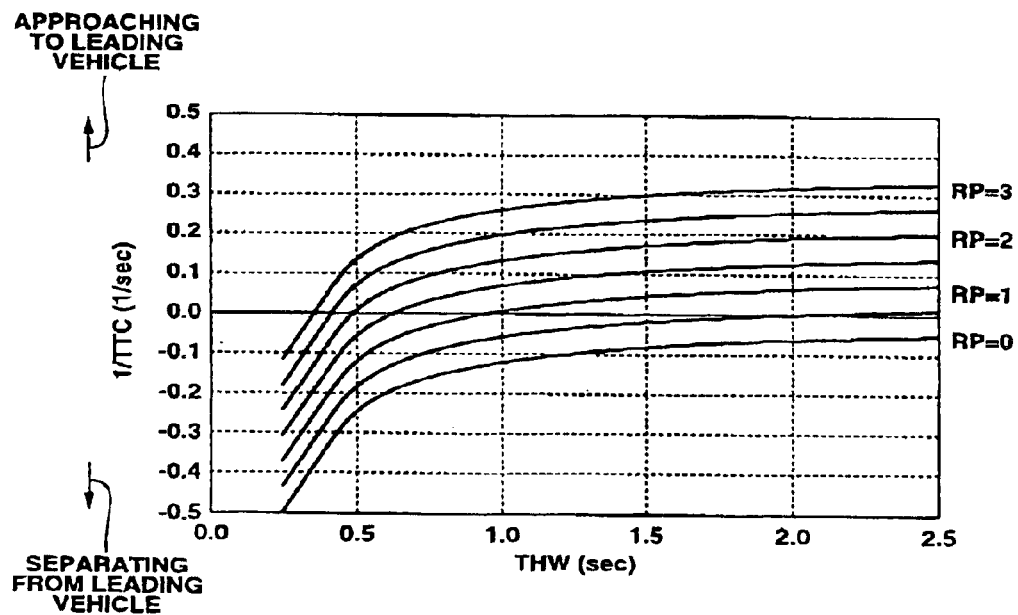
FIG. 26 is a RP map.

The RP map in FIG. 26 illustrates, within a THW–(1/TTC) plane, isograms of RP drawn based on the equation 6. The horizontal axis represents THW. The horizontal axis is a horizontal line originating at a value of 0.0 on the vertical axis and extending in the rightward direction. The vehicle is assumed to be following a leading vehicle with an unaltered relative velocity $V_r$. In FIG. 26, the vehicle is operating at some operating point on the horizontal axis. The further the operating point on the horizontal axis is distant from the vertical axis in the rightward direction, the further the vehicle is separated from the leading vehicle. The vertical axis represens the reciprocal of TTC (1/TTC). Now, when the vehicle is assumed to start approaching the leading vehicle due to a drop in relative velocity $V_r(=V_f-V_a)$. In FIG. 26, the operating point at which the vehicle is operating moves from the operating point on the horizontal axis as directed by an approaching motion vector. This motion vector is a resultant vector of a horizontal vector component oriented in the leftward direction and a vertical vector component in the upward direction. Next, when the vehicle is assumed to start separating from the leading vehicle due to an increase in relative velocity $V_r$. In FIG. 26, the operating point at which the vehicle is operating moves from the operating point on the horizontal axis as directed by a separating motion vector. This motion vector is a resultant vector of a horizontal vector component oriented in the rightward direction and a vertical vector component in the downward direction.

The operating point approaching the leading vehicle moves through an upper section of the isograms of RP in a direction increasing RP, while the separating point separating the leading vehicle moves through a lower or the remaining section of the isograms RP in a direction reducing RP. The upper and lower sections are interconnected at the horizontal axis. In the upper section, lines of the isograms extend from vertically spaced generally equidistant start points on the right edge of the RP map to differently spaced intermediate points on the horizontal axis, respectively. The intermediate points are arranged such that a distance between the adjacent two points of them becomes narrower and narrower as the THW becomes shorter and shorter. The lines of the isograms curve downwardly from the start points to the intermediate points to define a range of the highest or higher values of the RP. Such range is reached at a value of the reciprocal of TTC (1/TTC), which becomes smaller as the value of THW becomes smaller. Further, with the same value of THW, the higher the reciprocal of TTC (1/TTC), the higher the RP is. Besides, with the same value of the reciprocal of TTC (1/TTC), the shorter the THW, the higher the RP is. In the lower section, lines of the isograms extend from vertically spaced generally equidistant start points on a vertical line, not illustrated, near the left edge of the RP map to the differently spaced intermediate points on the horizontal axis and a point on the right edge of the map, respectively. The lines of the isograms curve upwardly from the start points to the intermediate points to define a range of the lowest or zero value of the RP.

With continuing reference to the flow diagram of FIG. 24, after calculation of the RP at box 186, the logic goes to box 188.

At box 188, the processor uses the RP to determine an accelerator pedal reaction command ΔF, which is expressed as, $$\Delta F = K \cdot RP \qquad \text{Eq. 7}$$

where,
K Constant determined for adjustment.

As readily seen from the RP map in FIG. 26, the RP takes various values continuously over different values of THW and 1/TTC of environment in a space around the vehicle. The RP determines the command ΔF as expressed by the equation 7, which, in turn, determines accelerator pedal reaction force. This makes it possible for the operator to continuously know information how much the vehicle has approached to the leading vehicle.

At the next box 190, the processor outputs the command ΔF and applies it to the accelerator pedal reaction characteristic modulator 144 (see FIG. 20).

The preceding description on the equation 6 and the RP map in FIG. 26 clearly reveals that the RP takes various values continuously even if the first extent (1/TTC) and/or the second extent (1/THW) are subject to a change. Such smooth and continuous change in the RP makes it possible to vary accelerator pedal reaction force accordingly. Hence, the operator can recognize varying of environment through smooth and continuous change in accelerator pedal reaction force.

[Second Embodiment]

The second embodiment of the third implementation is substantially the same as the first embodiment thereof except the manner of producing the RP. In the first embodiment, the RP was expressed as the equation 6. In this second embodiment, RP is expressed as, $$RP = \max\{a/THW, b/TTC\} \qquad \text{Eq. 8}$$

where, b and a (b>a) are parameters weighting the first extent (1/TTC) and the second extent (1/THW), respectively, such that the second extent (1/THW) is less weighted than the first extent (1/TTC) is. The values of b and a are optimized after accounting for a statistics of values of THW and TTC collected in the traffic scene including leading and trailing vehicles. In this implementation, b=8 and a=1.

According to the equation, the larger one of a/THW and b/TTC is selected and used as RP.

Figure 27:
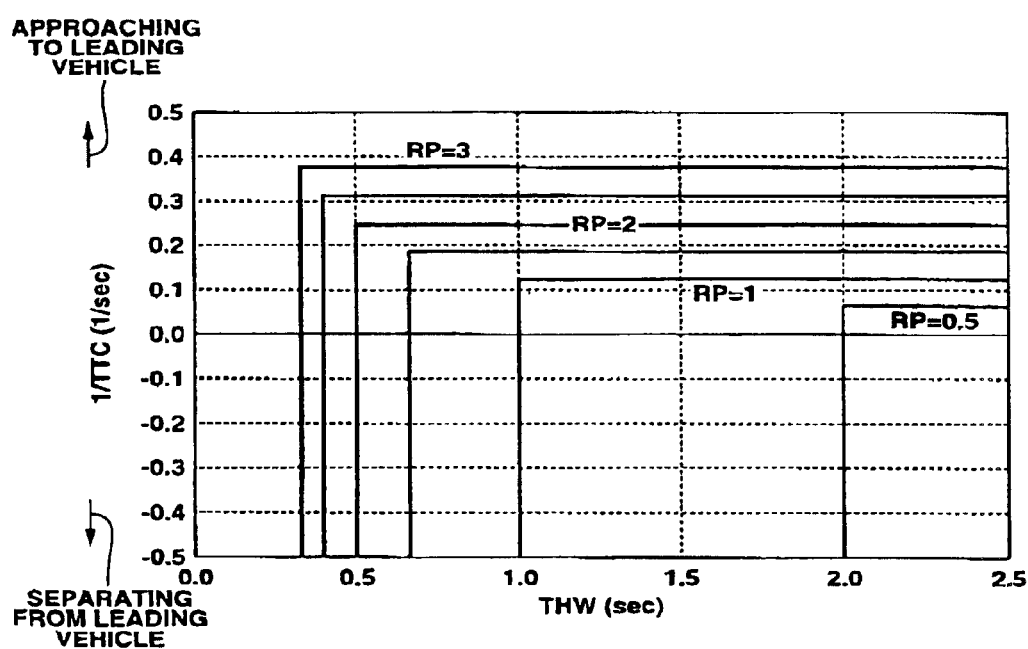
FIG. 27 is another RP map.

The RP map in FIG. 27 illustrates, within a THW–(1/TTC) plane, isograms of RP drawn based on the equation 8.

The horizontal axis represents THW. The horizontal axis is a horizontal line originating at a value of 0.0 on the vertical axis and extending in the rightward direction. The vertical axis represents the reciprocal of TTC (1/TTC).

Prior to a further description on the RP map in FIG. 27, this section provides a brief review of the equation 6 and its RP map in FIG. 26. When the vehicle is assumed to be separating from the leading vehicle, the relative vehicle velocity $V_r$ is less than zero, and the term 1/TTC of the equation 6 is less than zero because TTC corresponds to $D/V_r$. According to the equation 6, with the same THW, the RP takes various small values for different minus values of 1/TTC. Because the RP takes such small values, the accelerator pedal reaction command ΔF takes small values, accordingly.

According to the equation 8 and the RP map in FIG. 27, the above-mentioned influence on the RP when the vehicle is separating from the leading vehicle is eliminated. This is because the equation 8 selects a/THW as RP when b/TTC is less than 0. With the same THW, the RP does not drop below a value that is determined by a current value of THW over different minus values of the reciprocal of 1/TTC. This provides a gradual reduction in RP when the vehicle is separating from the leading vehicle.

According to the third implementation, the RP is indicative of the magnitude of risk actually felt or perceived by an operator of a vehicle when, for example, involved in a traffic scene including a leading vehicle ahead. In the first embodiment, the RP is expressed by the equation 6 and illustrated in FIG. 26. In the second embodiment, the RP is expressed by the equation 8 and illustrated in FIG. 27. The RP determines the accelerator pedal reaction command ΔF as expressed by the equation 7. The command ΔF determines the magnitude of accelerator pedal reaction force to the manual effort applied to the accelerator pedal 152 by the operator. The equation 7 clearly indicates that the accelerator pedal reaction force is proportional to the RP. Thus, the accelerator pedal reaction force increases reflecting an increase in the risk actually perceived by the vehicle operator. The increase in accelerator pedal reaction force is transmitted to and felt by the operator through one's foot on the accelerator pedal 152, prompting the operator to allowing the accelerator pedal 152 to return to the released position. In other words, the operator is prompted to operating the vehicle longitudinally in a manner to reduce the risk, which the operator is caused to perceive by the leading vehicle.

It will be appreciated, as an advantage, that the operator normally perceives the risk when the accelerator pedal reaction force is increased to prompt the operator to operating the vehicle in such a direction as to eliminate or at least reduce the risk. Accordingly, the operator is prompted to operating the vehicle in the direction with little objection to such driving assist.

Expressing in concrete terms, upon recognition of an increase in the RP by an increase in accelerator pedal reaction force, the operator is inspired to allow the accelerator pedal 152 to move toward the released position. The increase in accelerator pedal reaction force causes the operator foot to move automatically to release the accelerator pedal 152, prompting the operator to operating the vehicle in the direction to eliminate or at least reduce the risk. Besides, the increase in accelerator pedal reaction force discourages the operator from further depressing the accelerator pedal 152 to reduce the vehicle separation.

In the first embodiment of the third implementation, the equation 6 is used to produce RP. As is readily seem from the RP map in FIG. 26, the RP varies continuously, so that the accelerator pedal reaction command ΔF and the accelerator pedal reaction force vary continuously, accordingly. Via such accelerator pedal reaction force, the operator is kept being informed of varying of environment in a field around the vehicle with different values of 1/TTC and THW.

In the second embodiment of the third implementation, the equation 8 is used to produce RP. As illustrated in FIG. 27, the RP does not vary rapidly when the vehicle is separating from the leading vehicle where the values of 1/TTC are less than zero and very small. Because the RP does not vary rapidly, it is possible to control accelerator pedal reaction force, without any sudden change.

In the embodiments according to the third implementation, time to contact TTC and time headway THW are provided by calculation of simple equations involving easily measurable or obtainable physical quantities like velocity $V_f$ of trailing vehicle, velocity $V_a$ of leading vehicle, and vehicle separation D. This works in suppressing an increase, if any, in number of component parts of a driving assist system.

As has been described in connection with the equations 6 and 8, the parameter b is greater than the parameter a (b>a) such that the second extent (1/THW) is less weighted than the first extent (1/TTC) is. In the embodiments of the third implementation, the first extent (1/TTC) is heavily weighted than the second extent (1/THW) in producing the RP.

Fourth Implementation of the Invention

Figure 28:
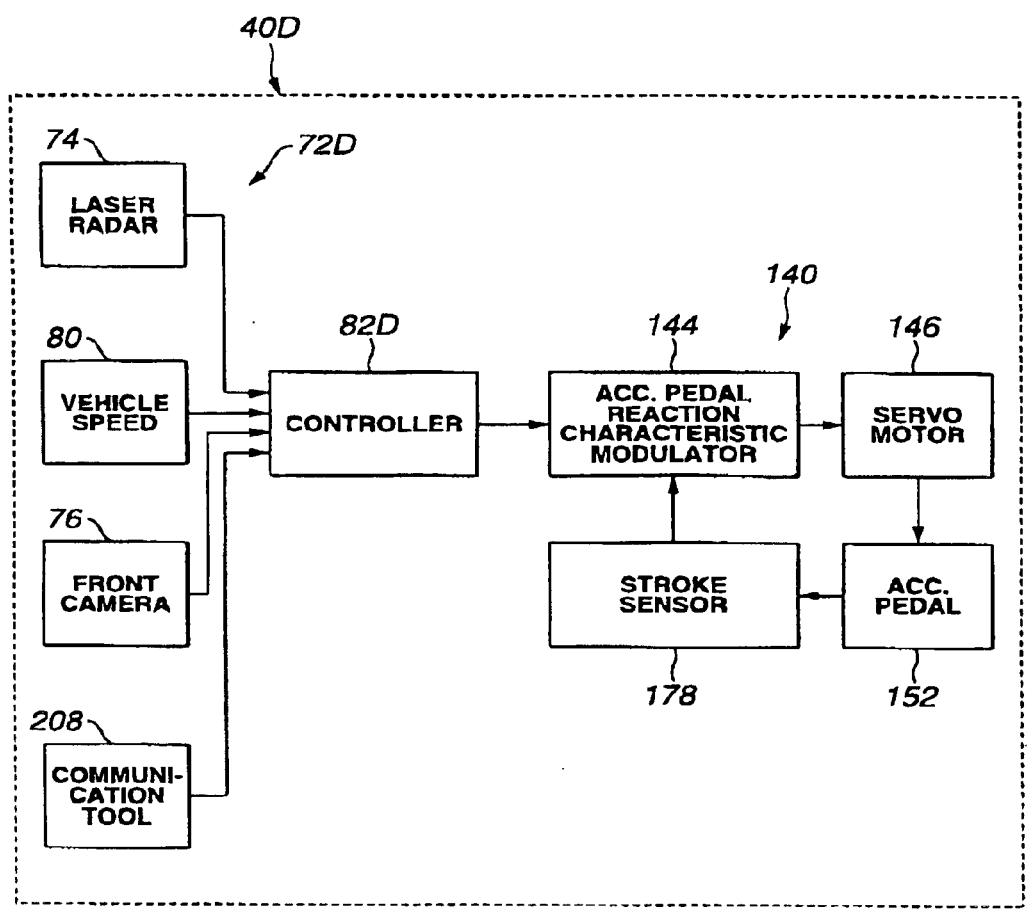
FIG. 28 is a block diagram showing hardware of a fourth exemplary implementation of the present invention.
Figure 29:
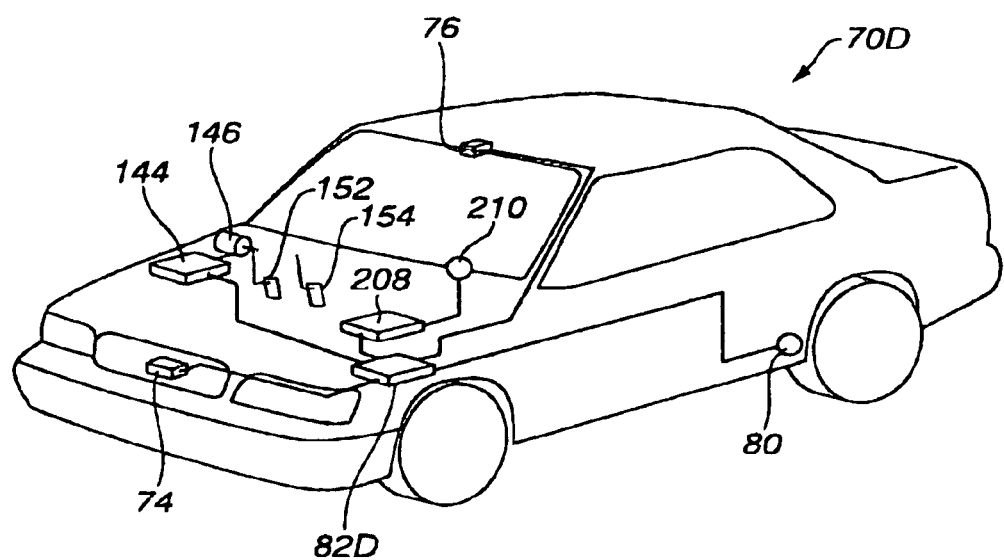
FIG. 29 a view illustrating how the hardware of the third implementation is arranged on an automobile.

FIG. 28 provides hardware and FIG. 29 illustrates how the hardware is arranged on an automobile 70D.

In FIG. 28, the reference numeral 40D generally indicates a driving assist system. Driving assist system 40D is substantially the same, in hardware, as driving assist system 40C except the provision of a front camera 76 and a communication tool 208. Thus, the like reference numerals are used to indicate like parts or portions throughout FIGS. 20, 21, 28 and 29. The front camera 76 and communication tool 208 are parts of an on board data acquisition system (DAS) 72D mounted to the vehicle 70D. DAS 72D further includes laser radar 74 and a source of vehicle speed 80. DAS 72D is substantially the same as DAS 72B shown in FIG. 5 except the provision of communication tool 208 mounted to the vehicle 70D. Communication tool 208 includes an infrastructure receiver or a GPS receiver and receives information from an antenna 210 attached to the vehicle 70D. In the same manner as the second implementation (see FIGS. 5 and 6), the laser radar 74, front camera 76, and source of vehicle speed 80 are mounted to the vehicle 70D.

Driving assist system 40D includes a microprocessor based controller 82D. Controller 82D receives information on vehicle separation D between vehicle 70D and a leading vehicle, information on relative velocity $V_r$ between the vehicles, and information on velocity $V_f$ of vehicle 70D from the acquired data by laser radar 74 and source of vehicle speed 80 of DAS 72D. Controller 82D also receives information on the leading vehicle after processing the image data captured by front camera 70. The processing of the image data includes filtering and image pattern recognition. Such processing may be carried out within or outside of controller 82D. Controller 82D receives current and future information ahead of vehicle 70D from communication tool 208. Such information captured by communication tool 208 via antenna 210 will be later described.

Using the received information, controller 82D determines, by calculation for example, the first extent 1/TTC to which vehicle 70D has approached the leading vehicle. Controller 82D determines a period of time $\tau_p$ in response to the current value of the first extent 1/TTC, and predicts a future value of the first extent the determined period of time after as a future environment in a field around vehicle 70D. In this implementation, a risk perceived RP by operator expresses the future environment. Based on the RP, controller 82D determines an accelerator pedal reaction command ΔF. Command ΔF is applied to an accelerator pedal reaction characteristic modulator 144. Modulator 144 controls a servo motor 146 in response to command ΔF, thus modulating reaction force versus stroke characteristic of an accelerator pedal 152.

Figure 30:
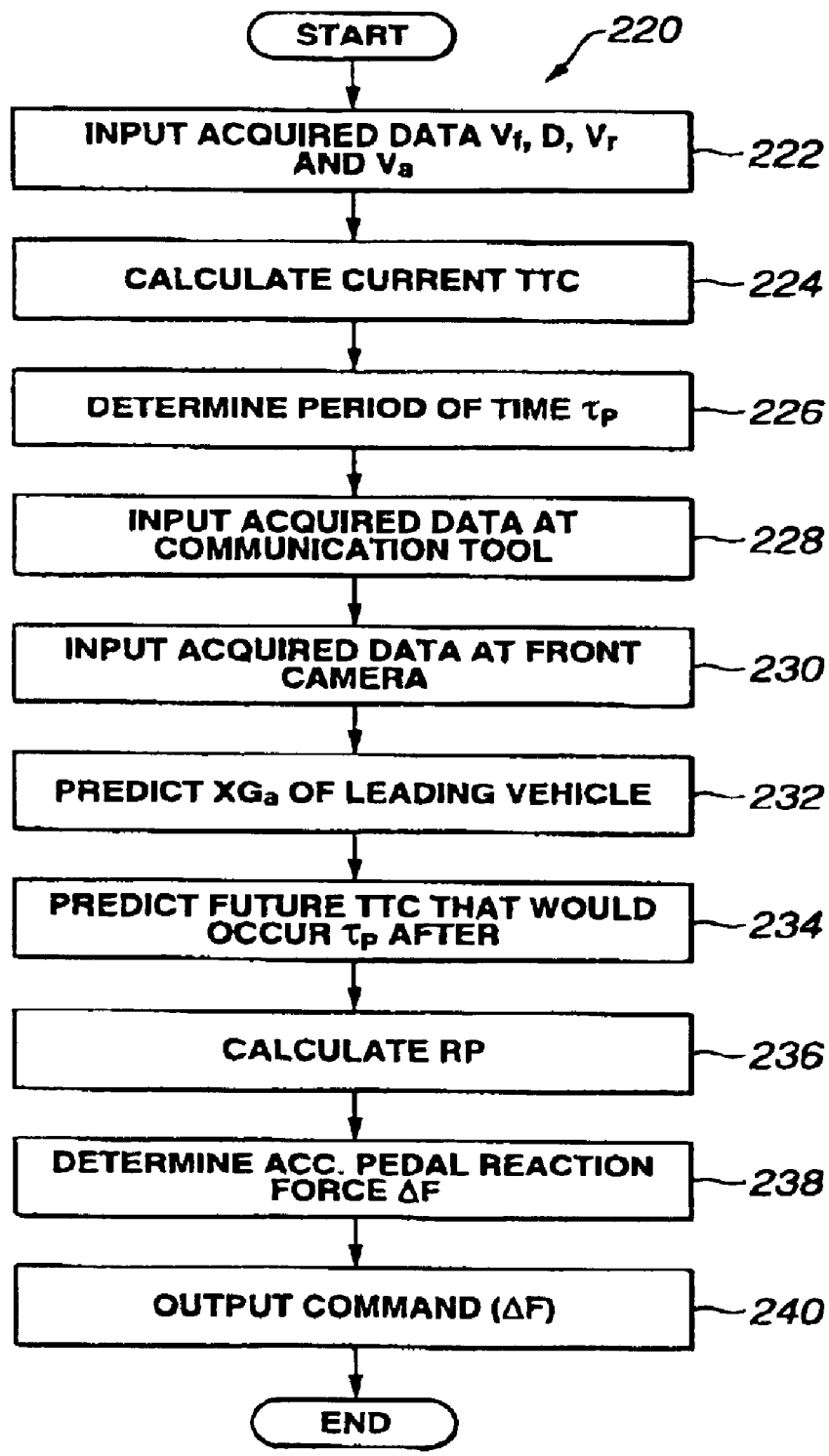
FIG. 30 is a flow diagram illustrating the operation of the fourth implementation.

The flow diagram in FIG. 30 illustrates a control routine of the fourth implementation. The control routine, generally indicated at 220, is executed at regular time intervals of 50 milliseconds.

At input box 222, the processor of controller 82D inputs acquired data by DAS 72D. What are read at box 222 include velocity $V_f$ of the vehicle 70D, vehicle separation D between vehicle 70D and a leading vehicle, relative vehicle velocity $V_r$ between the vehicles, and velocity $V_a$ of the leading vehicle.

At box 224, the processor calculates time to contact (TTC) that is expressed by the equation 3. As mentioned before in the third implementation, time to contact TTC is introduced to quantify a first extent to which the subject vehicle 70D has approached a leading vehicle in the traffic scene illustrated in FIG. 2. As is readily seen from the equation 3, time to contact TTC indicates how much it takes for the subject vehicle to come into contact with a leading vehicle. When velocity $V_a$ is higher than velocity $V_r$, the relative velocity $V_r$ is negative. In this case, time to contact TTC is negative.

At box 226, the processor determines a period of time $\tau_p$, which indicates how many seconds to come prior to a future environment to be predicted, in response to the time to contact TTC. The period of time $\tau_p$ is expressed as, $$\tau_p = f(1/TTC) \qquad \text{Eq. 9.}$$

Figure 31:
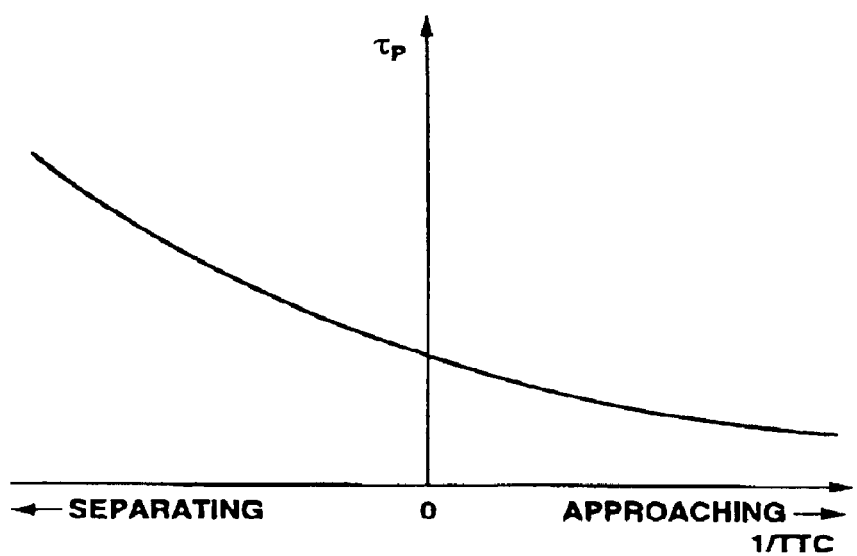
FIG. 31 is a graphical representation of a function determining a period of time that is used for prediction of a future environment in a field around the vehicle.

This function involves, as a variable, the reciprocal of TTC. The fully drawn curve in FIG. 31 illustrates this function. As shown in FIG. 31, the larger the reciprocal of TTC (1/TTC), the smaller the period of time $\tau_p$ is.

The period of time $\tau_p$ corresponds to the magnitude of risk that is felt or perceived by the vehicle operator. In the case where time to contact TTC is negative or long so that the first extent (1/TTC) is small, the subject vehicle 70D separates sufficiently from the leading vehicle. The current environment in the field around vehicle 70D does not require urgent attention by the operator. In such environment, the operator can afford to predict future environment long time to come to account for all available potential risk. Thus, the period of time $\tau_p$ is long. In the case where time to contact TTC is short so that the first extent (1/TTC) is large, the subject vehicle 70D has approached the leading vehicle. The current environment in the field around vehicle 70D indicates the presence of risk in immediate future. In such environment, the operator will pay attention to the leading vehicle and cannot afford to predict future environment long time to come to account for all available potential risk. Thus, the period of time $\tau_p$ is short.

With continuing reference to the flow diagram in FIG. 30, after determining the period of time $\tau_p$ at box 226, the logic goes to box 228. At box 228, the processor inputs the acquired data at communication tool 208. What is read at box 228 includes;

1. Operating state of a leading vehicle (such as, velocity $V_a$ and acceleration/deceleration) that is obtained through intervehicle communication; and
2. Traffic condition and road condition in front of the subject vehicle, which are obtained through infrastructure communication.

The use of intervehicle communication is limited to the case where the leading vehicle has intervehicle communication tool.

At the next box 230, the processor inputs the acquired image data at front camera 76. The image data covering the front view of vehicle 70D is subject to image and pattern recognition for the processor to determine the presence of a leading vehicle and whether its rear brake lamps are turned "on" or "off". The information as to the state of the brake lamps is used later for predicting the magnitude of deceleration of the leading vehicle.

At box 260, the processor predicts deceleration $XG_a$ of the leading vehicle. If the leading vehicle is capable of performing intervehicle communication, the processor inputs the information on deceleration $XG_a$ of the leading vehicle out of the acquired data through the intervehicle communication. If the leading vehicle is not capable of performing the intervehicle communication, the processor predicts the deceleration $XG_a$ in the following manner.

First, the processor determines, out of the acquired image data from the front camera 76, whether or not the brake lamps of the leading vehicle is turned "on". If this is the case, the processor measures, using a timer, for example, the elapse of time when the brake lamps are turned "on". Using the measure of the elapse of time and the variation of velocity $V_a$ of the leading vehicle, the processor predicts the deceleration $XG_a$. For example, if the measure of the elapse of time is less than 0.5 seconds, the processor sets a predetermined value as a virtual deceleration value of the leading vehicle. If the measure of the elapse of time is not less than 0.5 seconds, the processor determines a predicted value by calculation out of the rate of variation of past values of velocity $V_a$ of the leading vehicle.

The predicted deceleration $XG_a$ of the leading vehicle is corrected accounting for the homogeneous degree of traffic flow. The homogeneous degree of traffic flow is predicted based on the traffic congestion of the road, which may be obtained, at box 228, out of the acquired data from the communication tool 208. The logic is such that the homogeneous degree of traffic flow is high when the traffic is congested and the variation of vehicle velocity $V_a$ is small. The processor corrects the predicted deceleration $XG_a$ in response to the predicted homogeneous degree of traffic flow. For example, the processor corrects the predicted deceleration $XG_a$ such that the predicted deceleration $XG_a$ decreases as the predicted homogeneous degree of traffic flow increases. This is because a vehicle will not be accelerated or decelerated greatly when the road is congested and the homogeneous degree of traffic flow is high.

At the next block 234, the processor predicts future value of the first extent (TTC) that would occur $\tau_p$ after, using the current value of the first extent (TTC) obtained at box 224, the period of time $\tau_p$ determined at box 226, and the deceleration $XG_a$ predicted at box 232. First, the processor calculates velocity of the subject vehicle 70D, velocity of the leading vehicle, and the vehicle separation between the vehicles. The processor calculates deceleration $XG_f$ of the subject vehicle 70D based on the current velocity $V_f$. When it is assumed that deceleration $XG_f$ and $XG_a$, remains unaltered during the period of time $\tau_p$, future values of $V_f$, $V_a$ and D are expressed as, $$V_f(t_0+\tau_p)=V_f(t_0)+XG_f\times\tau_p \qquad \text{Eq. 10}$$

$$V_a(t_0+\tau_p)=V_a(t_0)+XG_a\times\tau_p \qquad \text{Eq. 11}$$

$$D(t_0+\tau_p)=D(t_0)-V_r\times\tau_p+(1/2)\times(XG_a-XG_f)\times\tau_p^2 \qquad \text{Eq. 12}$$

Using the results given by calculations of the above equations 10–12, the processor predicts the future TTC, which is expressed as, $$TTC(t_0+\tau_p)=D(t_0+\tau_p)/\{(V_f(t_0+\tau_p)-V_a(t_0+\tau_p)\} \qquad \text{Eq. 13}$$

where, $t_0$ is the current moment.

At box 236, the processor predicts future environment by calculating RP, which is expressed as, $$RP=b/TTC(t_0+\tau_p) \qquad \text{Eq. 14.}$$

At box 238, the processor uses the RP to determine an accelerator pedal reaction command ΔF, which is expressed by the equation 7.

At the next box 240, the processor outputs the command ΔF and applies it to the accelerator pedal reaction characteristic modulator 144 (see FIG. 28).

According to the fourth implementation, the period of time $\tau_p$ is determined as a function of time to contact TTC. Time to contact TTC is determined based on $V_f$, $V_a$, $V_r$ and D. Using the information from the acquired data by front camera 76 and communication tool 208, the deceleration of a leading vehicle $XG_a$ is predicted. Using this deceleration $XG_a$, a future value of TTC that would occur $\tau_p$ after is predicted. Risk perceived PR is determined as a function of the reciprocal of this future value of TTC. Finally, the RP is used to determine accelerator pedal reaction command ΔF.

According to the fourth implementation, a future value of extent to which vehicle 70D might approach a leading vehicle is predicted from a current value of the extent. This future value of the extent corresponds to the real risk perceived or felt by the operator. In this implementation, RP (risk perceived) is indicative of this future value. The RP is predicted as a quantity indicative of future environment in a field around vehicle 70D. Accounting for the predicted RP, the accelerator pedal reaction control is performed.

The period of time $\tau_p$ is used for prediction of a future value of RP. The period of time $\tau_p$ is variable with the extent to which vehicle 70D has approached the leading vehicle. The faster the vehicle approaches the leading vehicle, the more immediate future is selected for the prediction. This has provided an accelerator pedal reaction control that corresponds to the magnitude of risk actually perceived or felt by operator. Like the previously described third implementation, the operator is continuously kept informed of how fast the vehicle is approaching the leading vehicle through the magnitude of reaction force felt during manipulation of accelerator pedal.

As different from the third implementation, the deceleration $XG_a$ of the leading vehicle, which is determined on the acquired data at front camera 76 and/or communication tool 208, is used. The use of deceleration $XG_a$ has enhanced prediction of future environment in a manner more closely corresponding to the magnitude of risk actually perceived by operator.

In the fourth implementation, a current value and a future value of time to contact TTC are provided by calculation of equations involving, as variables, such physical quantities as vehicle speed and vehicle separation. This has lead to the minimal number of new components needed for installing a driving assist system in a vehicle. Using communication tool 208 to receive information on deceleration $XG_a$ for use in the predication enhances the accuracy of a future value of TTC.

In the fourth implementation, both front camera 76 and communication tool 208 are used to determine deceleration $XG_a$. The present invention is not limited to this example. Another example is the use of front camera 76 or communication tool 208. Further example is the use of information provided by laser radar 74 or source of vehicle speed 80. A future value of TTC as determined using such deceleration $XG_a$ as predicted is satisfactorily reliable.

In the fourth implementation, laser radar 74 is used. Such laser radar may be replaced by millimeter radar or radar of other type.

Fifth Implementation of the Invention

The fifth implementation is substantially the same as the third implementation except the provision of producing a selected one of different alert categories to be informed of via an appropriate alarm. Thus, the same technique as in the third and fifth implementations is used in determining TTC and THW.

Figure 32:
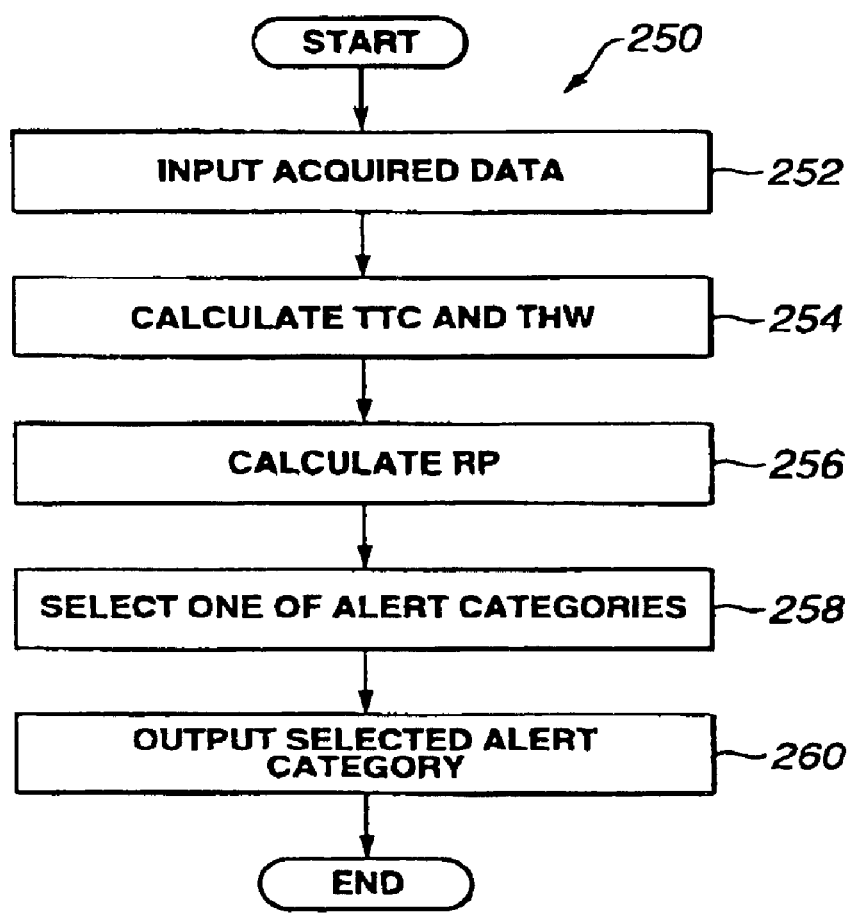
FIG. 32 is a flow diagram illustrating the operation of a first embodiment of a fifth exemplary implementation of the present invention.

The flow diagram of FIG. 32 illustrates a control routine of a first embodiment of the fifth implementation. The control routine, generally indicated at 250, is executed at regular time intervals of 50 milliseconds.

The control routine 250 is substantially the same as the control routine 180 illustrated in FIG. 24 in that boxes 252, 254 and 256 correspond to boxes 182, 184 and 186, respectively. A description on the boxes 252, 254 and 256 is hereby omitted for brevity. The following paragraph provides a description on two boxes 258 and 260 that follow box 256.

In FIG. 32, at box 258, the processor of controller 82C (see FIG. 20) selects one of alert categories in response to the RP. Various alert categories are stored for different ranges in magnitude of RP. For example, alert category elevates as RP increases, in magnitude, into the adjacent higher range from a current range. Each alert category may contain the repetition rate of alarm such that the repetition rate of alarm elevates with elevation of alert category. At output box 260, the processor outputs the selected alert category to the alarm.

Setting alert category in response to the RP as described above will keep operator informed of the magnitude of risk when vehicle has approached a leading vehicle and/or when influence due to a predicted future change in environment is great.

In this embodiment, the RP expressed by the equation 6 has been used. Alternatively, RP expressed by the equation 8 or 14 may be used. An example using the equation 14 will be explained below.

Figure 33:
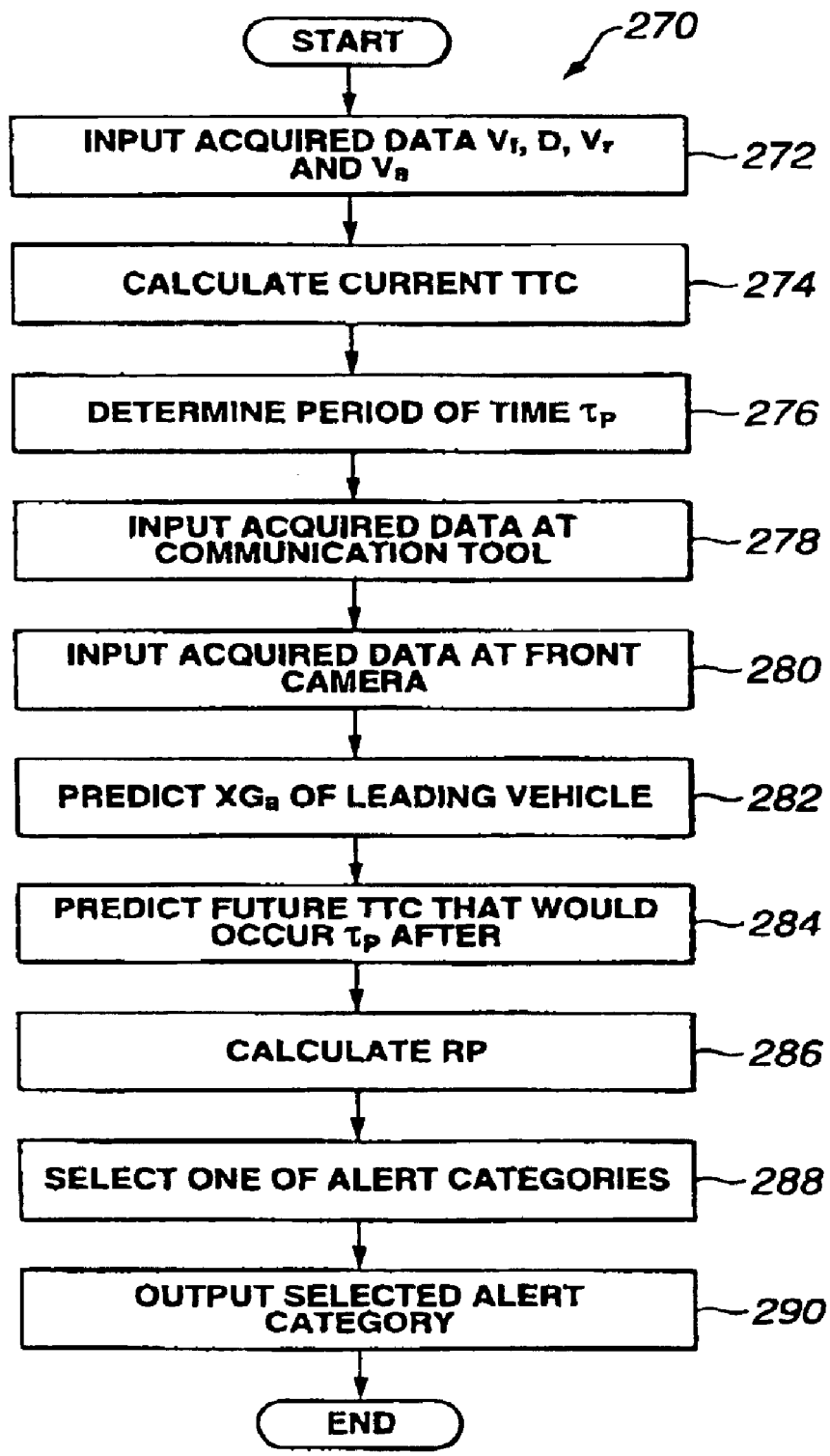
FIG. 33 is a flow diagram illustrating the operation of a second embodiment of the fifth exemplary implementation of the present invention.

The flow diagram of FIG. 33 illustrates a control routine of a second embodiment of the fifth implementation. The control routine, generally indicated at 270, is executed at regular time intervals of 50 milliseconds.

The control routine 270 is substantially the same as the control routine 220 illustrated in FIG. 30 in that boxes 272, 274, 276, 278, 280, 282, 284 and 286 correspond to boxes 222, 224, 226, 228, 230, 232, 234 and 236, respectively. A description on the boxes 272, 274, 276, 278, 280, 282, 284 and 286 is hereby omitted for brevity. The following paragraph provides a description on two boxes 288 and 290 that follow box 286.

In FIG. 33, at box 288, the processor of controller 82D (see FIG. 28) selects one of alert categories in response to the RP that has been determined at box 286. Various alert categories are stored for different ranges in magnitude of RP. For example, alert category elevates as RP increases, in magnitude, into the adjacent higher range from a current range. Each alert category may contain the repetition rate of alarm such that the repetition rate of alarm elevates with elevation of alert category. At output box 290, the processor outputs the selected alert category to the alarm.

Setting alert category in response to the RP as described above will keep operator informed of the magnitude of risk when vehicle has approached a leading vehicle and/or when influence due to a predicted future change in environment is great.

In the embodiments of the fifth implementation, the repetition rate of alarm has been varied for different alert categories. The invention is not limited to the repetition rate of alarm. Another example is to vary the volume and/or tone of alarm for different alert categories. Other example is to use various kinds of voice for different alert categories.

Sixth Implementation of the Invention

The sixth implementation is substantially the same as the third, fourth and fifth implementations in the use of equation 6 in determining the RP. However, according to the sixth implementation, the use of equation 6 is limited to provide a new RP, which does not keep operator from operating an automobile 70C (see FIGS. 20–24) approach to a leading vehicle when the vehicle separation D is sufficiently long.

Figure 34:
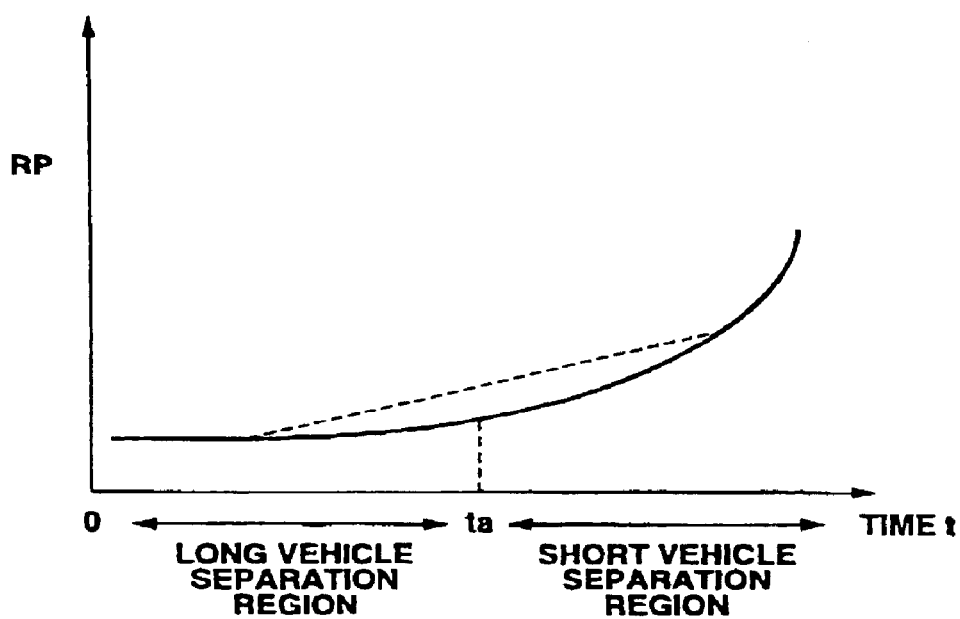
FIG. 34 is a graphical representation illustrating the varying of risk perceived RP calculated as compared to risk actually perceived by operator during the first half and the second half when the vehicle is approaching to a leading vehicle.

The fully drawn curve in FIG. 34 illustrates the varying of RP expressed by the equation 6 with time t when the vehicle starts, at zero point (t=0), approaching the leading vehicle at the rate of a very low approaching speed of 10 km/hour. For ease of understanding, it is assumed that, during the first half from the zero point (t=0) to a threshold moment (t=ta), the vehicle separation D between the vehicles is sufficiently long and the risk actually perceived or felt by the operator falls in a low risk level range. The second half begins immediately after the threshold moment (t=ta). During the second half, the vehicle separation D becomes shorter and shorter and the risk actually perceived by the operator grows with respect to time.

During the first half, paying much attention mainly to THW, the operator manipulates an accelerator pedal. During this first half, the RP expressed by the equation 6 and felt by the operator through the accelerator pedal grows in response to the reciprocal of THW, which the operator pays attention to. The risk actually perceived by the operator does not grow in response to the reciprocal of THW, however. Specifically, during the first half, the RP expressed by the equation 6 grows at the rate less than the rate at which the risk actually perceived by operator grows. In FIG. 34, the dotted line illustrates the varying of the risk actually perceived by operator during the first half and the subsequent transient to the second half.

According to the sixth implementation, a new risk perceived $RP_1$ is used to compensate for an insufficiency provided by the RP expressed by the equation 6. To avoid confusion, the RP expressed by the equation 6 is represented by a current risk perceived $RP_o$.

Thus, the $RP_0$ and $RP_1$ are expressed as, $$RP_0 = RP = a(1/THW) + b(1/TTC) \qquad \text{Eq. 15}$$

where b and a (b>a) are parameters weighting the first extent (1/TTC) and the second extent (1/THW), respectively, such that the second extent (1/THW) is less weighted than the first extent (1/TTC) is. The values of b and a are optimized after accounting for a statistics of values of THW and TTC collected in the traffic scene including leading and trailing vehicles. In this implementation, b=8 and a=1.

$$RP_1 = (c - THW) + (b/TTC) \qquad \text{Eq. 16}$$

where b and c are parameters. In this implementation, b=8 and c=2.5.

Figure 35:
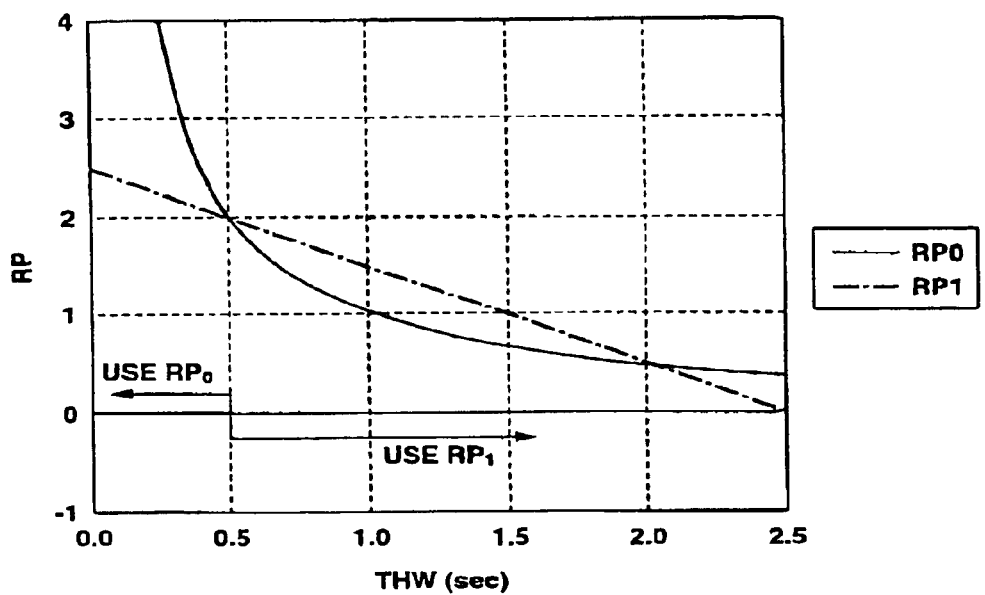
FIG. 35 is a graphical representation illustrating risks $RP_0$ and $RP_1$.

In this implementation, the threshold of THW is 0.5 seconds (THW=0.5). When THW>0.5, the $RP_1$ is used. When THW≦0.5, the $RP_0$ is used. The graph in FIG. 35 illustrated this "hybrid" use of two $RP_0$ and $RP_1$. In FIG. 35, the one-dot chain line illustrates the variation of $RP_1$ against THW and the fully drawn curve illustrates the variation of $RP_0$ against THW. In this implementation, the $RP_1$ is used when THW>0.5, and the $RP_0$ is used when THW≦0.5.

Seventh Implementation of the Invention

The seventh implementation is substantially the same as the sixth implementation. In this seventh implementation, another $RP_2$ is used. The $RP_2$ is expressed as, $$RP_2 = d(c - THW) + (a/THW) + (b/TTC) \qquad \text{Eq. 17}$$

where a, b, c and d are parameters. In this implementation, b=8, and c=2.5.
d and a are determined as follows:
when THW≦0.5:d=0, a=1
when THW>0.5:d=1, a=0.
Apparently, the equation 17 provides the same performance as the equations 15 and 16 provide.

Figure 36:
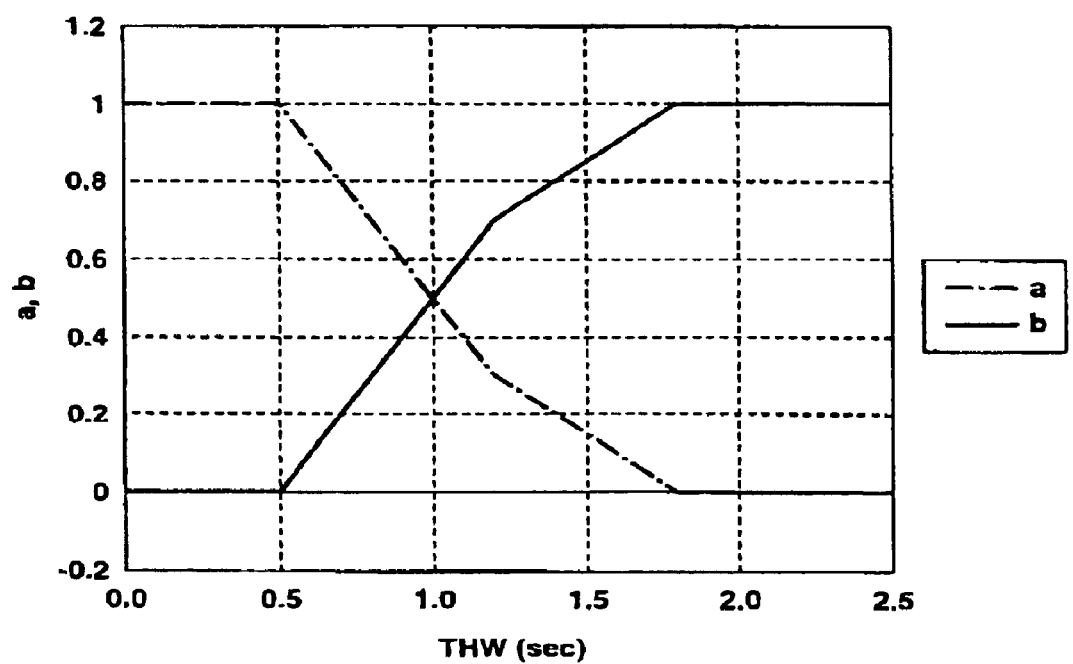
FIG. 36 is a map for parameters a, b.
Figure 37:
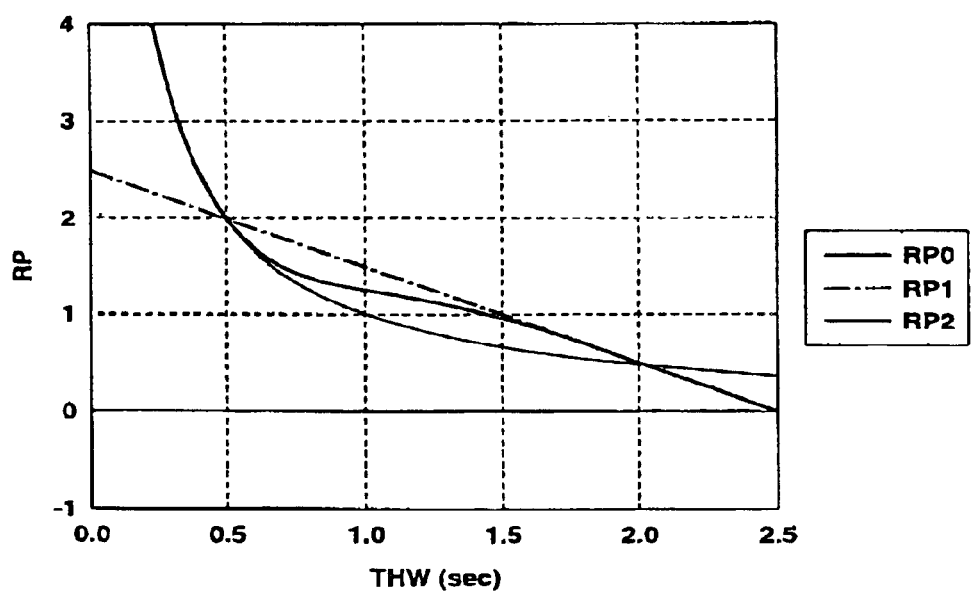
FIG. 37 is a graphical representation illustrating risks $RP_0$, $RP_1$, and $RP_2$.

Referring to FIG. 36, an improved version using the equation 17 is described. According to this improved version, the parameters a and d used in the equation 17 are varied continuously in the illustrated pattern in FIG. 36 to provide a smooth transition between two discrete $RP_0$ and $RP_1$ that exist in the equation 17. In FIG. 36, the one-dot chain line illustrates the variation of parameter a with respect to THW, and the fully drawn line illustrates the variation of the parameter b with respect to THW. The fully drawn curve in FIG. 37 illustrates the smooth varying of $RP_s$ when the parameters a and b are varied as illustrated in FIG. 36.

Eighth Implementation of the Invention

Figure 38:
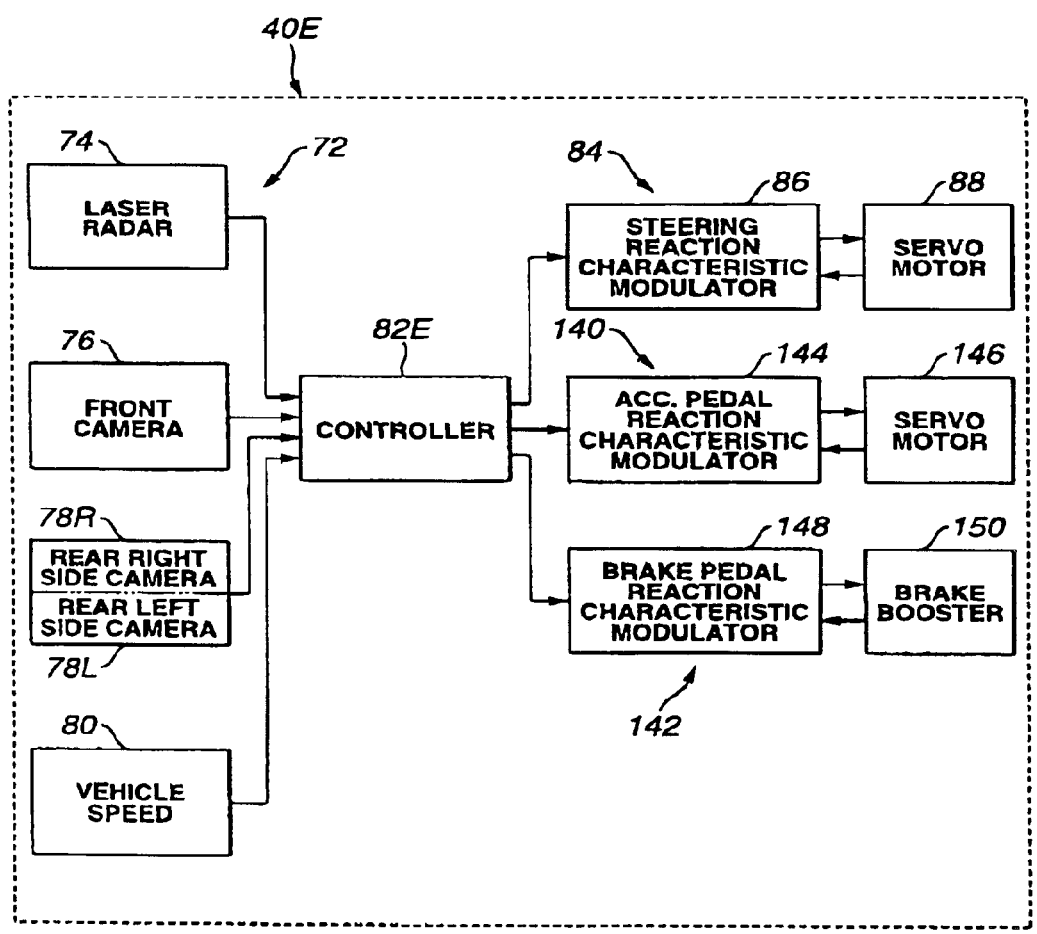
FIG. 38 is a block diagram showing hardware of an eighth exemplary implementation of the present invention.
Figure 39:
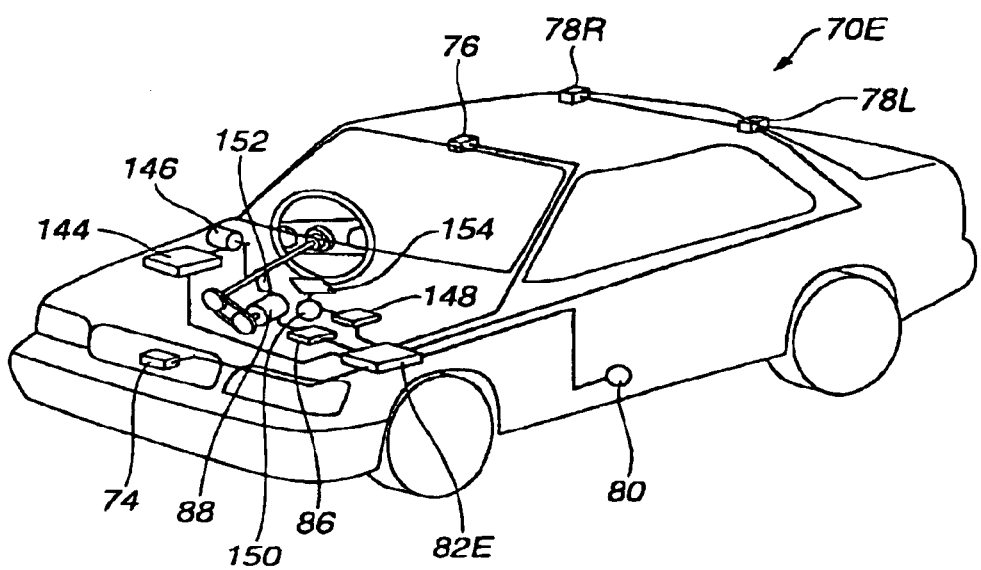
FIG. 39 is a view how the hardware of the eighth implementation is arranged on an automobile.

FIG. 38 provides hardware and FIG. 39 illustrates how the hardware is arranged on an automobile 70E.

In FIG. 38, the reference numeral 40E generally indicates a driving assist system. Driving assist system 40E is a hybrid including an on board data acquisition system (DAS) 72 and a steering reaction modulation actuator 84, which are substantially the same as their counterparts in the previously described driving assist system 40A (FIG. 3), and an accelerator reaction modulation actuator 140 and a brake reaction modulation actuator 142, which are substantially the same as their counterparts in the previously described driving assist system 40B (FIG. 5).

In FIG. 36, driving assist system 40E includes a microprocessor-based controller 82E.

Controller 82E recognizes the state of obstacles within environment in a field around vehicle 70E by determining velocity $V_f$ of vehicle 70E, relative position and relative velocity between vehicle 70E and each of other vehicles within the environment, and relative position between adjacent lane marking and each of obstacles within the environment. Based on the recognized obstacle state, controller 82E determines risk which each of the recognized obstacles would cause the operator to perceive. Controller 82E divides each of the risks into a longitudinal risk component and a lateral risk component, and sums all of the longitudinal risk components to give a total longitudinal risk and all of the lateral risk components to give a total lateral risk. Based on the total longitudinal and lateral risks, controller 82E determines longitudinal commands and a lateral command.

Controller 82E outputs the longitudinal commands for application to an accelerator pedal reaction characteristic modulator 144 and a brake pedal reaction characteristic modulator 148, respectively. In response to the applied longitudinal commands, the accelerator pedal reaction characteristic modulator 144 and the brake pedal reaction characteristic modulator 148 control servo motor 146 and brake booster 150, thereby modulating the accelerator pedal and brake pedal reaction force characteristics. Modulating the accelerator pedal and brake pedal reaction characteristics prompt the vehicle operator to manipulating an accelerator pedal 152 and a brake pedal 154 to appropriate positions, respectively.

Controller 82E outputs the lateral command for application to a steering reaction characteristic modulator 86. In response to the applied lateral command, the steering reaction characteristic modulator 86 controls servo motor 88. Modulating the steering reaction characteristic prompts the vehicle operator to manipulating a steering wheel to an appropriate angular position.

Figure 40:
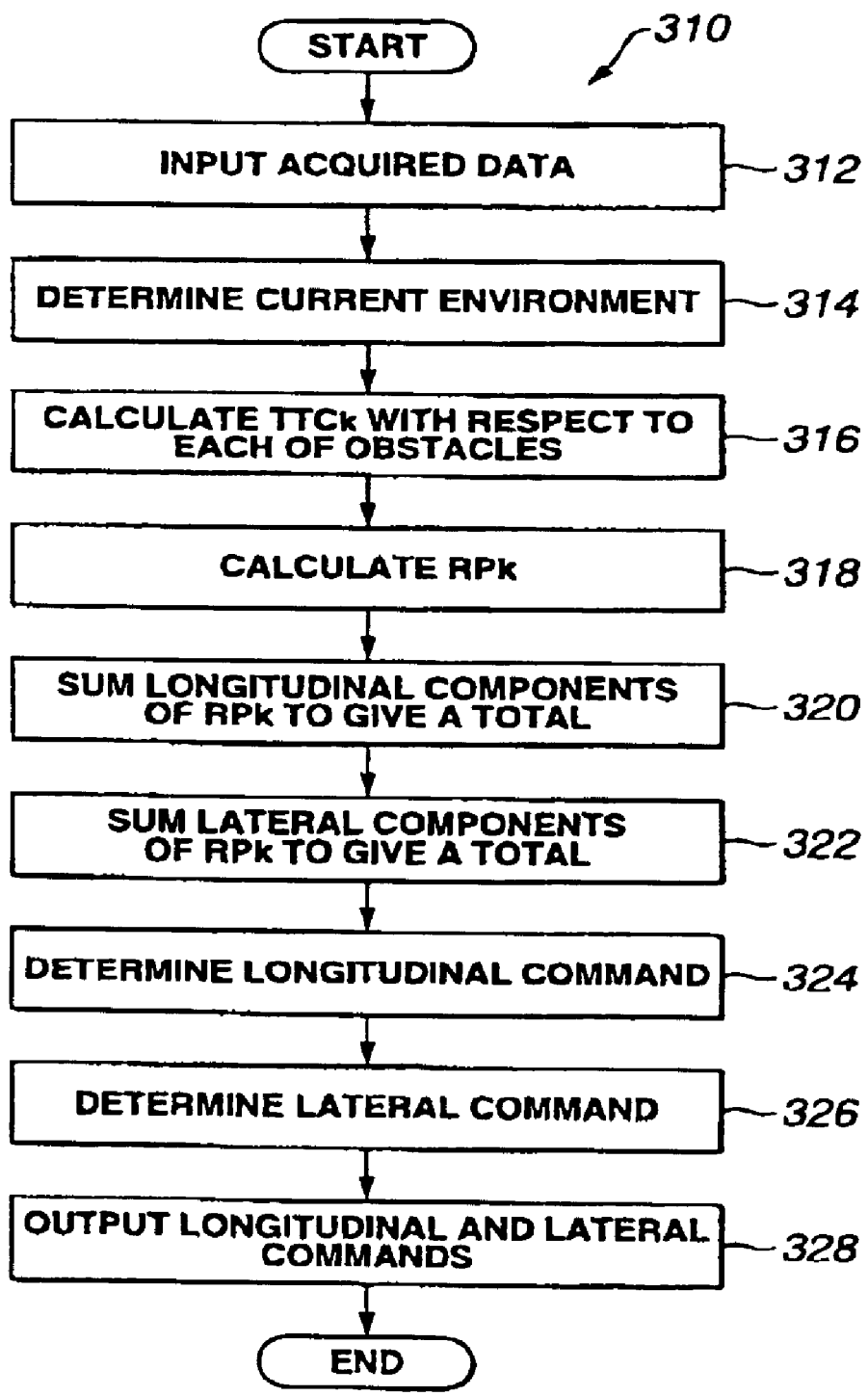
FIG. 40 is a flow diagram illustrating the operation of the eighth implementation.

The flow diagram in FIG. 40 illustrates a control routine of the eighth implementation of the present invention. The control routine, generally indicated at 310, is executed at regular time intervals of 50 milliseconds.

At input box 312, the processor of controller 82E inputs acquired data by DAS 72. Specifically, the processor inputs vehicle velocity $V_f$, an angular location of a leading vehicle and a vehicle separation D between the subject vehicle 70E and the leading vehicle. The processor also inputs relative position of the vehicle 70E to the adjacent lane marking out of the image data from the front camera 76. The relative position of the vehicle 70E to the adjacent lane marking includes a lateral position and an angular position of the vehicle 70E with respect to the lane marking. Out of the image data from the front camera 76, the processor further inputs the shape of the lane marking. Out of the image data from the front camera 76, the processor still further inputs an angular location of the leading vehicle and a vehicle separation D between the vehicle 70E and the leading vehicle. Out of the image data from RRS and RLS cameras 78R and 78L, the processor inputs an angular location of each of vehicles existing in the adjacent lane(s) and a vehicle separation between the vehicle 70E and each of the vehicles. The processor also input velocity of the vehicle 70E from the source of vehicle speed 80. Besides, the processor recognizes the presence of and kinds of obstacles around the vehicle 70E out of the image data from the front camera 76 and the image data from RRS and RLS cameras 78R and 78L. Recognizing the kinds of obstacles includes pattern recognition to identify them whether they are a four wheel vehicle or a two wheel vehicle or a pedestrian.

At box 314, the processor determines current environment in the field around the vehicle 70E in terms of position of each of the obstacles/vehicles relative to the vehicle 70E, direction of movement of each of the obstacles relative to the vehicle 70E, and speed at which each of the obstacles relative to the vehicle 70E. Specifically, the processor determines current values of position, direction and speed of each of the obstacles/vehicles from the past stored values thereof that were determined in the previous cycles and the input data at box 312.

At box 316, using the data on current environment determined at box 314, the processor calculates time to collision TTC between the vehicle 70E and each of the obstacles. $TTC_k$ indicates TTC between the vehicle 70E and an obstacle k. $TTC_k$ is expressed as, $$TTC_k = \frac{D_k - \sigma(D_k)}{V_{rk} + \sigma(V_{rk})} \qquad \text{Eq. 18}$$

where
$D_k$=Separation (or distance) between the vehicle 70E and an obstacle k;
$V_{rk}$=Relative velocity between the vehicle 70E and the obstacle k;
$\sigma(D_k)$=Variance of separation; and
$\sigma(V_{rk})$=Variance of relative velocity.

The following several paragraphs provide a description on the variances $\sigma(D_k)$ and $\sigma(V_{rk})$.

An error in data might grow should if a sensor or a camera be subject to uncertainty or unforeseeable event. Accounting for how much such an error might be, variance of separation $\sigma(D_k)$ and variance of relative velocity $\sigma(V_{rk})$ are determined depending upon what an obstacle k is and which sensor or camera is used to recognize the obstacle k.

Figure 41:
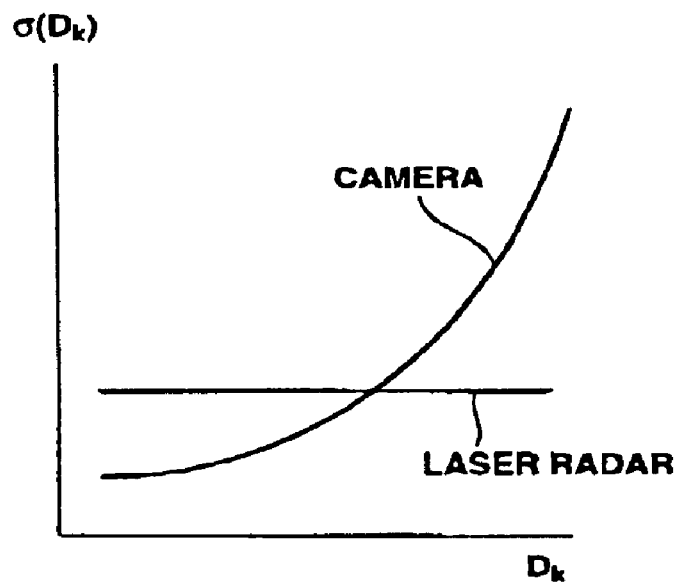
FIG. 41 is a graphical representation of the varying of variance of separation for laser radar as compared to that for a CCD camera.

For example, the laser radar 74 is superior to a CCD camera, which is used as the front camera 76 and RRS and RLS cameras 78R and 78L, in its capability of providing accurate measure in separation or distance between two vehicles irrespective of how far they are separated. The curves in FIG. 41 illustrate the variances of separation $\sigma(D_k)$ set for laser radar 74 and CCD camera, respectively. The CCD camera is used for front camera 76 and RRS and RLS cameras 78R and 78L. As shown in FIG. 41, when laser radar 74 is used to measure a separation $D_k$ between the vehicle 70E and an obstacle k in the form of an automobile, variance $\sigma(D_k)$ is kept constant over any different values in the separation to be measured. When the CCD camera is used to measure the separation $D_k$, variance $\sigma(D_k)$ increases exponentially. When the separation $D_k$ is less than a predetermined value, the CCD camera provides better accuracy than laser radar 74 does, and variance $\sigma(D_k)$ for CCD camera is less than that for laser radar 74.

Figure 42:
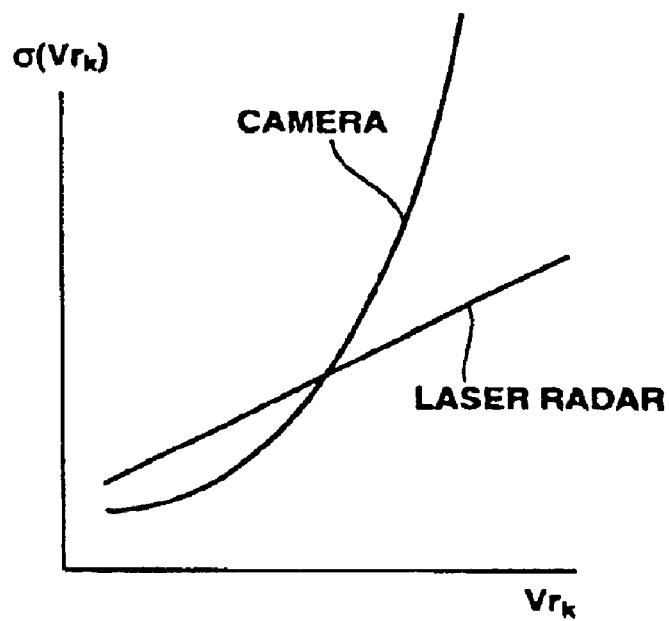
FIG. 42 is a graphical representation of the varying of variance of relative velocity for the laser radar as compared to that for the CCD camera.

The curves in FIG. 42 illustrate the variances of relative velocity $\sigma(V_{rk})$ set for laser radar 74 and CCD camera, respectively. As shown in FIG. 42, when laser radar 74 is used to measure relative velocity $V_{rk}$ between the vehicle 70E and an obstacle k in the form of an automobile, variance $\sigma(V_{rk})$ increases linearly as the relative velocity $V_{rk}$ increases. When the CCD camera is used to measure the relative velocity $V_{rk}$, variance $\sigma(V_{rk})$ increases exponentially.

Figure 43:
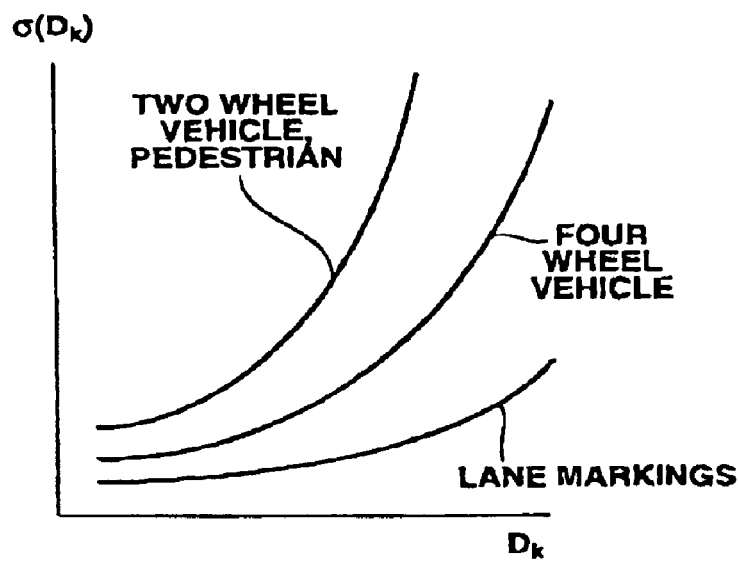
FIG. 43 is a graphical representation of the varying of variance of separation for the CCD camera with different kinds of obstacles.
Figure 44:
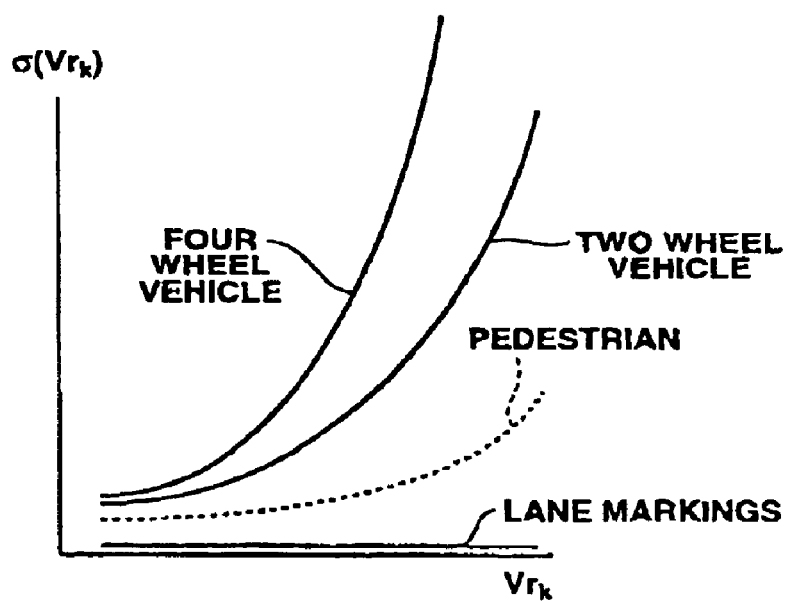
FIG. 44 is a graphical representation of the varying of variance of relative velocity for the CCD camera with different kinds of obstacles.

Using pattern recognition technique, image data from front camera 76 and RRS and RLS cameras 78R and 78L are analyzed by the processor to determine what an obstacle k is. A family of curves in FIG. 43 illustrates the variance $\sigma(D_k)$ set for CCD camera. A family of curves in FIG. 44 illustrates the variance $\sigma(V_{rk})$ set for CCD camera. A four wheel vehicle, a two wheel vehicle, a pedestrian and lane markings were selected and used as an obstacle k for measurement by the CCD camera.

When the CCD camera is used to measure the separation $D_k$, the bigger the obstacle k, the higher the accuracy of measurement is. Accordingly, as shown in FIG. 43, the variance $\sigma(D_k)$ for measuring separation from a four wheel vehicle is less than that for measuring separation from two wheel vehicle or pedestrian.

When the CCD camera is used to measure the relative velocity $V_{rk}$, the variance $\sigma(V_{rk})$ is determined depending on the magnitude of relative velocity which may be assumed for the kinds of obstacle k, respectively. As shown in FIG. 44, the higher the assumed relative velocity, the larger the variance $\sigma(V_{rk})$ is. Comparing relative velocity assumed for four wheel vehicle to that assumed for two wheel vehicle or that assumed for pedestrian, the former is higher than the latter. Accordingly, the variance $\sigma(V_{rk})$ for four wheel vehicle is set greater than that for two wheel vehicle or that for pedestrian.

In FIG. 43, the variance $\sigma(D_k)$ for lane marking is set less than those for four wheel vehicle, two wheel vehicle and pedestrian. In FIG. 44, the variance $\sigma(V_{rk})$ for lane marking is set less than those for four wheel vehicle, two wheel vehicle and pedestrian.

With reference again to the flow diagram in FIG. 40, after calculating $TTC_k$ at box 316, the logic goes to box 318. At 318, the processor uses $TTC_k$ to calculate risk perceived $RP_k$, which an obstacle k would cause operator to perceive. $RP_k$ is expressed as, $$RP_k = \frac{1}{TTC_k} \times W_k \qquad \text{Eq. 19}$$

where,
$W_k$=Weighting component applied to the obstacle k.
Various values are set as weighting component for different obstacles in kind. For example, when a four wheel, a two wheel vehicle or a pedestrian is an obstacle k, the operator would be influenced most upon approaching such obstacle k. Thus, in this implementation, $W_k$=1, when obstacle k is one of a four wheel, a two wheel vehicle and a pedestrian. When lane marking is an obstacle k, the operator would be influenced less upon approaching the lane marking. Thus, in this implementation, $W_k$=about 0.5, when obstacle k is lane marking. Operator would be influenced less upon approaching lane marking beyond which lies a railroad or a wall or a fence than one would be influenced upon approaching lane marking beyond lies the adjacent lane. Thus, different values may be set as $W_k$ depending upon where the lane marking exists.

Lane markings are distributed within a range of angular locations ahead of the vehicle 70E. Risk with regard to lane markings is determined by integrating RPk over the whole range of angular locations. Risk perceived RPlane is expressed as, $$RP_{lane} = \int \left( \frac{1}{TTC_{lane}} \times W_{lane} \right) dL \qquad \text{Eq. 20}$$

where
$W_{lane}$=Weighting component

With continuing reference to FIG. 40, at box 320, the processor sums longitudinal components of individual risk perceived $RP_k$ including risk with regard to lane markings $RP_{lane}$, to provide a total longitudinal risk $RP_{Longitudinal}$. The total longitudinal risk $RP_{Longitudinal}$ is expressed as, $$RP_{Longitudinal} = \sum_k RP_k \cos\theta_k \qquad \text{Eq. 21}$$

where,
$\theta_k$=Angular location of an obstacle k as viewed from the vehicle 70E $\theta_k$=0 when the obstacle k is located in front of the vehicle. $\theta_k$=180 when the obstacle k is located behind the vehicle.

At the next block 322, the processor sums lateral components of individual risk perceived $RP_k$ including risk with regard to lane markings $RP_{lane}$ to provide a total lateral risk $RP_{Lateral}$. The total lateral risk $RP_{Lateral}$ is expressed as, $$RP_{Lateral} = \sum_k RP_k \sin\theta_k \qquad \text{Eq. 22}$$

Figure 45:
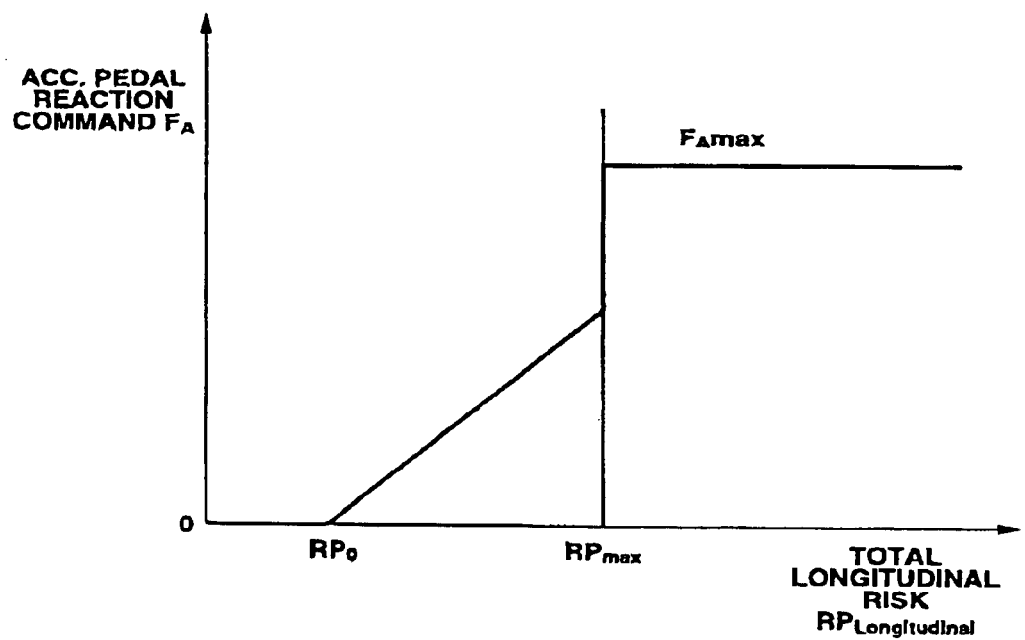
FIG. 45 is an accelerator pedal reaction command ($F_A$) map.
Figure 46:
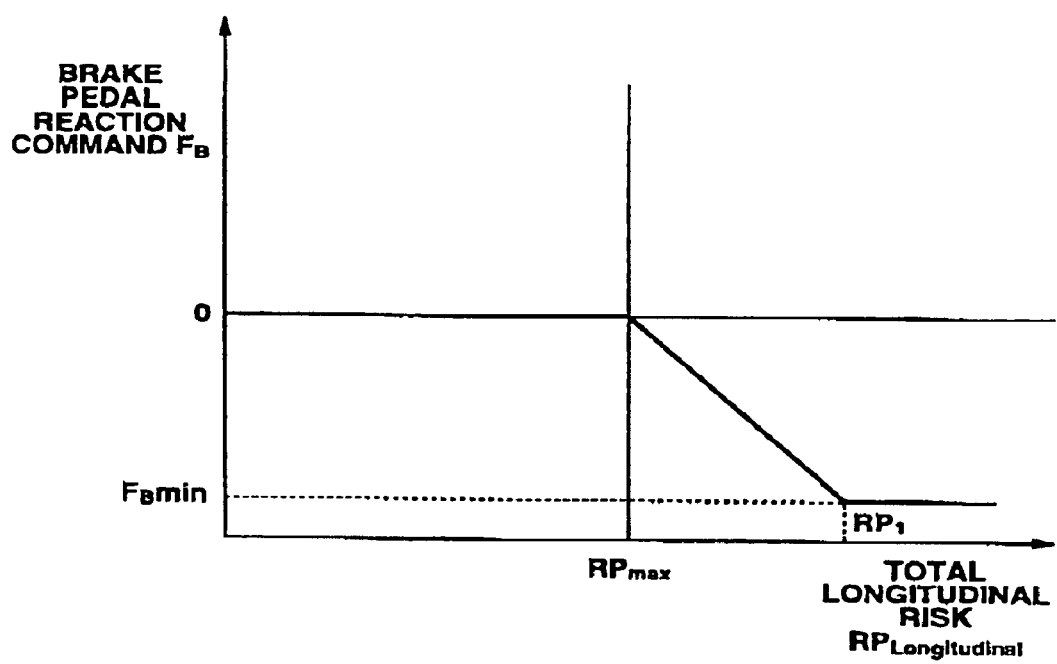
FIG. 46 is a brake pedal reaction command ($F_B$) map.

At box 324, the processor determines longitudinal commands by referring to the relationship shown in FIG. 45 and the relationship shown in FIG. 46 using the total longitudinal risk $RP_{Longitudinal}$. One of the longitudinal commands, namely, an accelerator pedal reaction command $F_A$, is provided to modulate an accelerator pedal reaction characteristic. The other command, namely, a brake pedal reaction command $F_B$, is provided to modulate a brake pedal reaction characteristic. They provide such a relationship that, when the total longitudinal risk $RP_{Longitudinal}$ increases, the accelerator pedal reaction command $F_A$ increases, prompting operator to releasing the accelerator pedal 152, while the brake pedal reaction force $F_B$ decreases, prompting the operator to depressing the brake pedal 154.

The fully drawn line in FIG. 45 illustrates the relationship between the accelerator pedal reaction command $F_A$ and the total longitudinal risk $RP_{Longitudinal}$. As will be readily seen from FIG. 45, the command $F_A$ remains zero when $RP_{Longitudinal}$ is less than a first threshold $RP_0$. When $RP_{Longitudinal}$ exceeds the first threshold $RP_0$ but it is still less than a second threshold $RP_{max}$ that is greater than the first threshold $RP_0$, the command $F_A$ is proportional to $RP_{Longitudinal}$. The command FA takes the maximum when $RP_{Longitudinal}$ exceeds the second threshold $RP_{max}$.

The fully drawn line in FIG. 46 illustrates the relationship between the brake pedal reaction command $F_B$ and the total longitudinal risk $RP_{Longitudinal}$. When $RP_{Longitudinal}$ is greater than the second threshold $RP_{max}$, the greater longitudinal risk $RP_{Longitudinal}$, the less the command $F_B$ is. When $RP_{Longitudinal}$ is greater than a third threshold $RP_1$ that is greater than the second threshold $RP_{max}$, the command $F_B$ is at the minimum $F_{Bmin}$, holding the brake pedal reaction force to the minimum. When $RP_{Longitudinal}$ is not greater than the second threshold $RP_{max}$, the command $F_B$ is zero, leaving the brake pedal reaction characteristic unaltered.

With reference to FIGS. 45 and 46, when the longitudinal risk $RP_{Longitudinal}$ is not greater than the threshold $RP_{max}$, the accelerator pedal reaction characteristic is altered, letting operator know the magnitude of longitudinal risk $RP_{Longitudinal}$ by means of a change in reaction force of the accelerator pedal. When the longitudinal risk $RP_{Longitudinal}$ exceeds the threshold $RP_{max}$, the accelerator pedal reaction force is maximized, prompting the operator to releasing the accelerator pedal. At the same time, the brake pedal reaction force is reduced, allowing the brake pedal to be depressed easily when the operator steps on the brake pedal.

Figure 47:
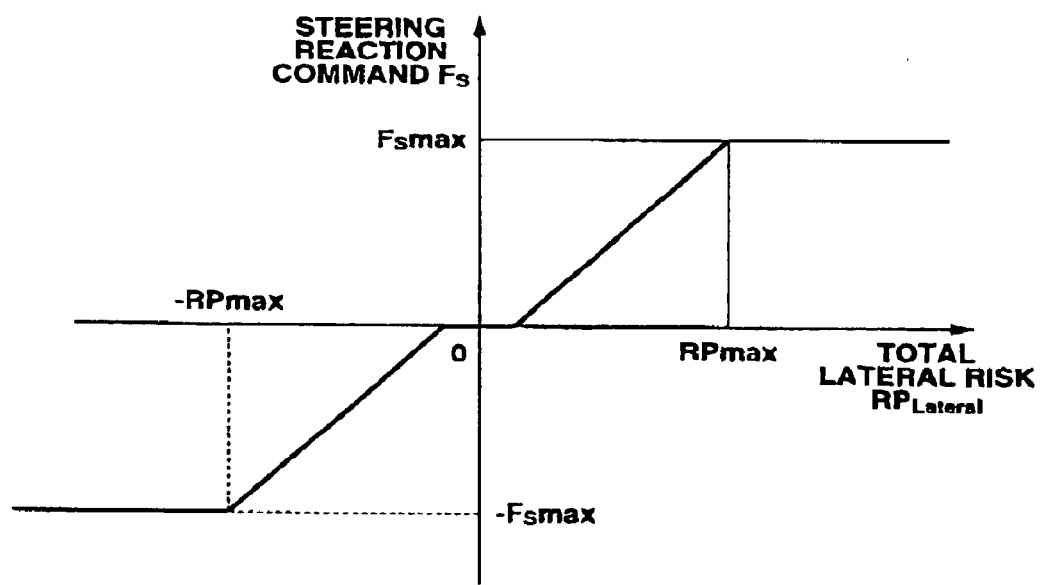
FIG. 47 is a steering reaction command ($F_S$) map.

In FIG. 40, at box 326, the processor determines a lateral command by referring to the relationship shown in FIG. 47 using the total lateral risk $RP_{Lateral}$. The lateral command, namely, a steering reaction command $F_S$, is provided to modulate a steering reaction characteristic. It provides such a relationship that, when the total lateral risk $RP_{Laterall}$ increases, the steering reaction command $F_S$ increases in a manner to prompt operator to steering the vehicle to reduce the risk $RP_{Lateral}$. The fully drawn line in FIG. 47 provides the relationship between the total lateral risk $RP_{Lateral}$ and the steering reaction command $F_S$. In FIG. 47, the total lateral risk $RP_{Lateral}$ is positive when risk on the right hand side exceeds that on the left hand side, but it is negative when risk on the left hand side exceeds than on the right hand side.

As shown in FIG. 47, the steering reaction command $F_S$ ranges from 0 to a maximum right-turn reaction $F_{Smax}$ when the total lateral risk $RP_{Lateral}$ is greater than 0 but less than a right-turn threshold $RP_{max}$. When the total lateral risk $RP_{Lateral}$ is in the vicinity of zero, the command $F_S$ is zero, leaving steering reaction characteristic unaltered. Subsequently, when the total lateral risk $RP_{Lateral}$ increases, the command $F_S$ increases with the increasing total lateral risk $RP_{Lateral}$. When the total lateral risk $RP_{Lateral}$ is equal to or greater than the right-turn threshold $RP_{max}$, the command $F_S$ stays at the maximum right-turn reaction $F_{Smax}$. As the command $F_S$ increases from zero, the reaction force to operator right turn steering effort increases from a level of the usual steering reaction characteristic.

With continuing reference to FIG. 47, the steering reaction command $F_S$ ranges from 0 to a maximum left-turn reaction $-F_{Smax}$, when the total lateral risk $RP_{Lateral}$ is less than 0 but greater than a left-turn threshold $-RP_{max}$. When the total lateral risk $RP_{Lateral}$ is in the vicinity of zero, the command $F_S$ is zero, leaving steering reaction characteristic unaltered. Subsequently, when the total lateral risk $RP_{Lateral}$ decreases, the command $F_S$ decreases with the decreasing total lateral risk $RP_{Lateral}$. When the total lateral risk $RP_{Lateral}$ is equal to or less than the left-turn threshold $-RP_{max}$, the command $F_S$ stays at the maximum left-turn reaction $-F_{Smax}$. As the command $F_S$ decreases from zero, the reaction force to operator left turn steering effort increases from a level of the usual steering reaction characteristic.

With reference again to FIG. 40, at output box 328, the processor outputs the commands determined at boxes 324 and 326 using the illustrated relationships in FIGS. 45, 46 and 47. These commands include the accelerator pedal reaction command $F_A$, the brake pedal reaction command $F_S$, and the steering reaction command $F_S$ for application to the accelerator pedal reaction characteristic modulator 144, brake pedal reaction characteristic modulator 148 and steering reaction characteristic modulator 86 (see FIG. 38), respectively.

The preceding description on the flow diagram in FIG. 40 clearly indicates that the controller 82E accounts for longitudinal and lateral risk components calculated based on individual risk derived from each of obstacles within a field around the vehicle 70E. In response to the longitudinal and lateral risk components, the controller 82E allocates commands $F_A$, $F_B$ and $F_S$ for prompting operator to operating the vehicle 70E longitudinally and laterally in an appropriate manner to cope with such risk components. This may be readily confirmed by referring to the description on boxes 320, 322, 324 and 326. In the eighth implementation of the invention, this allocating function is implemented in terms of software (instructions) component. However, the invention is not limited to this. The allocating function may be implemented in terms of software and hardware components or hardware component.

In the eighth implementation, the controller 84E determines the magnitudes of accelerator pedal reaction command $F_A$, brake pedal reaction command $F_B$, and steering reaction command $F_S$ based on the total longitudinal risk $RP_{Longitudinal}$ and total lateral risk $RP_{Lateral}$. In this implementation, the magnitudes of such commands are determined using the relationships illustrated in FIGS. 45, 46 and 47. These illustrated relationships show only one example of an operator response plan that prompts operator to operating the vehicle 70E in a manner to negotiate with the longitudinal and lateral risks $RP_{Longitudinal}$ and $RP_{Lateral}$. In this example, the accelerator pedal reaction characteristic, brake pedal reaction characteristic and steering reaction characteristic are modulated or altered to prompt the operator to operating the vehicle 70E in a direction toward where the longitudinal and lateral risks $RP_{Longitudinal}$ and $RP_{Lateral}$ are lowered.

With reference to FIGS. 38 to 47, the eighth implementation of the present invention has been described. This implementation provides features as follows.

(1) As information on environment in a field around the vehicle 70E, the controller 82E determines the presence of all of obstacles, including a leading vehicle, a trailing vehicle, a vehicle in the adjacent lane, a pedestrian, and lane markings. The controller 82E calculates, for each of the obstacles, a risk $RP_k$. Accounting for the risks $RP_k$ from all directions of the vehicle 40E, the controller 82E allocates commands $F_A$, $F_B$, and $F_S$ for prompting the vehicle operator to operating the vehicle 40E longitudinally and laterally in a direction appropriate to cope with the available risks $RP_k$. It will be appreciated that this implementation provides an appropriate assist to the vehicle operator.

(2) The controller 82E provides an appropriate assist to manual effort to operate the accelerator pedal by modulating or altering accelerator pedal reaction in response to the determined command $F_A$.

(3) For each of the obstacles, the controller 82E calculates $TTC_k$ by dividing separation $D_k$ by relative velocity $V_{rk}$, and determines risk $RP_k$ as a function of the reciprocal of $TTC_k$. This risk $RP_k$ represents an extent how quickly the vehicle 70E has approached the obstacle k. This implementation provides an appropriate assist to the vehicle operator to opening the vehicle 70E longitudinally and laterally in response to the extent how quickly the vehicle 70E has approached the obstacle k.

(4) As is indicated by equation 18, $$TTC_k = \frac{D_k - \sigma(D_k)}{V_{rk} + \sigma(V_{rk})},$$

determining $TTC_k$ involves variance of separation $\sigma(D_k)$ and variance of relative velocity $\sigma(V_{rk})$. In use of laser radar 74, the variances $\sigma(D_k)$ and $\sigma(V_{rk})$ are subject to the illustrated varying in FIGS. 41 and 42. In use of CCD camera, the variances $\sigma(D_k)$ and $\sigma(V_{rk})$ are subject to the illustrated varying in FIGS. 43 and 44. Employing the variances $\sigma(D_k)$ and $\sigma(V_{rk})$ in determining $TTC_k$ allows use of diverse radars and cameras in on board DAS 72.

(5) As is indicated by equation 19, $$RP_k = \frac{1}{TTC_k} \times W_k,$$

determining $RP_k$ involves weighting component $W_k$. The weighting component $W_k$ takes an appropriate value that has been selected out of various values predetermined for different kinds of obstacles and for different surroundings of lane marking. Employing the weighting component $W_k$ in determining $RP_k$ allows diverse obstacles to be processed in determining commands $F_A$, $F_B$ and $F_S$.

(6) With respect to the vehicle 70E, angular locations of all of the obstacles cause the controller 82E to calculate longitudinal and lateral risk components and provide appropriate allocation of various commands $F_A$, $F_B$ and $F_S$ to the longitudinal and lateral risks. Accordingly, the controller 82E allocates commands $F_A$, $F_B$ and $F_S$ to prompting operator to operating the vehicle longitudinally and laterally in accordance with the angular locations of the obstacles.

(7) The controller 82E provides an appropriate assist to manual effort to operate the steering wheel by modulating or altering steering reaction in response to the determined command $F_S$. Further, the controller 82E provides an appropriate assist to manual effort to operate the brake pedal by modulating or altering brake pedal reaction in response to the determined command $F_B$.

(8) For each of the obstacles, the controller 82E calculates risk $RP_k$ to calculate longitudinal and lateral risk components $RP_{Longitudinal}$ and $RP_{Lateral}$. In response to the longitudinal and lateral risk components, the controller 82E allocates commands $F_A$, $F_B$ and $F_S$ for prompting operator to operating the vehicle 70E longitudinally and laterally in an appropriate manner to cope with such risk components. In this implementation, therefore, the driving system provides assist the operator in prompting to operating the vehicle longitudinally and laterally in response to distribution of individual risks $RP_k$. In this implementation, the controller 82E determines $RP_k$ as a function of the reciprocal of $TTC_k$. Therefore, the driving system assists the operator in prompting to operating the vehicle longitudinally and laterally in response to the extent how quickly the vehicle has approached the obstacle k.

In this implementation, the controller 82E uses the equation 19 to determine $RP_k$ as a physical quantity quantifying the extent how quickly the vehicle 70E has approached an obstacle k. The invention is not limited to the use of equation 19 to quantify the extent how quickly the vehicle 70E has approached an obstacle k. Any appropriate physical quantity may be used in quantifying the extent how quickly the vehicle 70E has approached an obstacle k.

Ninth Implementation of the Invention

The ninth implementation is substantially the same as the eighth embodiment illustrated in FIGS. 38 to 47.

Turning back to FIGS. 38 and 39, FIG. 38 provides hardware of the ninth implementation and FIG. 39 illustrates how the hardware is arranged on an automobile 70E according to the ninth implementation.

In the ninth implementation, a microprocessor-based controller 82E recognizes the state of obstacles within environment in a field around vehicle 70E by determining velocity $V_f$ of vehicle 70E, relative position and relative velocity between vehicle 70E and each of other vehicles within the environment, and relative position between the adjacent lane marking and each of obstacles within the environment. Based on the recognized obstacle state, controller 82E determines risk which each of the recognized obstacles would cause the operator to perceive. Controller 82E predicts a change in risk $RP_k$ in response to a change in operator input. Controller 82E calculates a change in total longitudinal risk in response to a change in operator input for longitudinal operation of the vehicle 70E and a change in total lateral risk in response to a change in operator input for lateral operation of the vehicle 70E. Based on the calculated changes in total longitudinal and lateral risks, controller 82E determines longitudinal and lateral commands.

Controller 82E inputs the information on the current operator input for longitudinal operation of the vehicle by detecting positions of an accelerator pedal 152 and a brake pedal 154 (see FIG. 39). Stroke sensors may be used to measure the positions of such pedals. The positions of such pedals may be determined from the state of a servo motor 146 and the state of a brake booster 150.

Controller 82 inputs the information on the current operator input for lateral operation of the vehicle by detecting manipulated angle of the steering wheel.

Controller 82E outputs the longitudinal commands for application to an accelerator pedal reaction characteristic modulator 144 and a brake pedal reaction characteristic modulator 148, respectively. In response to the applied longitudinal commands, the accelerator pedal reaction characteristic modulator 144 and the brake pedal reaction characteristic modulator 148 control servo motor 146 and brake booster 150, thereby modulating the accelerator pedal and brake pedal reaction force characteristics. Modulating the accelerator pedal and brake pedal reaction characteristics prompt the vehicle operator to manipulating the accelerator pedal 152 and the brake pedal 154 to appropriate positions, respectively.

Controller 82E outputs the lateral command for application to a steering reaction characteristic modulator 86. In response to the applied lateral command, the steering reaction characteristic modulator 86 controls servo motor 88. Modulating the steering reaction characteristic prompts the vehicle operator to manipulating the steering wheel to an appropriate angular position.

Figure 48:
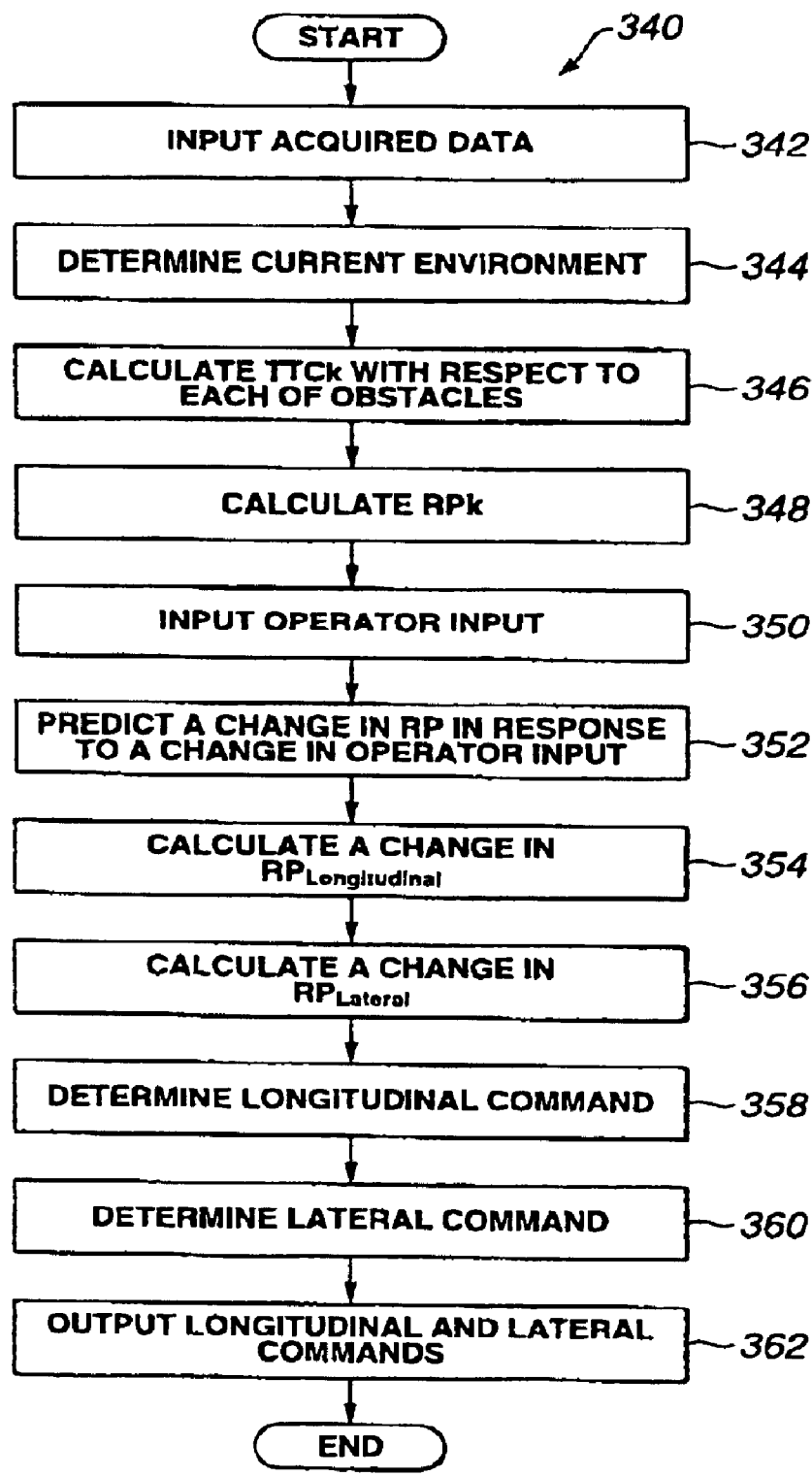
FIG. 48 is a flow diagram illustrating the operation of a ninth exemplary implementation of the present invention.

The flow diagram in FIG. 48 illustrates a control routine of the ninth implementation of the present invention. The control routine, generally indicated at 340, is executed at regular time intervals of 50 milliseconds.

The control routine 340 is substantially the same as the control routine 310 in FIG. 40 in that boxes 342, 344, 346 and 348 in FIG. 48 are the same as the boxes 312, 314, 316 and 318 in FIG. 40, respectively. Accordingly, the detailed description on the boxes 342, 344, 346 and 348 is hereby omitted for brevity.

In FIG. 48, after the box 348, the control logic goes to box 350.

At input box 350, the processor inputs information on current operator input through the depressed angle $\theta_{AB}$ of accelerator pedal 152 and/or brake pedal 154 and through the manipulated angle of steering wheel. When the operator manipulates the accelerator pedal 152, the processor uses the depressed angle of the accelerator pedal 152 as the depressed angle $\theta_{AB}$. When the operator manipulates the brake pedal 154, the processor uses the depressed angle of the brake pedal 154 as the depressed angle $\theta_{AB}$.

At the next box 352, the processor predicts a change in $RP_k$ in response to a change in operator input. Specifically, based on the current $RP_k$ determined at box 348 and the current operator input received at box 350, the processor predicts two new values of $RP_k$ when there is a unit change from the current operator input in both directions.

Figure 49:
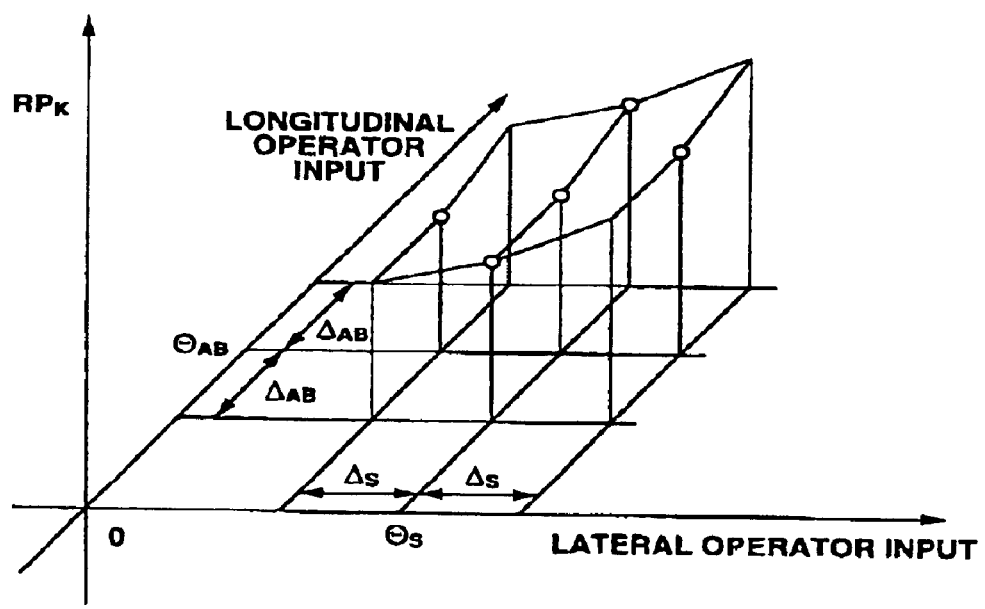
FIG. 49 is a map illustrating the relationship between $RP_K$ and operator inputs.

With reference to FIG. 49, with regard to the operator input for operating the vehicle in the longitudinal direction, the processor predicts an increase in vehicle velocity when there is an increase by a variation $\Delta AB$ from the current accelerator/brake pedal depressed angle $\theta AB$ and it also predicts a decrease in vehicle velocity when there is a decrease by the variation $\Delta AB$ from the current accelerator/brake pedal depressed angle $\theta AB$. Based on the predicted increase and decrease in vehicle velocity, the processor calculates the new values of $RP_k$ using the equation 19. In other words, the processor predicts one new value of $RP_k$ after the vehicle velocity undergoes the predicted increase, and the other new value of $RP_k$ after the vehicle velocity undergoes the predicted decrease. Turning back to the equation 19, $RP_k$ is determined as a function of the reciprocal of $TTC_k$ that is determined as a function of relative velocity $V_{rk}$. From this explanation, it is clear that a change in vehicle velocity causes a change in vehicle velocity $V_{rk}$ which in turn causes a change in $RP_k$.

For ease of description, it is hereby assumed that the accelerator/brake pedal depressed angle θAB increases when the accelerator pedal 152 or brake pedal 154 is manipulated in a direction to cause an increase in $RP_k$. For example, it is considered that there is an increase in accelerator/brake pedal θAB when there is an increase from the current value of depressed angle of the accelerator pedal 152 or there is a decrease from the current value of depressed angle of the brake pedal 154.

With continuing reference to FIG. 49, with regard to the operator input for operating the vehicle in the lateral direction, the processor predicts a change in heading direction of the vehicle when there is an increase by a variation ΔS from the current steering angle θS and it also predicts a change in heading direction of the vehicle when there is a decrease by the variation ΔS from the current steering angle θS. Based on the predicted changes in heading direction of the vehicle, the processor calculates new angular locations of each obstacle k and new values of $RP_k$. If there is a change in heading direction, there is a change in separation between the vehicle and each obstacle and a change in angular location of the obstacle. Accordingly, a change in steering angle causes a change in $RP_k$. In FIG. 49, when the steering is in neutral position, θS is zero. θS is positive upon manipulating the steering wheel to the right, and it is negative upon manipulating the steering wheel to the left.

The magnitudes of the variations ΔAB and ΔS are determined taking into account changes in pedal depressed angle and in steering angle per each processing time, which changes would normally occur during normal operation of the vehicle. In this implementation, the one processing time is, for example, from 0.1 to 0.2 seconds. The processing time differs depending on the kind of vehicle and on the type of processing to be completed. If the processing time ranges 0.1 to 0.2 seconds, ΔAB and ΔS are 10 mm and 0.5 degrees, respectively. The variances are not limited to such fixed values. By using learning technique, the average of depressed angles of accelerator/brake pedal and the average of manipulated steering angles over one driving cycle may be set as the variances ΔAB and ΔS for the next driving cycle.

With reference again to the flow diagram in FIG. 48, at box 354, the processor calculates a change in $RP_{Longitudnal}$. Based on $RP_k$ determined at box 348 and its predicted new values determined at box 352, the processor determines the current total longitudinal risk $RP_{Longitudinal}(0)$, a new value of total longitudinal risk $RP_{Longitudinal}(+)$ for θAB+ΔAB, and the other new value of total longitudinal risk $RP_{Longitudinal}(-)$ for θAB−ΔAB. The current total longitudinal risk $RP_{Longitudinal}(0)$ is expressed as, $$RP_{Longitudinal}(0) = \sum_k RP_k \cos\theta_k \qquad \text{Eq. 23}$$

Figure 50:
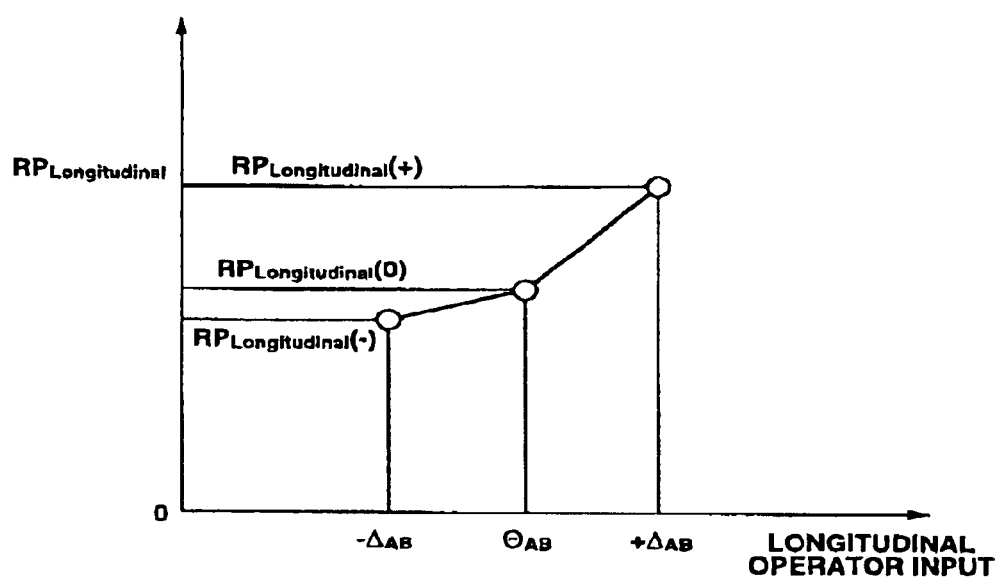
FIG. 50 is a map illustrating the relationship between $RP_{Longitudinal}$ and an operator input for opening the vehicle longitudinally.

Using the equation 21, the processor determines the new value of total longitudinal risk $RP_{Longitudinal}(+)$ for θAB+ΔAB, and the other new value of total longitudinal risk $RP_{Longitudinal}(-)$ for θAB−ΔAB. FIG. 50 illustrates the relationship between the current and two new values of total longitudinal risk.

At the next box 356, the processor calculates a change in $RP_{Lateral}$. Based on $RP_k$ determined at box 348 and its predicted new values determined at box 352, the processor determines the current total lateral risk $RP_{Lateral}(0)$, a new value of total lateral risk $RP_{Lateral}(+)$ for θS+ΔS, and the other new value of total lateral risk $RP_{Lateral}(-)$ for θS−ΔS. The current total lateral risk $RP_{Lateral}(0)$ is expressed as, $$RP_{Lateral}(0) = \sum_k RP_k \sin\theta_k \qquad \text{Eq. 24}$$

Figure 51:
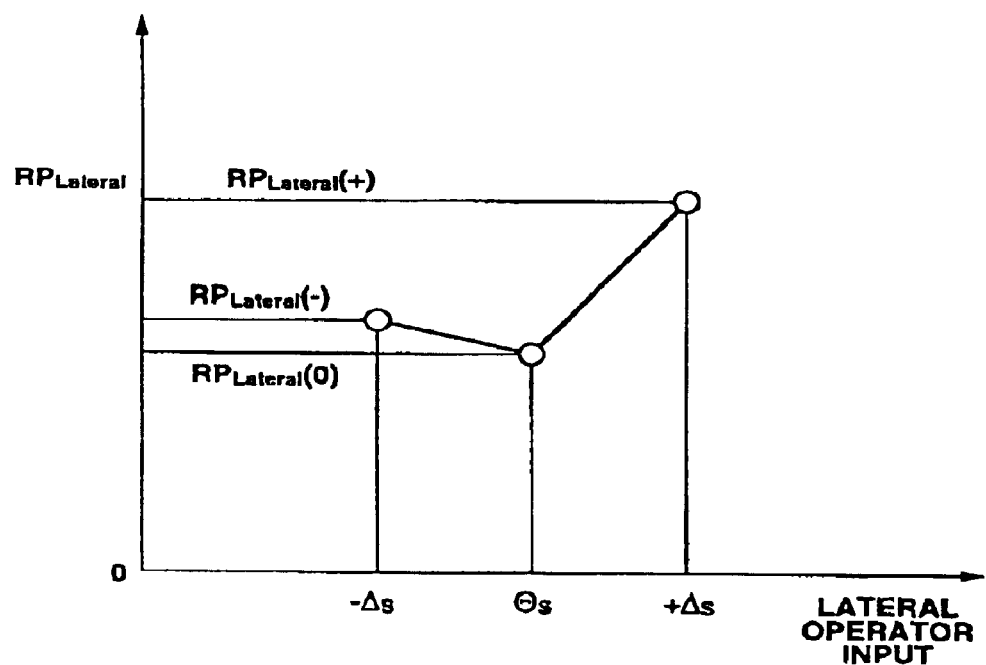
FIG. 51 is a map illustrating the relationship between $RP_{Lateral}$ and an operator input for operating the vehicle laterally.

Using the equation 22, the processor determines the new value of total lateral risk $RP_{Lateral}(+)$ for θS+ΔS, and the other new value of total lateral risk $RP_{Lateral}(-)$ for θS−ΔS. FIG. 51 illustrates the relationship between the current and two new values of total lateral risk.

Figure 52:
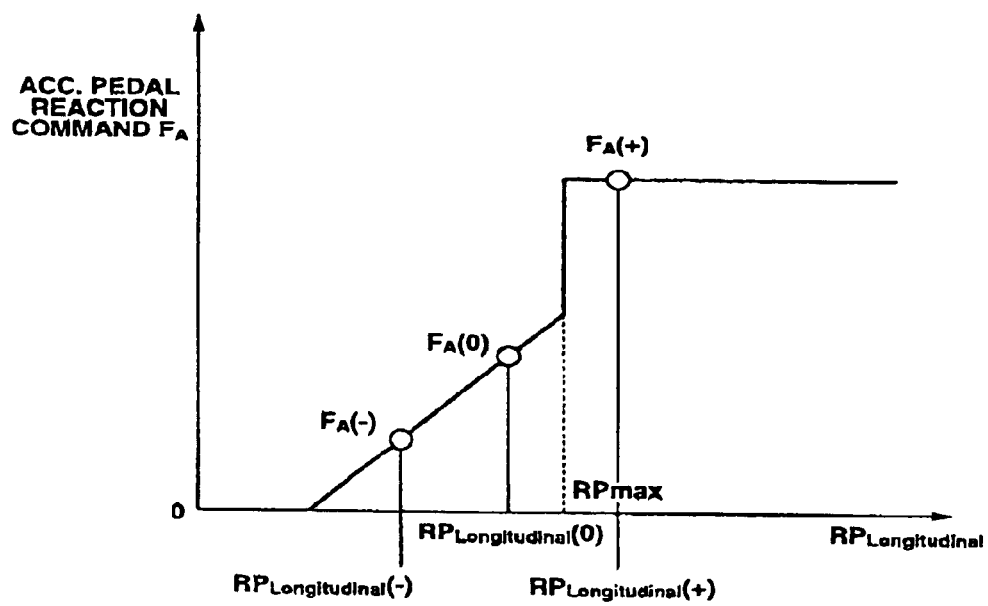
FIG. 52 is an accelerator pedal reaction command ($F_A$) map.
Figure 53:
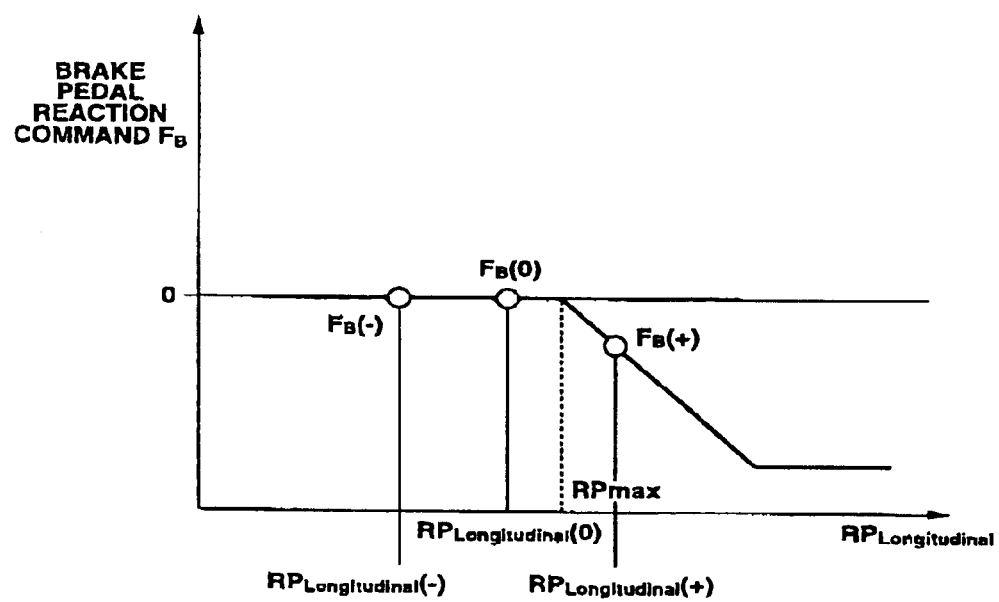
FIG. 53 is a brake pedal reaction command ($F_B$) map.

At box 358, the processor determines longitudinal commands including a set of accelerator pedal reaction commands $F_A(0)$, $F_A(-)$ and $F_A(+)$, and a set of brake pedal reaction commands $F_B(0)$, $F_B(-)$ and $F_B(+)$. The processor determines accelerator pedal reaction commands $F_A(0)$, $F_A(-)$ and $F_A(+)$ by referring to the relationship illustrated in FIG. 52 using $RP_{Longitudinal}(0)$, $RP_{Longitudinal}(-)$ and $RP_{Longitudinal}(+)$, respectively. The fully drawn line in FIG. 52 is substantially the same as that in FIG. 45. The processor determines brake pedal reaction commands $F_B(0)$, $F_B(-)$ and $F_B(+)$ by referring to the relationship illustrated in FIG. 53 using $RP_{Longitudinal}(0)$, $RP_{Longitudinal}(-)$ and $RP_{Longitudinal}(+)$, respectively. The fully drawn line in FIG. 53 is substantially the same as that in FIG. 46.

Figure 54:
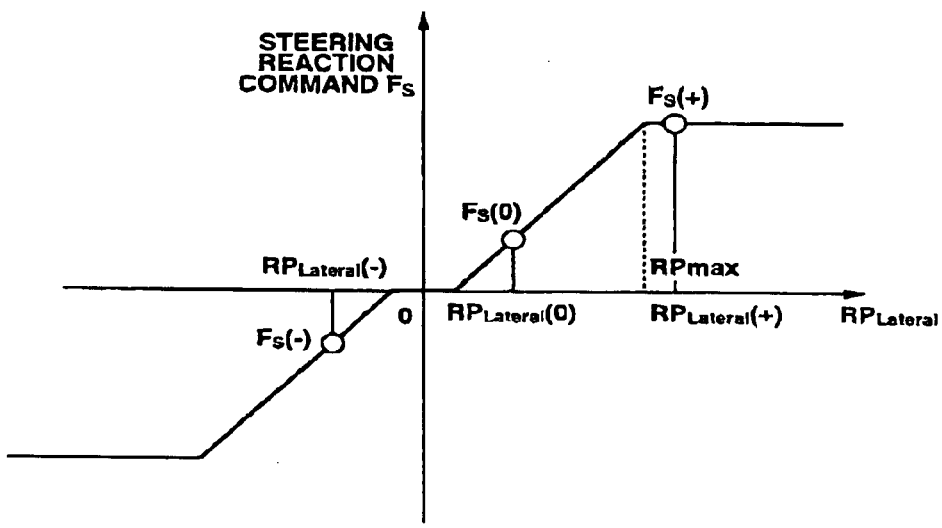
FIG. 54 is a steering reaction command ($F_S$) map.

At box 360, the processor determines a set of lateral commands $F_S(0)$, $F_S(-)$ and $F_S(+)$ by referring to the illustrated relationship in FIG. 54 using $RP_{Lateral}(0)$, $RP_{Lateral}(-)$ and $RP_{Lateral}(+)$, respectively. The fully drawn line in FIG. 54 is substantially the same as that in FIG. 47.

At output box 362, the processor outputs longitudinal and lateral commands determined at boxes 358 and 360. These commands include a set of accelerator pedal reaction commands $F_A(0)$, $F_A(-)$ and $F_A(+)$ for application to an accelerator pedal reaction characteristic modulator 144 (see FIG. 38). They also include a set of brake pedal reaction commands $F_B(0)$, $F_B(-)$ and $F_B(+)$ for application to a brake pedal reaction characteristic modulator 148 (see FIG. 38). They further include a set of lateral commands $F_S(0)$, $F_S(-)$ and $F_S(+)$ for application to a steering reaction characteristic modulator 86 (see FIG. 38).

Figure 55:
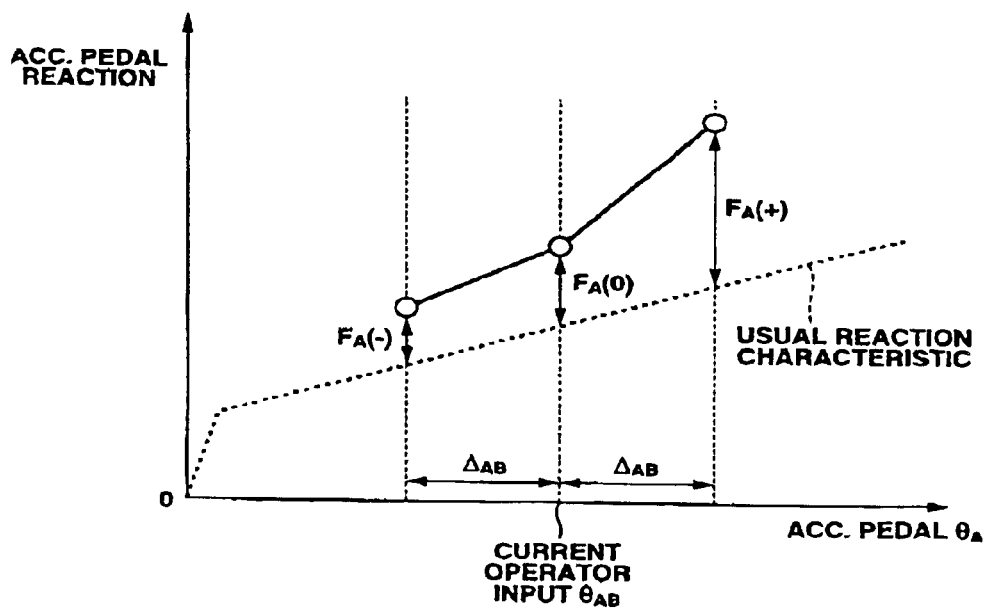
FIG. 55 illustrates an accelerator pedal reaction characteristic according to the ninth implementation.

With reference to FIG. 38, in response to the commands $F_A(0)$, $F_A(-)$ and $F_A(+)$ from the controller 82E, the accelerator pedal reaction characteristic modulator 144 controls a servo motor 146 to modulate or alter the accelerator pedal reaction characteristic as shown in FIG. 55. In FIG. 55, broken line indicates the usual accelerator pedal reaction characteristic. At θAB, the accelerator pedal reaction is increased from the level on the usual reaction characteristic by $F_A(0)$. Upon manipulating the accelerator pedal from the current depressed angle toward θAB−ΔAB, the operator feels reaction force increased from the level on the usual reaction characteristic by $F_A(-)$. Upon manipulating the accelerator pedal from the current depressed angle toward θAB+ΔAB, the operator feels reaction force increased from the level on the usual reaction characteristic by $F_A(+)$. From a change in reaction force, the operator can recognize how the current risk will vary upon moving the accelerator pedal from the current position.

Figure 56:
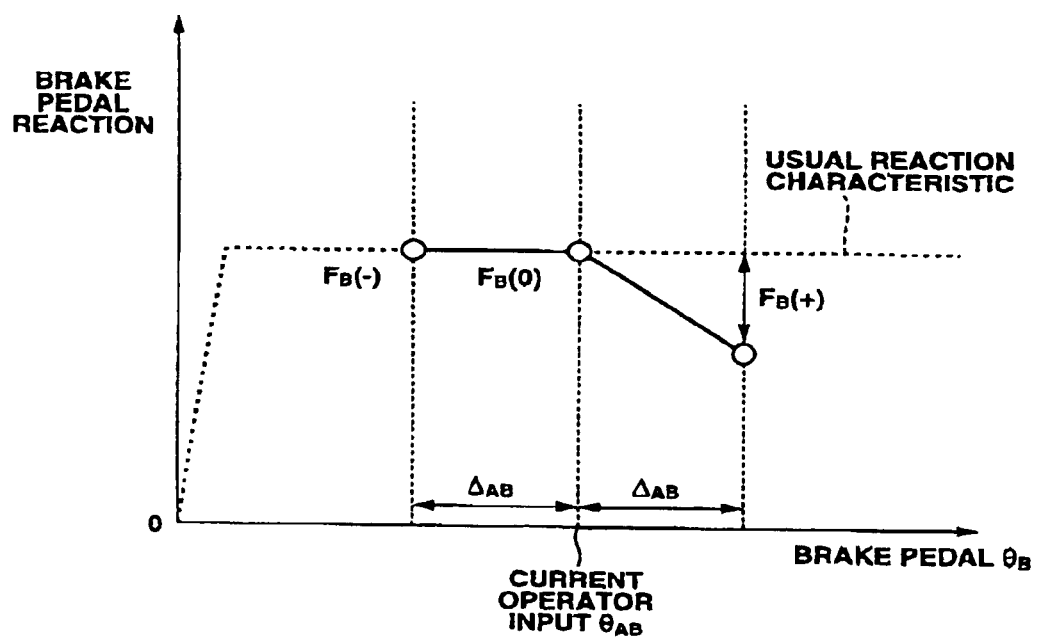
FIG. 56 illustrates a brake pedal reaction characteristic according to the ninth implementation.

In response to the commands $F_B(0)$, $F_B(-)$ and $F_B(+)$, the brake pedal reaction characteristic modulator 148 controls a brake booster 150 to modulate or alter the brake pedal reaction characteristic as shown in FIG. 56. In FIG. 56, broken line indicates the usual brake pedal reaction characteristic. At θAB, the brake pedal reaction is as high as the level on the usual reaction characteristic because $F_B(0)=0$. Upon manipulating the brake pedal from the current depressed angle toward $\theta AB-\Delta AB$, the operator feels the usual reaction force because $F_B(-)=0$. Upon manipulating the brake pedal from the current depressed angle toward $\theta AB+\Delta AB$, the operator feels reaction force decreased from the level on the usual reaction characteristic by $F_B(+)$. From a change in reaction force, the operator can recognize how the current risk will vary upon moving the brake pedal from the current position.

Figure 57:
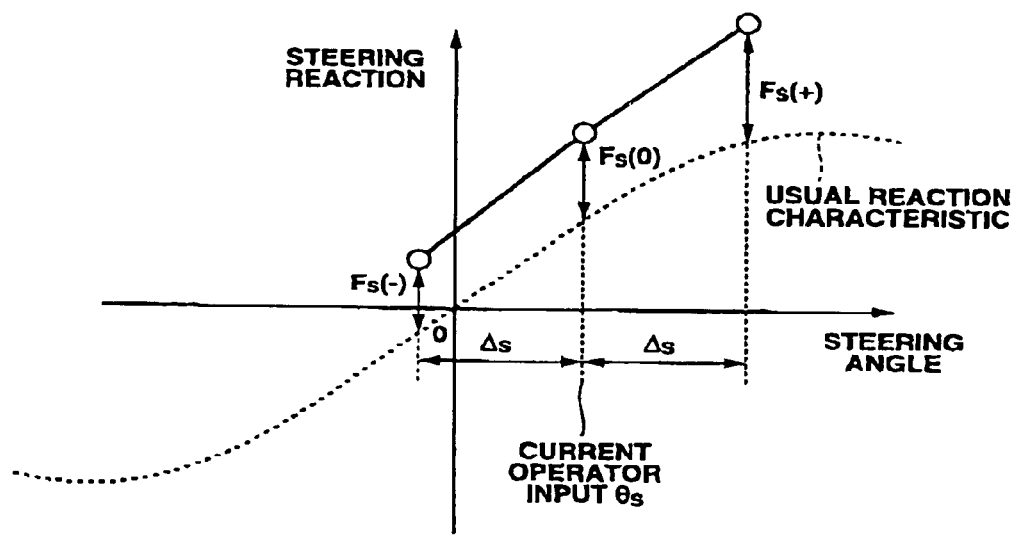
FIG. 57 illustrates a steering reaction characteristic according to the ninth implementation.

In response to commands $F_S(0)$, $F_S(-)$ and $F_S(+)$, the steering reaction characteristic modulator 86 controls a servo motor 88 to modulate or alter the steering reaction characteristic as shown in FIG. 57. In FIG. 57, broken line indicates the usual steering reaction characteristic. At $\theta S$, the steering reaction is increased from the level on the usual reaction characteristic by $F_S(0)$. Upon manipulating the steering wheel from the current angular position toward $\theta S-\Delta S$, the operator feels reaction force increased from the level on the usual reaction characteristic by $F_S(-)$. Upon manipulating the steering wheel from the current angular position toward $\theta S+\Delta S$, the operator feels reaction force increased from the level on the usual reaction characteristic by $F_S(+)$. From a change in reaction force, the operator can recognize how the current risk will vary upon turning the steering from the current position.

From the preceding description, it will now be understood that the eighth and ninth implementations provide the same features. However, the ninth implementation provides a feature which the eighth implementation does not. According to the ninth implementation, gradient of reaction force is created across the current position of operator input so as to prompt the operator to selecting a desired change from the current position of the operator input to reduce the risk.

Tenth Implementation of the Invention

The tenth implementation is substantially the same as the eighth embodiment illustrated in FIGS. 38 to 47.

Turning back to FIGS. 38 and 39, FIG. 38 provides hardware of the tenth implementation and FIG. 39 illustrates how the hardware is arranged on an automobile 70E according to the tenth implementation.

In the tenth implementation, a microprocessor-based controller 82E recognizes the state of obstacles within environment in a field around vehicle 70E by determining velocity $V_f$ of vehicle 70E, relative position and relative velocity between vehicle 70E and each of other vehicles within the environment, and relative position between the adjacent lane marking and each of obstacles within the environment. Based on the recognized obstacle state, controller 82E determines individual risk which each of the recognized obstacles would cause the operator to perceive. Controller 82E sums all of the individual risks to give a total risk. Controller 82E determines an angular location in which the total risk originates. In response to the determined angular position, controller 82E determines gains to be applied to a total longitudinal risk and to a total lateral risk. Based on the gains and the total longitudinal and lateral risks, controller 82E determines longitudinal and lateral commands.

Controller 82E outputs the longitudinal commands for application to an accelerator pedal reaction characteristic modulator 144 and a brake pedal reaction characteristic modulator 148, respectively. In response to the applied longitudinal commands, the accelerator pedal reaction characteristic modulator 144 and the brake pedal reaction characteristic modulator 148 control servo motor 146 and brake booster 150, thereby modulating the accelerator pedal and brake pedal reaction force characteristics. Modulating the accelerator pedal and brake pedal reaction characteristics prompt the vehicle operator to manipulating the accelerator pedal 152 and the brake pedal 154 to appropriate positions, respectively.

Controller 82E outputs the lateral command for application to a steering reaction characteristic modulator 86. In response to the applied lateral command, the steering reaction characteristic modulator 86 controls servo motor 88. Modulating the steering reaction characteristic prompts the vehicle operator to manipulating the steering wheel to an appropriate angular position.

Figure 58:
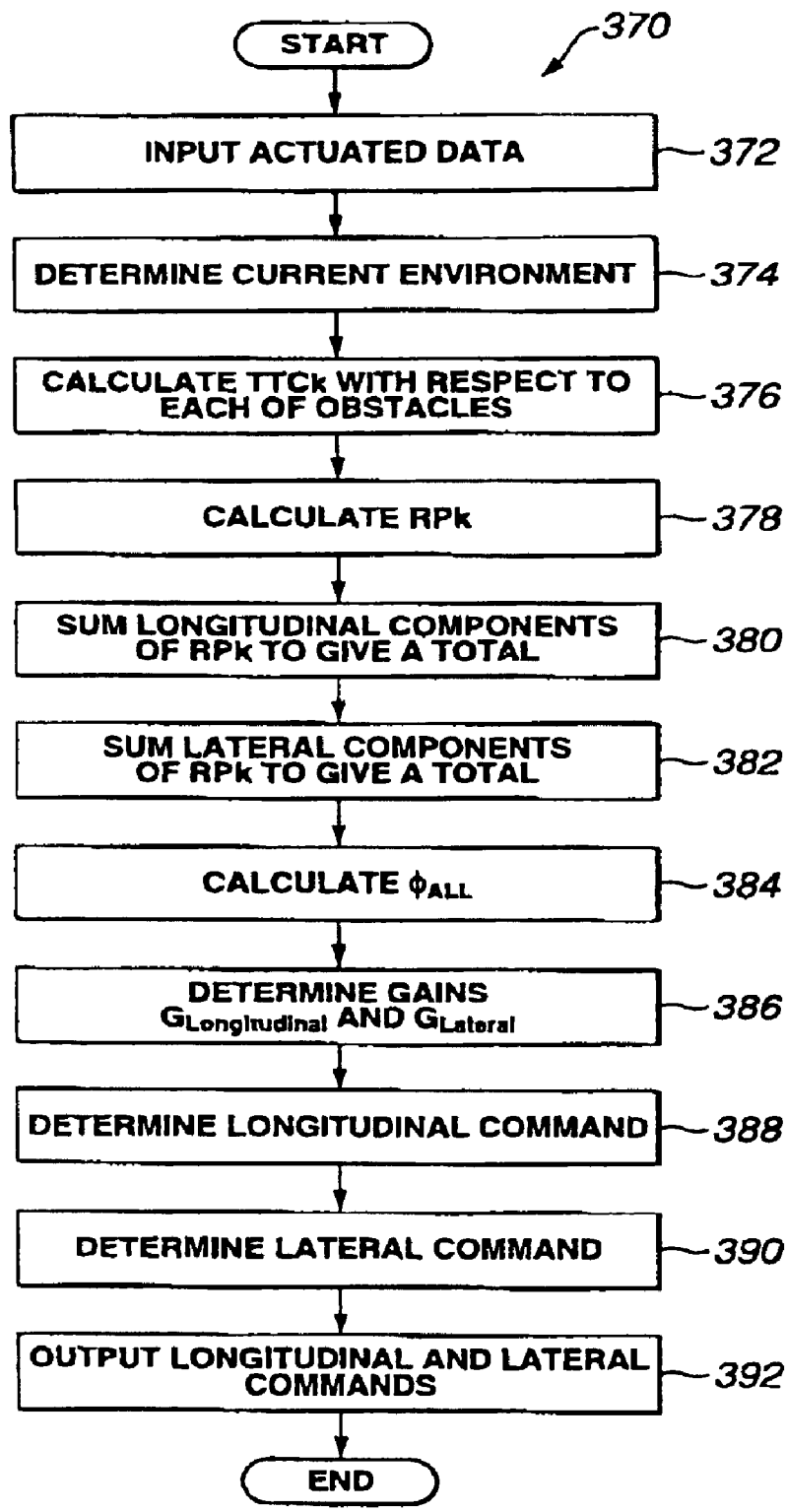
FIG. 58 is a flow diagram illustrating the operation of a tenth exemplary implementation of the present invention.

The flow diagram in FIG. 58 illustrates a control routine of the tenth implementation of the present invention. The control routine, generally indicated at 370, is executed at regular time intervals of 50 milliseconds.

The control routine 370 is substantially the same as the control routine 310 in FIG. 40 in that boxes 372, 374, 376, 378, 380 and 382 in FIG. 58 are the same as the boxes 312, 314, 316, 318, 320 and 322 in FIG. 40, respectively. Accordingly, the detailed description on the boxes 372, 374, 376, 378, 380 and 382 is hereby omitted for brevity.

In FIG. 58, after the box 382, the control logic goes to box 384. At box 384, based on the total longitudinal risk $RP_{Longitudinal}$ determined at 380 and the total lateral risk $RP_{Lateral}$, the processor calculates an angular location $\phi_{ALL}$ in which a combined risk originates. The angular location $\phi_{ALL}$ is expressed as, $$\phi_{ALL} = \tan^{-1} \frac{RP_{Lateral}}{RP_{Longitudinal}} \qquad \text{Eq. 25}$$

When the combined risk originates in an angular location ahead the vehicle, $\phi_{ALL}=0$ degree. When it originates in an angular location behind the vehicle, $\phi_{ALL}=180$ degrees. When it originates in an angular location on the right hand or left hand side of the vehicle, $|\phi_{ALL}|=90$ degrees.

Figure 59:
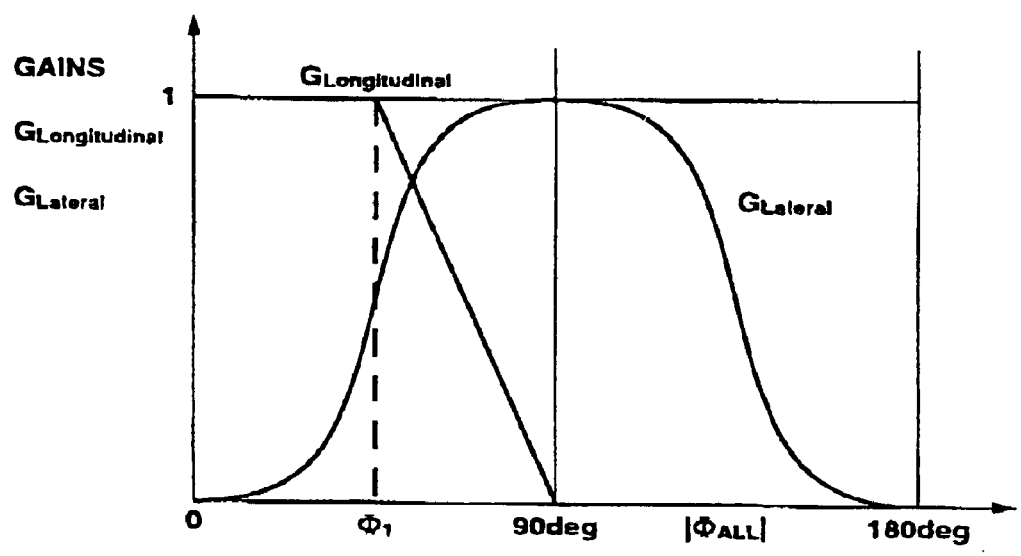
FIG. 59 is a gain map according to the tenth implementation.

At the next box 386, the processor determines gains $G_{Longitudinal}$ and $G_{Lateral}$ by referring to the illustrated curves in FIG. 59 using the absolute value $|\phi_{ALL}|$ at box 386. In FIG. 59, the horizontal axis represents the absolute value of $\phi_{ALL}$, while the vertical axis represents gain. The gain $G_{Longitudinal}$ is 1 when the absolute value $|\phi_{ALL}|$ is less than a value $\phi_1$ that is less than 90 degrees. This is the case where the combined risk originates ahead of the vehicle. The gain $G_{Longitudinal}$ drops from 1 toward zero when the absolute value $|\phi_{ALL}|$ exceeds the value $\phi_1$. At 90 degrees, the gain $G_{Longitudinal}$ is zero. This is the case where the combined risk originates form the side or from behind.

With continuing reference to FIG. 59, the gain $G_{Lateral}$ is 1 at about 90 degrees. This is the case where the combined risk originates on the lateral side of the vehicle. At 0 and 180 degrees, the gain $G_{Lateral}$ drops down to zero.

At box 388, the processor determines an accelerator pedal reaction command $F_A$ and a brake pedal reaction $F_B$ in the same manner as the processor did at box 324 in FIG. 40. As different from box 324, the processor multiplies $G_{Longitudinal}$ with each of $F_A$ and $F_B$ at box 388.

At box 390, the processor determines a steering reaction command $F_S$ in the same manner as the processor did at box 326 in FIG. 40. As different from box 326, the processor multiplies $G_{Lateral}$ with $F_S$ at box 390.

At box 392, the processor outputs the commands determined at boxes 388 and 390 for application to modulators 144, 148 and 86 (see FIG. 38).

In the tenth implementation, gains $G_{Longitudinal}$ and $G_{Lateral}$ are determined for longitudinal commands and for lateral command. These gains are set in accordance with curves illustrated in FIG. 50. With the use of such gains, the controller can allocate commands for prompting the operator to extensively coping with risks in an angular location where the combined risk originates.

While the present invention has been particularly described, in conjunction with various implementations of the present invention, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

This application claims the priorities of Japanese Patent Applications No. P2001-252422, filed Aug. 23, 2001, No. P2001-389314, filed Dec. 21, 2001, No. P2002-138266, filed May 14, 2002, and No. P2002-177029, Filed Jun. 18, 2002, the disclosure of each of which is hereby incorporated by reference in its entirety.

What is claimed is:

1. A driving assist system for assisting effort by an operator to operate a vehicle in traveling, the driving assist system comprising:
   a data acquisition system acquiring data involving information on the presence of a leading vehicle in a field around the vehicle; and
   a controller, mounted to the vehicle, for receiving the acquired data, for determining a first extent to which the vehicles have approached to each other and a second extent to which the first extent might be influenced if a change in environment should occur, and for determining future environment in the field based on the first and second extents.

2. The driving assist system as claimed in claim 1, wherein, in determining the first and second extents, the controller uses a velocity of the vehicle, a velocity of the leading vehicle, and the vehicle separation.

3. The driving assist system as claimed in claim 2, wherein the first extent is a first risk category, and the second extent is a second risk category.

4. The driving assist system as claimed in claim 3, wherein the first risk category is a function of relative vehicle velocity and vehicle separation.

5. The driving assist system as claimed in claim 3, wherein the second risk category is a function of vehicle separation and one of velocities of the vehicles.

6. The driving assist system as claimed in claim 3, wherein, in determining future environment, the controller weighs the first and second risk categories differently with first and second parameters.

7. The driving assist system as claimed in claim 6, wherein the second risk category is weighted less than the first risk category is.

8. The driving assist system as claimed in claim 7, wherein the determined future environment is the sum of the weighted first and second risk categories.

9. The driving assist system as claimed in claim 7, wherein the determined future environment is the greater one of the weighted first and second risk categories.

10. The driving assist system as claimed in claim 3, wherein, in determining future environment, the controller calculates a risk perceived (RP) as a function of the first and second risk categories, and smoothes a difference between a change of the RP with respect to a unit change in a time headway (THW) between the vehicles when the time headway is less than a threshold THW value and a change of the RP with respect to the unit change in the time headway when the time headway is greater than the threshold THW.

11. The driving assist system as claimed in claim 10, wherein the first risk category is a function of relative vehicle velocity and vehicle separation.

12. The driving assist system as claimed in claim 10, wherein the controller makes an operator response plan in response to the determined future environment to determine a command and generates the command; and further comprising an accelerator reaction modulation actuator capable of modulating reaction characteristic to manual effort applied onto an accelerator of the vehicle by the operator in response to the command.

13. The driving assist system as claimed in claim 10, wherein the controller has various alert categories with different environment categories and selects one of the alert categories for the determined future environment to determine a command, and generates the command; and further comprising an alarm capable of producing an alarm signal indicative of the selected one alert category in response to the command.

14. The driving assist system as claimed in claim 3,
wherein, when a time headway (THW) between the vehicles is not greater than a threshold THW value, in determining future environment, the controller calculates a risk perceived (RP0) as function of a first term, which is proportional to the first risk category that is given by the reciprocal of a time to contact (TTC) between the vehicles, and a second term, which is proportional to the second risk category that is given by the reciprocal of the THW;

and wherein, when the THW is greater than the threshold THW value, in determining future environment, the controller calculates a risk perceived (RP1) as a function of the first term and a third term, which proportional to the second risk category that is given by a quantity subtracted by the THW.

15. The driving assist system as claimed in claim 3,
wherein, in determining future environment in the field around the vehicle, the controller calculates a risk perceived (RP2) as a function of a first term, which is proportional to the first risk category that is given by the reciprocal of a time to contact (TTC) between the vehicles, a second term, which corresponds to the second risk category that is given by the reciprocal of a time headway (THW) between the vehicles, and a third term, which is proportional to the second risk category that is given by a quantity subtracted by the THW;

and wherein, the function involves a first parameter multiplied with the second term and a second parameter multiplied with the third term;

and wherein, the controller sets the first and second parameters in response to the THW.

16. The driving assist system as claimed in claim 15, wherein the controller sets the first and second parameters such that the third term grows apparent in the function than the second term does as the THW increases.

17. The driving assist system as claimed in claim 3, wherein, in determining future environment, the controller calculates a risk perceived (RP2) as a function of a first term, which is proportional to the first risk category that is given by the reciprocal of a time to contact (TTC) between the vehicles, a second term, which corresponds to the second risk category that is given by the reciprocal of a time headway between the vehicles, and a third term, which is proportional to the second risk category that is given by a quantity subtracted by the THW;

and wherein, in response to the THW, the controller alters weighting components, which are imposed on the second term and the third term, respectively.

18. The driving assist system as claimed in claim 17, wherein, when the THW is not greater than a threshold THW value, the controller sets 1 as the weighting component imposed on the second term and sets 0 as the weighting component imposed on the third term; and, wherein, when the THW is greater than the threshold THW value, the controller sets 0 as the weight imposed on the second term and sets 1 as the weighting components imposed on the third term.

19. The driving assist system as claimed in claim 17, wherein, when the THW is not greater than a threshold THW value, the controller sets 1 as the weighting component imposed on the second term and sets 0 as the weighting component imposed on the third term; and wherein, as the THW exceeds the threshold THW value, the controller alters the weighting components imposed on the second term and the third term such that as the THW increases, the weighting component imposed on the second term (1/THW) reduces toward 0 from 1, while the weighting component imposed on the third term increases from 0 toward 1.

20. The driving assist system as claimed in claim 1, wherein the controller makes an operator response plan in response to the determined future environment to determine a command and generates the command; and further comprising an accelerator reaction modulation actuator capable of modulating reaction characteristic to manual effort applied onto an accelerator of the vehicle by the operator in response to the command.

21. The driving assist system as claimed in claim 1, wherein the controller makes an operator response plan in response to the determined future environment to determine a command and generates the command; and further comprising an accelerator reaction modulation actuator capable of modulating reaction characteristic to manual effort applied onto an accelerator of the vehicle by the operator in response to the command.

22. A driving assist for assisting effort by an operator to operate a vehicle in traveling, the driving assist system comprising:

a data acquisition system acquiring data involving information on the presence of a leading vehicle in a field around the vehicle; and a controller, mounted to the vehicle, for receiving the acquired data, for determining an extent to which the vehicles have approached to each other, for determining a period of time as a function of the determined extent and for determining a future quantity of the extent that would occur upon elapse of the period of time from the determined extent to give future environment in the field.

23. The driving assist system as claimed in claim 22, wherein the controller makes an operator response plan in response to the determined future environment to determine a command and generates the command; and further comprising an accelerator reaction modulation actuator capable of modulating reaction characteristic to manual effort applied onto an accelerator of the vehicle by the operator in response to the command.

24. The driving assist system as claimed in claim 22, wherein the controller has various alert categories with different environment categories and selects one of the alert categories for the determined future environment to determine a command, and generates the command; and further comprising an alarm capable of producing an alarm signal indicative of the selected one alert category in response to the command.

25. The driving assist system as claimed in claim 22, wherein the period of time is inversely proportional to the determined extent.

26. A driving assist system for assisting effort by an operator to operate a vehicle in traveling, the driving assist system comprising:

a data acquisition system acquiring data involving information on the presence of an obstacle in a field around the vehicle;

a controller, mounted to the vehicle, for receiving the acquired data, for determining a risk which the obstacle would cause the operator to perceive, for allocating commands for prompting the operator to operating the vehicle longitudinally and laterally, and for generating the commands; and a plurality of actuators, mounted to the vehicle, to prompt the operator in response to the commands to operating the vehicle longitudinally and laterally.

27. The driving assist system as claimed in claim 26, wherein the commands are applied to the plurality of actuators.

28. The driving assist system as claimed in claim 27, wherein each of the plurality of actuators is capable of modulating reaction characteristic to manual effort by the operator.

29. The driving assist system as claimed in claim 26, wherein the data acquisition system is mounted to the vehicle.

30. The driving assist system as claimed in claim 26, wherein the controller uses a direction from the vehicle to the obstacle, a separation between the vehicle and the obstacle, and a relative velocity between the vehicle and the obstacle in determining a risk, which the obstacle would cause the operator to perceive.

31. The driving assist system as claimed in claim 30, wherein the risk is a function of a time to contact (TTC) that is given by dividing the separation by the relative velocity.

32. The driving assist system as claimed in claim 31, wherein the data acquisition system is mounted to the vehicle, and wherein the controller accounts for variance of the separation and variance of the relative velocity in determining the TTC.

33. The driving assist system as claimed in claim 32, wherein the obstacle is classified into one of predetermined categories; and wherein the variances of separation and relative velocity with regard to the obstacle are subject to variation, in magnitude, with different categories, which the obstacle may be classified into, of the predetermined categories.

34. The driving assist system as claimed in claim 33, wherein the obstacle is classified into one of predetermined categories that are weighted differently, and wherein the controller accounts for how much the category, which the obstacle is classified into, is weighted in determining the TTC that is used in determining the risk.

35. The driving assist system as claimed in claim 32, wherein the data acquisition system includes a plurality sensors of different kinds, in performance, for sensing the obstacle; and wherein the variances of separation and relative velocity with regard to the obstacle are subject to variation, in magnitude, with different kinds, in performance, of sensors, whereby the obstacle may be sensed.

36. The driving assist system as claimed in claim 35, wherein the obstacle is classified into one of predetermined categories that are weighted differently, and wherein the controller accounts for how much the category, which the obstacle is classified into, is weighted in determining the TTC that is used in determining the risk.

37. The driving assist system as claimed in claim 32, wherein the obstacle is classified into one of predetermined categories that are weighted differently, and wherein the controller accounts for how much the category, which the obstacle is classified into, is weighted in determining the TTC that is used in determining the risk.

38. The driving assist system as claimed in claim 31, wherein the obstacle is classified into one of predetermined categories that are weighted differently, and wherein the controller accounts for how much the category, which the obstacle is classified into, is weighted in determining the TTC that is used in determining the risk.

39. The driving assist system as claimed in claim 30, wherein, in making an operator response plan, the controller divides the determined risk into a longitudinal, with respect to the vehicle, risk component and a lateral, with respect to the vehicle, risk component, uses the longitudinal risk component to determine the amount of input to one of the plurality of actuators, and uses the lateral risk component to determine the amount of input to another of the plurality of actuators.

40. The driving assist system as claimed in claim 30, wherein, in making an operator response plan, the controller estimates a change in the risk for a change of manual effort by the operator in operating the vehicle longitudinally and a change of manual effort by the operator in operating the vehicle laterally.

41. The driving assist system as claimed in claim 26, wherein one of the plurality of actuators is capable of modulating reaction characteristic to manual effort applied onto an accelerator of the vehicle by the operator.

42. The driving assist system as claimed in claim 26, wherein one of the plurality of actuators is capable of modulating reaction characteristic to manual effort applied onto a brake of the vehicle by the operator.

43. The driving assist system as claimed in claim 26, wherein one of the plurality of actuators is capable of modulating reaction characteristic to manual steering effort by the operator.

44. A driving assist system for assisting effort by an operator to operate a vehicle in traveling, the driving assist system comprising:
   a data acquisition system acquiring data involving information on the presence of obstacles in a field around the vehicle;
   a controller, mounted to the vehicle, for receiving the acquired data, for determining a risk which each of the obstacles would cause the operator to perceive, for making an operator response plan in response to the risks, which plan prompts the operator to operating the vehicle longitudinally and laterally, to determine commands, and for generating the commands; and
   a plurality of actuators, mounted to the vehicle, to prompt the operator in response to the commands to operating the vehicle longitudinally and laterally.

45. A driving assist system for assisting effort by an operator to operate a vehicle in traveling, the driving assist system comprising:
   a data acquisition system acquiring data including information on vehicle state and information on environment in a field around the vehicle;
   a controller, mounted to the vehicle, for receiving the acquired data, for determining future environment in the field using the acquired data, for making an operator response plan in response to the determined future environment, which plan prompts the operator to operating the vehicle in a desired manner for the determined future environment, to determine command, and for generating the command; and
   at least one actuator, mounted to the vehicle, for prompting the operator in response to the command to operating the vehicle in the desired manner;
   wherein the information on environment involves information on the presence of obstacles in the field; wherein the determined future environment involves a risk which each of the obstacles would cause the operator to perceive; and wherein the operator response plan is made to prompt the operator to operating the vehicle in the desired manner to reduce the risks;
   wherein the information on environment involves information on road condition; wherein the determined future environment involves a risk derived from the road condition, which is determined by a lateral deviation of the vehicle from a lane and by curvature of the lane; and wherein the operator response plan is made to prompt the operator to operating the vehicle in the desired manner to reduce the risks superimposed by the risk derived from the road condition.

46. A driving assist system for assisting effort by an operator to operate a vehicle in traveling the driving assist system comprising:
   a data acquisition system acquiring data including information on vehicle state and information on environment in a field around the vehicle;
   a controller, mounted to the vehicle, for receiving the acquired data, for determining future environment in the field using the acquired data, for making an operator response plan in response to the determined future environment, which plan prompts the operator to operating the vehicle in a desired manner for the determined future environment, to determine command, and for generating the command; and
   at least one actuator, mounted to the vehicle, for prompting the operator in response to the command to operating the vehicle in the desired manner;
   wherein the actuator is capable of modulating reaction characteristic to manual effort applied onto an accelerator of the vehicle by the operator.

47. A driving assist system for assisting effort by an operator to operate a vehicle in traveling, the driving assist system comprising:
   a data acquisition system acquiring data including information on vehicle state and information on environment in a field around the vehicle;
   a controller, mounted to the vehicle, for receiving the acquired data, for determining future environment in the field using the acquired data, for making an operator response plan in response to the determined future environment, which plan prompts the operator to operating the vehicle in a desired manner for the determined future environment, to determine command, and for generating the command; and
   at least one actuator, mounted to the vehicle, for prompting the operator in response to the command to operating the vehicle in the desired manner;
   wherein the actuator is capable of modulating reaction characteristic to manual effort applied onto a brake of the vehicle by the operator.

48. A driving assist system for assisting effort by an operator to operate a vehicle in traveling, the driving assist system comprising:
- a data acquisition system acquiring data including information on vehicle state and information on environment in a field around the vehicle, the information on environment involving information on the presence of obstacles in the field;
- a controller, mounted to the vehicle, for receiving the acquired data, for determining future environment in the field, the determined future environment involving a risk which each of the obstacles would cause the operator to perceive, for making an operator response plan in response to the determined future environment, which plan prompts the operator to operating the vehicle at least longitudinally to reduce the risks, to determine commands, and for generating the commands; and
- a plurality of actuators, mounted to the vehicle, for prompting the operator in response to the commands to operating the vehicle at least longitudinally, the plurality of actuators includes an accelerator reaction modulation actuator capable of modulating reaction characteristic to manual effort applied onto an accelerator of the vehicle.

49. A driving assist system for assisting effort by an operator to operate a vehicle in traveling, the driving assist system comprising:
- a data acquisition system, mounted to the vehicle, acquiring data involving information on the presence of an obstacle in a field around the vehicle;
- a controller, mounted to the vehicle, for receiving the acquired data, for determining a risk which the obstacle would cause the operator to perceive using a direction from the vehicle to the obstacle, a separation between the vehicle and the obstacle, and a relative velocity between the vehicle and the obstacle, for allocating commands for prompting the operator to operating the vehicle longitudinally and laterally, and for generating the commands; and
- a plurality of actuators, mounted to the vehicle, to prompt the operator in response to the commands to operating the vehicle longitudinally and laterally;
- the plurality of actuators including an accelerator reaction modulation actuator capable of modulating reaction characteristic to manual effort applied onto an accelerator of the vehicle by the operator, a brake pedal reaction modulation actuator capable of modulating reaction characteristic to manual effort applied onto a brake of the vehicle by the operator, and a steering reaction modulation actuator capable of modulating reaction characteristic to manual steering effort by the operator.

50. A driving assist system for assisting effort by an operator to operate a vehicle in traveling, the driving assist system comprising:
- a data acquisition system, mounted to the vehicle, acquiring data involving information on the presence of obstacles in a field around the vehicle;
- a controller, mounted to the vehicle, for receiving the acquired data, for determining a risk which each the obstacles would cause the operator to perceive using a direction from the vehicle to the obstacle, a separation between the vehicle and the obstacle, and a relative velocity between the vehicle and the obstacle, for making an operator response plan in response to the risk, which plan prompts the operator to operating the vehicle longitudinally and laterally, to determine commands, and for generating the commands; and
- a plurality of actuators, mounted to the vehicle, to prompt the operator in response to the commands to operating the vehicle longitudinally and laterally;
- wherein, in making an operator response plan, the controller divides each the determined risks into a longitudinal, with respect to the vehicle, risk component and a lateral, with respect to the vehicle, risk component, uses the total of the longitudinal risk components to determine the amount of input to one of the plurality of actuators, and uses the total of the lateral risk components to determine the amount of input to another of the plurality of actuators.

51. The driving assist system as claimed in claim 50, wherein the risk which each the obstacles would cause the operator to perceive is a function of a time to contact (TTC) between the vehicle and the obstacle.

52. A driving assist system for assisting effort by an operator to operate a vehicle in traveling, the driving assist system comprising:
- means for acquiring data involving information on the presence of obstacles in a field around the vehicle;
- means for determining a risk which each the obstacles would cause the operator to perceive using a direction from the vehicle to the obstacle, a separation between the vehicle and the obstacle, and a relative velocity between the vehicle and the obstacle;
- means for dividing each of the determined risks into a longitudinal, with respect to the vehicle, risk component and a lateral, with respect to the vehicle, risk component;
- means for calculating the total of the longitudinal risk components and the total of the lateral risk components;
- means for making an operator response plan in response to the calculated totals, which plan prompts the operator to operating the vehicle longitudinally and laterally, to determine commands; and
- means for prompting the operator in response to the commands to operating the vehicle longitudinally and laterally.

53. A vehicle operated by an operator in traveling, the vehicle comprising:
- a data acquisition system acquiring data including information on vehicle state and information on environment in a field around the vehicle, the information on environment involving information on the presence of obstacles in the field;
- a controller for receiving the acquired data, for determining future environment in the field, the determined future environment involving a risk which each of the obstacles would cause the operator to perceive, for making an operator response plan in response to the determined future environment, which plan prompts the operator to operating the vehicle at least longitudinally to reduce the risks, to determine commands, and for generating the commands; and
- a plurality of actuators for prompting the operator in response to the commands to operating the vehicle at least longitudinally, the plurality of actuators includes an accelerator reaction modulation actuator capable of modulating reaction characteristic to manual effort applied onto an accelerator of the vehicle.

54. A vehicle operated by an operator in traveling, the vehicle comprising:
- a data acquisition system acquiring data involving information on the presence of an obstacle in a field around the vehicle;
- a controller for receiving the acquired data, for determining a risk which the obstacle would cause the operator to perceive, for allocating commands for prompting the operator to operating the vehicle longitudinally and laterally, and for generating the commands; and
- a plurality of actuators, mounted to the vehicle, to prompt the operator in response to the commands to operating the vehicle longitudinally and laterally.

55. A vehicle operated by an operator in traveling, the vehicle comprising:
- a data acquisition system acquiring data involving information on the presence of obstacles in a field around the vehicle;
- a controller for receiving the acquired data, for determining a risk which each of the obstacles would cause the operator to perceive, for making an operator response plan in response to the risks, which plan prompts the operator to operating the vehicle longitudinally and laterally, to determine commands, and for generating the commands; and
- a plurality of actuators to prompt the operator in response to the commands to operating the vehicle longitudinally and laterally.

56. A vehicle operated by an operator in traveling, the vehicle comprising:
- a data acquisition system acquiring data involving information on the presence of an obstacle in a field around the vehicle;
- a controller for receiving the acquired data, for determining a risk which the obstacle would cause the operator to perceive using a direction from the vehicle to the obstacle, a separation between the vehicle and the obstacle, and a relative velocity between the vehicle and the obstacle, for making an operator response plan in response to the risk, which plan prompts the operator to operating the vehicle longitudinally and laterally, to determine commands, and for generating the commands; and
- a plurality of actuators to prompt the operator in response to the commands to operating the vehicle longitudinally and laterally;
- the plurality of actuators including an accelerator reaction modulation actuator capable of modulating reaction characteristic to manual effort applied onto an accelerator of the vehicle by the operator, a brake pedal reaction modulation actuator capable of modulating reaction characteristic to manual effort applied onto a brake of the vehicle by the operator, and a steering reaction modulation actuator capable of modulating reaction characteristic to manual steering effort by the operator.

57. A vehicle operated by an operator in traveling, the vehicle comprising:
- a data acquisition system acquiring data involving information on the presence of obstacles in a field around the vehicle;
- a controller for receiving the acquired data, for determining a risk which each the obstacles would cause the operator to perceive using a direction from the vehicle to the obstacle, a separation between the vehicle and the obstacle, and a relative velocity between the vehicle and the obstacle, for making an operator response plan in response to the risk, which plan prompts the operator to operating the vehicle longitudinally and laterally, to determine commands, and for generating the commands; and
- a plurality of actuators to prompt the operator in response to the commands to operating the vehicle longitudinally and laterally;
- wherein, in making an operator response plan, the controller divides each the determined risks into a longitudinal, with respect to the vehicle, risk component and a lateral, with respect to the vehicle, risk component, uses the total of the longitudinal risk components to determine the amount of input to one of the plurality of actuators, and uses the total of the lateral risk components to determine the amount of input to another of the plurality of actuators.

58. A method for assisting effort by an operator to operate a vehicle in traveling, the method comprising:
- acquiring data including information on vehicle state and information on environment in a field around the vehicle, the information on environment involving information on the presence of obstacles in the field;
- determining future environment in the field based on the acquired data, the determined future environment involving a risk which each of the obstacles would cause the operator to perceive;
- making an operator response plan in response to the determined future environment, which plan prompts the operator to operating the vehicle at least longitudinally to reduce the risks, to determine commands; and
- prompting the operator in response to the commands to operating the vehicle at least longitudinally, by modulating reaction characteristic to manual effort applied onto an accelerator of the vehicle.

59. A method for assisting effort by an operator to operate a vehicle in traveling, the method comprising:
- acquiring data involving information on the presence of a leading vehicle in a field around the vehicle; and
- determining, based on the acquired data, a reciprocal of a time to contact (TTC) between the vehicles;
- determining, based on the acquired data a reciprocal of a time headway (THW) between the vehicles;
- determining future environment in the field based on the determined reciprocals;
- making an operator response plan in response to the determined future environment to determine a command; and
- modulating reaction characteristic to manual effort applied onto an accelerator of the vehicle in response to the command.

60. A method for assisting effort by an operator to operate a vehicle in traveling, the method comprising:
- acquiring data involving information on the presence of a leading vehicle in a field around the vehicle; and
- determining, based on the acquired date, an extent to which the vehicles has have approached each other;
- determining a period of time as a function of the determined extent;
- determining a future quantity of the extent that would occur upon elapse of the period of time from the determined extent to give future environment in the field;

making an operator response plan in response to the determined future environment to determine a command; and modulating reaction characteristic to manual effort applied onto an accelerator of the vehicle by the operator in response to the command.

61. A method for assisting effort by an operator to operate a vehicle in traveling, the method comprising:

acquiring data involving information on the presence of an obstacle in a field around the vehicle;

determining, out of the acquired data, a risk which the obstacle would cause the operator to perceive;

allocating commands for prompting the operator to operating the vehicle longitudinally and laterally; and prompting the operator in response to the commands to operating the vehicle longitudinally and laterally.

62. A method for assisting effort by an operator to operate a vehicle in traveling, the method comprising:

acquiring data involving information on the presence of obstacles in a field around the vehicle;

determining, out of the acquired data, a risk which each of the obstacles would cause the operator to perceive;

making an operator response plan in response to the risks, which plan prompts the operator to operating the vehicle longitudinally and laterally, to determine commands; and prompting the operator in response to the commands to operating the vehicle longitudinally and laterally.

63. A method for assisting effort by an operator to operate a vehicle in traveling, the method comprising:

acquiring data involving information on the presence of obstacles in a field around the vehicle;

determining, out of the acquired data, a risk which each of the obstacles would cause the operator to perceive using a direction from the vehicle to the obstacle, a separation between the vehicle and the obstacle, and a relative velocity between the vehicle and the obstacle;

making an operator response plan in response to the risks, which plan prompts the operator to operating the vehicle longitudinally and laterally, to determine commands;

modulating reaction characteristic to manual effort applied onto an accelerator of the vehicle by the operator in response to one of the commands;

modulating reaction characteristic to manual effort applied onto a brake of the vehicle by the operator in response to another of the commands; and modulating reaction characteristic to manual steering effort by the operator in response to other of the commands.

64. The method as claimed in claim 63, wherein the step of making an operator response plan comprises the sub-steps of:

dividing each of the determined risks into a longitudinal, with respect to the vehicle, risk component and a lateral, with respect to the vehicle, risk component; and calculating the total of the longitudinal risk components and the total of the lateral risk components in determining the commands.

* * * * *